United States Patent
Seldess et al.

(10) Patent No.: US 12,445,800 B2
(45) Date of Patent: Oct. 14, 2025

(54) COLORLESS GENERATION OF ELEVATION PERCEPTUAL CUES USING ALL-PASS FILTER NETWORKS

(71) Applicant: Boomcloud 360 Inc., Encinitas, CA (US)

(72) Inventors: Zachary Seldess, San Diego, CA (US); Joseph Anthony Mariglio, III, Encinitas, CA (US)

(73) Assignee: Boomcloud 360 Inc., Encinitas, CA (US)

( * ) Notice: Subject to any disclaimer, the term of this patent is extended or adjusted under 35 U.S.C. 154(b) by 0 days.

(21) Appl. No.: 18/639,767

(22) Filed: Apr. 18, 2024

(65) Prior Publication Data

US 2024/0357314 A1 Oct. 24, 2024

Related U.S. Application Data

(63) Continuation of application No. 17/859,801, filed on Jul. 7, 2022.
(Continued)

(51) Int. Cl.
*G10L 21/028* (2013.01)
*G10L 19/008* (2013.01)
(Continued)

(52) U.S. Cl.
CPC ............ *H04S 7/307* (2013.01); *G10L 19/008* (2013.01); *G10L 19/16* (2013.01); *G10L 19/26* (2013.01);
(Continued)

(58) Field of Classification Search
None
See application file for complete search history.

(56) References Cited

U.S. PATENT DOCUMENTS

| 4,188,667 A | 2/1980 | Graupe et al. |
| 4,653,096 A * | 3/1987 | Yokoyama ............ H04S 5/02 381/63 |

(Continued)

FOREIGN PATENT DOCUMENTS

| CN | 108476367 A | 8/2018 |
| CN | 111418219 A | 7/2020 |

(Continued)

OTHER PUBLICATIONS

Deboer, C. "Dolby Updates PC Entertainment Experience Program," Audioholics.com, Mar. 12, 2008, 2 pages, Retrieved from the internet <URL:https://www.audioholics.com/news/dolby-pc-entertainment-experience>.

(Continued)

*Primary Examiner* — Yosef K Laekemariam
(74) *Attorney, Agent, or Firm* — Fenwick & West LLP

(57) ABSTRACT

A system includes one or more computing devices that encode spatial perceptual cues into a monaural channel to generate a plurality of output channels. A computing device determines a target amplitude response for the mid and side channels of the plurality of output channels, defining a spatial perceptual associated with one or more frequency-dependent phase shifts. The computing device determines a transfer function of a single-input, multi-output allpass filter based on the target amplitude response and determines coefficients of the allpass filter based on the transfer function, and processes the monaural channel with the coefficients of the allpass filter to generate the plurality of channels having the encoded spatial perceptual cues. The allpass filter is configured to be colorless with respect to the individual output channels, allowing for the placement of spatial cues into the audio stream to be decoupled from the overall coloration of the audio.

39 Claims, 27 Drawing Sheets

Related U.S. Application Data

(60) Provisional application No. 63/284,993, filed on Dec. 1, 2021, provisional application No. 63/219,698, filed on Jul. 8, 2021.

(51) Int. Cl.
  *G10L 19/16* (2013.01)
  *G10L 19/26* (2013.01)
  *H04R 3/04* (2006.01)
  *H04S 1/00* (2006.01)
  *H04S 3/00* (2006.01)
  *H04S 7/00* (2006.01)

(52) U.S. Cl.
  CPC .............. *G10L 21/028* (2013.01); *H04R 3/04* (2013.01); *H04S 1/007* (2013.01); *H04S 3/008* (2013.01); *H04S 2400/01* (2013.01); *H04S 2400/05* (2013.01); *H04S 2400/13* (2013.01)

(56) References Cited

U.S. PATENT DOCUMENTS

| | | |
|---|---|---|
| 5,500,900 A | 3/1996 | Chen et al. |
| 5,699,404 A | 12/1997 | Satyamurti et al. |
| 5,796,842 A | 8/1998 | Hanna |
| 7,103,187 B1 | 9/2006 | Neuman |
| 8,867,750 B2 | 10/2014 | Brown |
| 9,269,360 B2 | 2/2016 | McGrath |
| 2005/0177360 A1 | 8/2005 | Schuijers et al. |
| 2006/0093152 A1 | 5/2006 | Thompson et al. |
| 2007/0168183 A1 | 7/2007 | Van De Kerkhof |
| 2008/0137874 A1 | 6/2008 | Christoph |
| 2009/0060204 A1* | 3/2009 | Reams ............... H04S 3/00 381/1 |
| 2009/0222261 A1 | 9/2009 | Jung et al. |
| 2009/0299734 A1 | 12/2009 | Zhou et al. |
| 2010/0303246 A1 | 12/2010 | Walsh et al. |
| 2011/0115987 A1 | 5/2011 | Kubo |
| 2012/0170757 A1 | 7/2012 | Kraemer et al. |
| 2013/0094654 A1 | 4/2013 | Breebaart et al. |
| 2013/0322636 A1 | 12/2013 | Vickers |
| 2016/0005417 A1 | 1/2016 | Van Hoesel et al. |
| 2016/0203822 A1 | 7/2016 | Purnhagen et al. |
| 2017/0142528 A1 | 5/2017 | Edwards |
| 2019/0108846 A1 | 4/2019 | Chebiyyam et al. |
| 2019/0285673 A1 | 9/2019 | Skovenborg |
| 2020/0021923 A1 | 1/2020 | Elmedyb et al. |
| 2021/0044898 A1* | 2/2021 | Mariglio, III .......... H04R 3/007 |
| 2021/0112339 A1 | 4/2021 | Seldess |
| 2022/0021996 A1 | 1/2022 | Brimijoin et al. |
| 2022/0030369 A1 | 1/2022 | Faundez Hoffmann et al. |

FOREIGN PATENT DOCUMENTS

| | | | |
|---|---|---|---|
| EP | 3340660 A1 | 6/2018 | |
| JP | S49-42723 Y1 | 11/1974 | |
| JP | H11-289598 A | 10/1999 | |
| JP | 2000-504526 A | 4/2000 | |
| JP | 2006-005414 A | 1/2006 | |
| JP | 2009-276268 A | 11/2009 | |
| JP | 2010-016625 A | 1/2010 | |
| JP | 2010-529780 A | 8/2010 | |
| JP | 2019-506780 A | 3/2019 | |
| JP | 2020-528580 A | 9/2020 | |
| JP | 2024-507219 A | 2/2024 | |
| KR | 10-2007-0091518 A | 9/2007 | |
| WO | WO 1998/23131 A1 | 5/1998 | |
| WO | WO 2007/095298 A2 | 8/2007 | |
| WO | WO 2008/016097 A1 | 2/2008 | |
| WO | WO 2020/044362 A2 | 3/2020 | |
| WO | WO 2021/026314 A1 | 2/2021 | |
| WO | WO 2021/071576 A1 | 4/2021 | |

OTHER PUBLICATIONS

Dolby, "Dolby PC Entertainment Experience," Dolby Personal Computer, Feb. 10, 2009, 1 page, Retrieved from the internet <URL:https://web.archive.org/web/20090210195032/http:/www.dolby.com/consumer/pc/pcee/index.html>.

Dolby, "Dolby Virtual Speaker Technology: Fundamental Principles," Dolby Technologies, Feb. 4, 2009, 5 pages, Retrieved from the internet <URL:https://web.archive.org/web/20090204003955/http:/www.dolby.com/consumer/technology/virtual_speaker_wp.html>.

Dolby, "Dolby Virtual Speaker," Dolby Technologies, Jan. 29, 2009, 1 page, Retrieved from the internet <URL:https://web.archive.org/web/20090129084314/http:/www.dolby.com/consumer/technology/virtual_speaker.html>.

Hooks, S. "Powerful Dolby Atmos Sound Coming to Xbox One and Windows 10," Xbox.com, Dec. 14, 2016, 6 pages, Retrieved from the internet <URL:https://news.xbox.com/en-us/2016/12/14/dolby-atmos-xbox-one-windows-10/>.

PCT International Search Report and Written Opinion, PCT Application No. PCT/US2022/016836, Jun. 2, 2022, nine pages.

PCT International Search Report and Written Opinion, PCT Application No. PCT/US2022/036412, Oct. 21, 2022, 9 pages.

Pei, S-C. et al. "Closed-Form Design of All-Pass Fractional Delay Filters." IEEE Signal Processing Letters, vol. 11, No. 10, Oct. 2004, pp. 788-791.

Breebaart, J. et al. "High-Quality Parametric Spatial Audio Coding at Low Bit Rates." AES 116$^{th}$ Convention, Berlin, Germany, May 8-11, 2004, pp. 1-13.

China National Intellectual Property Administration, Office Action, CN Patent Application No. 202280047861.8, Jun. 29, 2024, 10 pages.

Hu, Z. et al. "Generalized Cross-Correlation Time Delay Estimation Algorithm Based on Frequency Division in Reverberation Environment." Computer Engineering, vol. 44, No. 9, Sep. 2018, pp. 269-273, (with English abstract).

Korean Intellectual Property Office, Office Action, Korean Patent Application No. 10-2024-7004637, Jun. 17, 2024, eight pages.

Taiwan Intellectual Property Office, Office Action, Taiwanese Patent Application No. 112142963, Sep. 20, 2024, 14 pages.

The Japan Patent Office, Office Action, Japanese Patent Application No. 2023-575530, May 7, 2024, six pages.

United States Office Action, U.S. Appl. No. 17/859,791, filed May 20, 2024, 21 pages.

European Patent Office, Extended European Search Report, European Patent Application No. 22756945.6, Nov. 25, 2024, nine pages.

Jakka, J. "Binaural to Multichannel Audio Upmix." Master's Thesis, Helsinki University of Technology, Jun. 6, 2005, pp. i-52.

Orban, R. "A Rational Technique for Synthesizing Pseudo-Stereo from Monophonic Sources." Journal of the Audio Engineering Society, vol. 18, No. 2, Apr. 1970, pp. 157-164.

The Japan Patent Office, Office Action, Japanese Patent Application No. 2023-550040, Dec. 3, 2024, five pages.

European Patent Office, Partial Supplementary European Search Report with Provisional Opinion, European Patent Application No. 22838430.1, Mar. 18, 2025, 14 pages.

European Patent Office, Extended European Search Report, European Patent Application No. 22838430.1, May 28, 2025, 14 pages.

Japan Patent Office, Office Action, Japanese Patent Application No. 2024-166285, Jul. 22, 2025, six pages.

* cited by examiner

1900

Separate an audio channel into a low frequency component and a high frequency component
1905

Apply a first Hilbert Transform to the high frequency component to generate a first left leg component and a first right leg component, the first left leg component being 90 degrees out of phase with respect to the first right leg component
1910

Apply a second Hilbert Transform to the first right leg component to generate a second left leg component and a second right leg component, the second left leg component being 90 degrees out of phase with respect to the second right leg component
1915

Combine the first left leg component with the low frequency component to generate a left channel
1920

Combine the second right leg component with the low frequency component to generate a right channel
1925

```
┌─────────────────────────────────────────────┐
│ Determine a target amplitude response       │
│ defining one or more spatial cues to be     │
│ encoded into a monaural audio signal        │
│ 2005                                        │
└─────────────────────────────────────────────┘
                      ↓
┌─────────────────────────────────────────────┐
│ Determine a transfer function for a single- │
│ input, multi-output allpass filter based on │
│ the target amplitude response               │
│ 2010                                        │
└─────────────────────────────────────────────┘
                      ↓
┌─────────────────────────────────────────────┐
│ Determine coefficients of the allpass       │
│ filter based on the transfer function       │
│ 2015                                        │
└─────────────────────────────────────────────┘
                      ↓
┌─────────────────────────────────────────────┐
│ Process the monaural channel with the       │
│ coefficients of the allpass filter to       │
│ generate the plurality of channels          │
│ 2020                                        │
└─────────────────────────────────────────────┘
```

FIG. 20

COLORLESS GENERATION OF ELEVATION PERCEPTUAL CUES USING ALL-PASS FILTER NETWORKS

CROSS-REFERENCE TO RELATED APPLICATIONS

This application is a Continuation of U.S. application Ser. No. 17/859,801, filed Jul. 7, 2022, which claims the benefit of and priority to U.S. Provisional Application No. 63/219,698, filed on Jul. 8, 2021, and U.S. Provisional Application No. 63/284,993, filed on Dec. 1, 2021, the entire contents of which are hereby incorporated by reference for all purposes as if fully set forth herein.

TECHNICAL FIELD

This disclosure relates generally to audio processing, and more specifically to encoding spatial cues into audio content.

BACKGROUND

Audio content may be encoded to include spatial properties of a sound field, allowing users to perceive a spatial sense in the sound field. For example, audio of a particular sound source (e.g., such as a voice or instrument) may be mixed into audio content in a manner that creates a spatial sense associated with the audio, such as the perception that the audio is arriving at the user from a particular direction of arrival or located in a particular type of location (e.g., small room, large auditorium, etc.)

SUMMARY

Some embodiments include a method for encoding spatial cues along a sagittal plane into a monaural signal to generate a plurality of resulting channels. The method includes, by a processing circuitry, determining a target amplitude response for mid- or side-components of the plurality of resulting channels, based upon a spatial cue associated with a frequency-dependent phase shift; converting the target amplitude response for either the mid or side components into a transfer function for a single-input, multi-output allpass filter; and processing the monaural signal using the allpass filter, wherein the allpass filter is configured based upon the transfer function.

Some embodiments include a system for generating a plurality of channels from a monaural channel, wherein the plurality of channels are encoded with one or more spatial cues. The system includes one or more computing devices configured to determine a target amplitude response for mid- or side-components of the plurality of channels, based upon a spatial cue associated with a frequency-dependent phase shift. The one or more computers are further configured to convert the target amplitude response for either the mid or side components into a transfer function for a single-input, multi-output allpass filter, and to process the monaural signal using the allpass filter, wherein the allpass filter is configured based upon the transfer function.

Some embodiments include a non-transitory computer readable medium including stored instructions for generating a plurality of channels from a monaural channel, wherein the plurality of channels are encoded with one or more spatial cues, the instructions that, when executed by at least one processor, configure the at least one processor to: determine a target amplitude response for mid- or side-components of the plurality of resulting channels, based upon a spatial cue associated with a frequency-dependent phase shift; convert the target amplitude response for either the mid or side components into a transfer function for a single-input, multi-output allpass filter; and process the monaural signal using the allpass filter, wherein the allpass filter is configured based upon the transfer function.

Some embodiments relate to spatially shifting a portion of audio content (e.g., a voice) using a series of Hilbert Transforms. Some embodiments include one or more processors and a non-transitory computer readable medium. The computer readable medium includes stored program code that when executed by the one or more processors, configures the one or more processors to: separate an audio channel into a low frequency component and a high frequency component; apply a first Hilbert Transform to the high frequency component to generate a first left leg component and a first right leg component, the first left leg component being 90 degrees out of phase with respect to the first right leg component; apply a second Hilbert Transform to the first right leg component to generate a second left leg component and a second right leg component, the second left leg component being 90 degrees out of phase with respect to the second right leg component; combine the first left leg component with the low frequency component to generate a left channel; and combine the second right leg component with the low frequency component to generate a right channel.

Some embodiments include non-transitory computer readable medium including stored program code. The program code when executed by one or more processors configures the one or more processors to: separate an audio channel into a low frequency component and a high frequency component; apply a first Hilbert Transform to the high frequency component to generate a first left leg component and a first right leg component, the first left leg component being 90 degrees out of phase with respect to the first right leg component; apply a second Hilbert Transform to the first right leg component to generate a second left leg component and a second right leg component, the second left leg component being 90 degrees out of phase with respect to the second right leg component; combine the first left leg component with the low frequency component to generate a left channel; and combine the second right leg component with the low frequency component to generate a right channel.

Some embodiments include a method performed by one or more processors. The method includes: separating an audio channel into a low frequency component and a high frequency component; applying a first Hilbert Transform to the high frequency component to generate a first left leg component and a first right leg component, the first left leg component being 90 degrees out of phase with respect to the first right leg component; applying a second Hilbert Transform to the first right leg component to generate a second left leg component and a second right leg component, the second left leg component being 90 degrees out of phase with respect to the second right leg component; combining the first left leg component with the low frequency component to generate a left channel; and combining the second right leg component with the low frequency component to generate a right channel.

BRIEF DESCRIPTION OF THE DRAWINGS

FIG. 19 is a flowchart of a process for PSM processing using a Hilbert Transform Perceptual Soundstage Modification (HPSM) Module, in accordance with one or more embodiments.

FIG. 20 is a flowchart of another process for PSM processing using a First Order Non-Orthogonal Rotation-Based Decorrelation (FNORD) filter network, in accordance with some embodiments.

Figure 1:
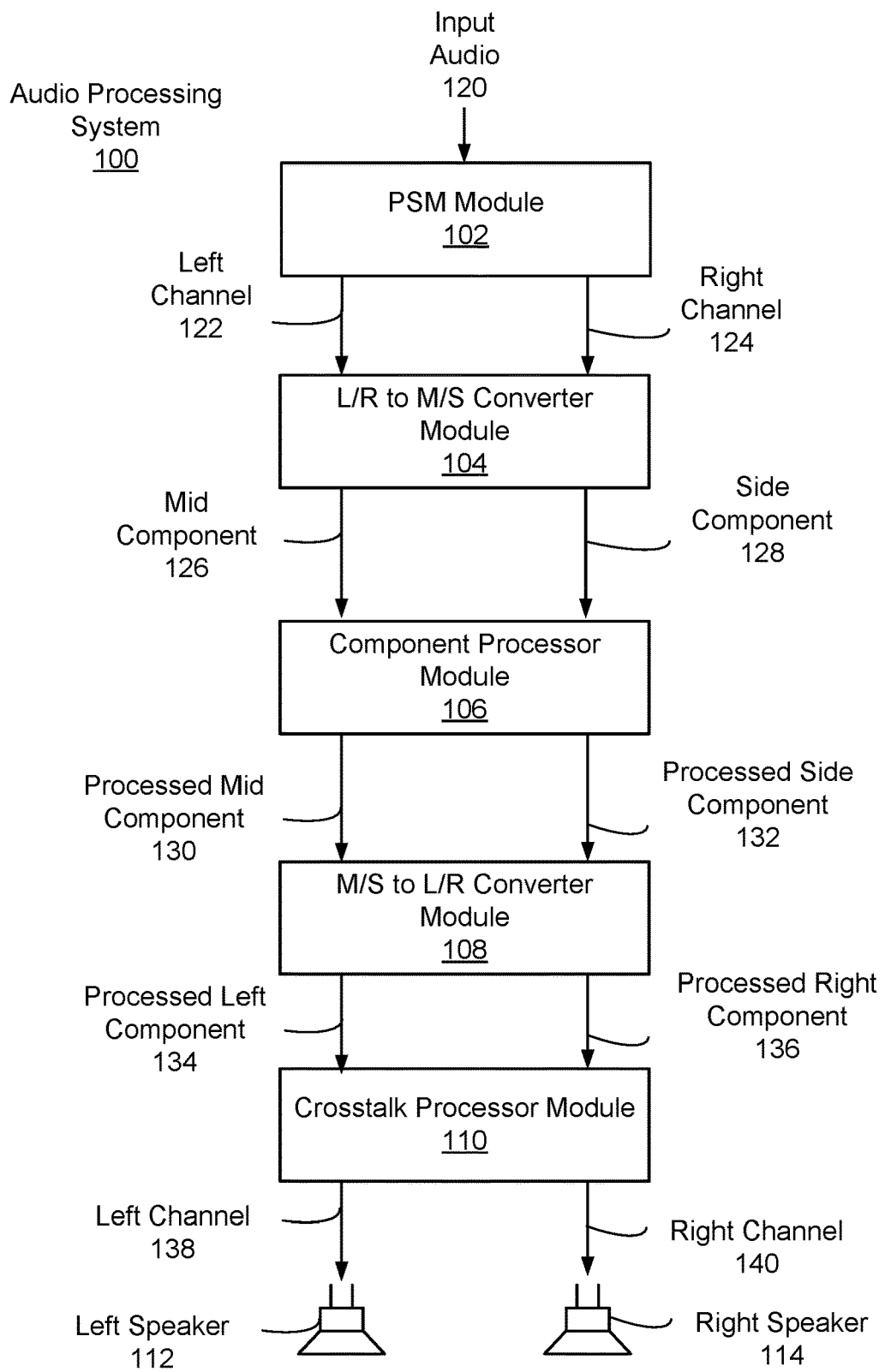
FIG. 1 is a block diagram of an audio processing system, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The encoding of spatial perceptual cues into a monaural audio source may be desirable in various applications involving the presentation of multiple simultaneous streams of audible content. Examples of such application include:

Conferencing use-cases—where the addition of spatial perceptual cues applied to one or more remote talkers can help to improve overall voice intelligibility and enhance the listener's overall sense of immersion.

Video and music playback/streaming use-cases—where one or more audio channels, or signal components of one or more audio channels, can be enhanced via the addition of spatial perceptual cues to improve the intelligibility or spatial sense of the voice or other elements of the mix.

Co-watching entertainment use-cases—where the streams are individual channels of content such as one or more remote talkers and entertainment program material, which must be mixed together to form an immersive experience, and applying spatial perceptual cues to one or more elements can increase the sense of perceptual differentiation between elements of the mix, broadening the perceptual bandwidth of the listener.

Embodiments relate to an audio system that modifies the perceived spatial quality (e.g., sound stage and overall location in reference to a target listener's head) of one or more channels of audio. In some embodiments, modifying the perceived spatial quality of an audio channel may be used to separate the coloration of a particular source from its perceived location in space, and/or to reduce the number of required amplifiers and speakers required to encode such an effect.

The audio signal processing performed by the audio system is referred to as perceptual soundstage modification (PSM) processing. The perceived result of the PSM processing is referred to herein as a spatial shifting. The psychoacoustic effect is typically experienced by users as an overall shifting of a sound source above, around, or towards the head, differentiating the sound source perceptually from other portions of the audio content. This psychoacoustic effect is derived from phase and time relationships between the left and right channels as enhanced by a network of allpass filters and delays. In some embodiments, this filter and delay network may be implemented as one or more second-order allpass sections, such as a series of Hilbert Transforms, or using a First Order Non-Orthogonal Rotation-Based Decorrelation (FNORD) filter network, each of which will be described in greater detail below. The perceived result of the PSM processing can vary depending on different listening configurations (e.g., headphones or loudspeakers, etc.). For some content and algorithm configurations, the result may also create the impression of the perceived signal being spread (e.g., diffused) around the listener's head. For mono input signals (e.g., non-spatial audio signals), the diffused effect of the PSM processing can be used for mono to stereo upmixing.

In some embodiments, the audio system may isolate a target portion of the audio signal from a residual portion of the audio signal, apply various configurations of PSM processing to perceptually shift the target portion, and mix the processed results back with that residual portion (e.g., which may be unprocessed or differently processed). Such a system can be perceived as clarifying, elevating, or otherwise differentiating the target portion within the overall audio mix. In some embodiments, the PSM processing is used to perceptually shift a portion of an audio signal that includes a sung or spoken voice. By convention, the voice in TV, cinematic, or musical audio streams are often positioned at the center of the soundstage, and thus part of the mid component (also referred to as the non-spatial or correlated component) of a stereo or multi-channel audio signal. Accordingly, PSM processing may be applied to the mid component of an audio signal, or a hyper mid component including spectral energy of the side component (also referred to as the spatial or non-correlated component) removed from spectral energy of the mid component.

The PSM processing may be combined with other types of processing. For example, the audio system may apply processing to the shifted portion of the audio signal to perceptually transform and differentiate the shifted portion from other components within the mix. These additional types of processing may include one or more of single or multi-band equalization, single or multi-band dynamics processing (e.g., limiting, compression, expansion, etc.), single or multi-band gain or delay, crosstalk processing (e.g., crosstalk cancellation and or crosstalk simulation processing), or compensation for the crosstalk processing. In some embodiments, PSM processing may be performed with mid/side processing, such as subband spatial processing where subbands of mid and side components of an audio signal generated via PSM processing are gain adjusted to enhance the spatial sense of the sound field.

Isolation of an audio channel for PSM processing may be achieved in various ways. In some embodiments, PSM processing may be performed on spectrally orthogonal sound components, such as the hyper mid component of an audio signal. In other embodiments, PSM processing is performed on an audio channel associated with a sound source (e.g., a voice) and the processed channel is subsequently mixed with other audio content (e.g., background music).

While the discussion below primarily focuses on the upmixing of a mono signal to stereo (i.e., two output channels), due to a large percentage of audio presentation devices being stereo, it is understood that the discussed techniques can easily be generalized to include larger numbers of channels. Stereo embodiments may be discussed in terms of mid/side processing, where differences in phase between left and right channels become complementary regions of amplification and attenuation in mid/side space.

Example Audio Processing System

FIG. 1 is a block diagram of an audio processing system 100, in accordance with one or more embodiments. The system 100 uses PSM processing to spatially shift an audio signal, and applies other types of spatial (e.g., mid/side) processing. Some embodiments of the system 100 have different components than those described here. Similarly, in some cases, functions can be distributed among the components in a different manner than is described here.

The system 100 includes the PSM module 102, an L/R to M/S converter module 104, a component processor module 106, an M/S to L/R converter module 108, and a crosstalk processor module 108. The PSM module 102 receives the input audio 120 and generates the spatially shifted left channel 122 and the right channel 124. Operations of the PSM 102 in accordance with various embodiments are described in greater detail below in relation to FIGS. 6-11.

The L/R to M/S converter module 104 receives the left channel 122 and the right channel 124 and generates a mid component 126 (e.g., a non-spatial component) and a side component 128 (e.g., spatial component) from the channels 122 and 124. In some embodiments, the mid component 126 is generated based on a sum of the left channel 122 and the right channel 122, and the side component 128 is generated based on a difference between the left channel 122 and the right channel 124. In some embodiments, the transformation of a point in L/R space into one in M/S space may be expressed as follows in accordance with Equation (1):

$$M \equiv \begin{pmatrix} 1 & 1 \\ 1 & -1 \end{pmatrix} \frac{1}{2} \tag{1}$$

while the inverse transformation may be expressed as follows in accordance with Equation (2):

$$L \equiv M^{-1} \equiv \begin{pmatrix} 1 & 1 \\ 1 & -1 \end{pmatrix} \tag{2}$$

It is understood that in other embodiments, other L/R to M/S types of transformations may be used to generate the mid component 126 and the side component 128. In some embodiments, the transformations shown in Equations (1) and (2) may be used instead of the true orthonormal form, where both forward and inverse transformations are scaled by √2, due to a reduction in computational complexity. For ease of discussion, regardless of the specific transformation used, the convention of transforming the coordinates of a row vector by multiplication on the right, and the notation for the transformed coordinates carrying its basis as a label above it will be used, as shown in Equations (3) below:

$$\begin{aligned} \overset{M}{x} &\equiv \begin{pmatrix} \overset{M}{x_1} & \overset{M}{x_2} \end{pmatrix} \equiv \overset{L}{x} M \equiv \overset{L}{x} L^{-1} \\ \overset{L}{x} &\equiv \begin{pmatrix} \overset{L}{x_1} & \overset{L}{x_2} \end{pmatrix} \equiv \overset{M}{x} L \equiv \overset{M}{x} M^{-1} \end{aligned} \quad (3)$$

The component processor module 106 processes the mid component 126 to generate a processed mid component 130 and processes the side component 128 to generate a processed side component 314. The processing on each of the components 126 and 128 may include various types of filtering such as spatial cue processing (e.g., amplitude or delay-based panning, binaural processing, etc.), single or multi-band equalization, single or multi-band dynamics processing (e.g., compression, expansion, limiting, etc.), single or multi-band gain or delay stages, adding audio effects, or other types of processing. In some embodiments, the component processor module 106 performs subband spatial processing and/or crosstalk compensation processing using the mid component 126 and the side component 128. Subband spatial processing is processing performed on frequency subbands of the mid and side components to spatially enhance the audio signal. Crosstalk compensation processing is processing that adjusts for spectral artifacts caused by crosstalk processing, such as crosstalk cancellation for loudspeakers or crosstalk simulation for headphones. The various components that may be included in the component processor module 106 are further described with respect to FIGS. 15-16.

The M/S to L/R converter module 108 receives the processed mid component 130 and the processed side component 132 and generates a processed left component 134 and a processed right component 136. In some embodiments, the M/S to L/R converter module 108 transforms the processed mid and side components 130 and 132 based on an inverse of the transformed performed by the L/R to M/S converter module 104, e.g., the processed left component 134 is generated based on a sum of the processed mid component 130 and the processed side component 132 and the processed right component 136 is generated based on a difference between the processed mid component 130 and the processed side component 132. Other M/S to L/R types of transformations may be used to generate the processed left component 134 and the processed right component 136.

The crosstalk processor module 110 receives and performs crosstalk processing on the processed left component 134 and the processed right component 136. Crosstalk processing includes, for example, crosstalk simulation or crosstalk cancellation. Crosstalk simulation is processing performed on an audio signal (e.g., output via headphones) to simulate the effect of loudspeakers. Crosstalk cancellation is processing performed on an audio signal (e.g., output via loudspeakers) to reduce crosstalk caused by loudspeakers. The crosstalk processor module 110 outputs left channel 138 and a right output channel 140. In some embodiments, crosstalk processing (e.g., simulation or cancellation) may be performed prior to the component processing, such as prior to conversion of the left channel 122 and right channel 124 into mid and side components. The various components that may be included in the crosstalk processor module 110 are further described with respect to FIGS. 17 and 18.

In some embodiments, the PSM module 102 is incorporated into the component processor module 106. The L/R to M/S converter module 104 receives a left channel and a right channel, which may represent the (e.g., stereo) inputs to the audio processing system 100. The L/R to M/S converter module 104 generates a mid component and a side component using the left and right input channels. The PSM module 102 of the component processor module 106 processes the mid component and/or the side component as input, such as discussed herein for the input audio 102, to generate a left and right channel. The component processor module 106 may also perform other types of processing on the mid and side components, and the M/S to L/R converter module 108 generates left and right channels from the processed mid and side components. The left channel generated by the PSM module 102 is combined with the left channel generated by the M/S to L/R converter module 108 to generate the processed left component. The right channel generated by the PSM module 102 is combined with the right channel generated by the M/S to L/R converter module 108 to generate the processed right component.

The system 100 provides the left channel 138 to a left speaker 112 and the right channel 140 to a right speaker 114. The speakers 112 and 114 may be components of a smartphone, tablet, smart speaker, laptop, desktop, exercise machine, etc. The speakers 112 and 114 may be a part of a device that includes the system 100 or may be separate from the system 100, such as connected to the system 100 via a network. The network may include wired and/or wireless connections. The network may include a local area network, a wide area network, (e.g., including the Internet), or combinations thereof.

Figure 2:
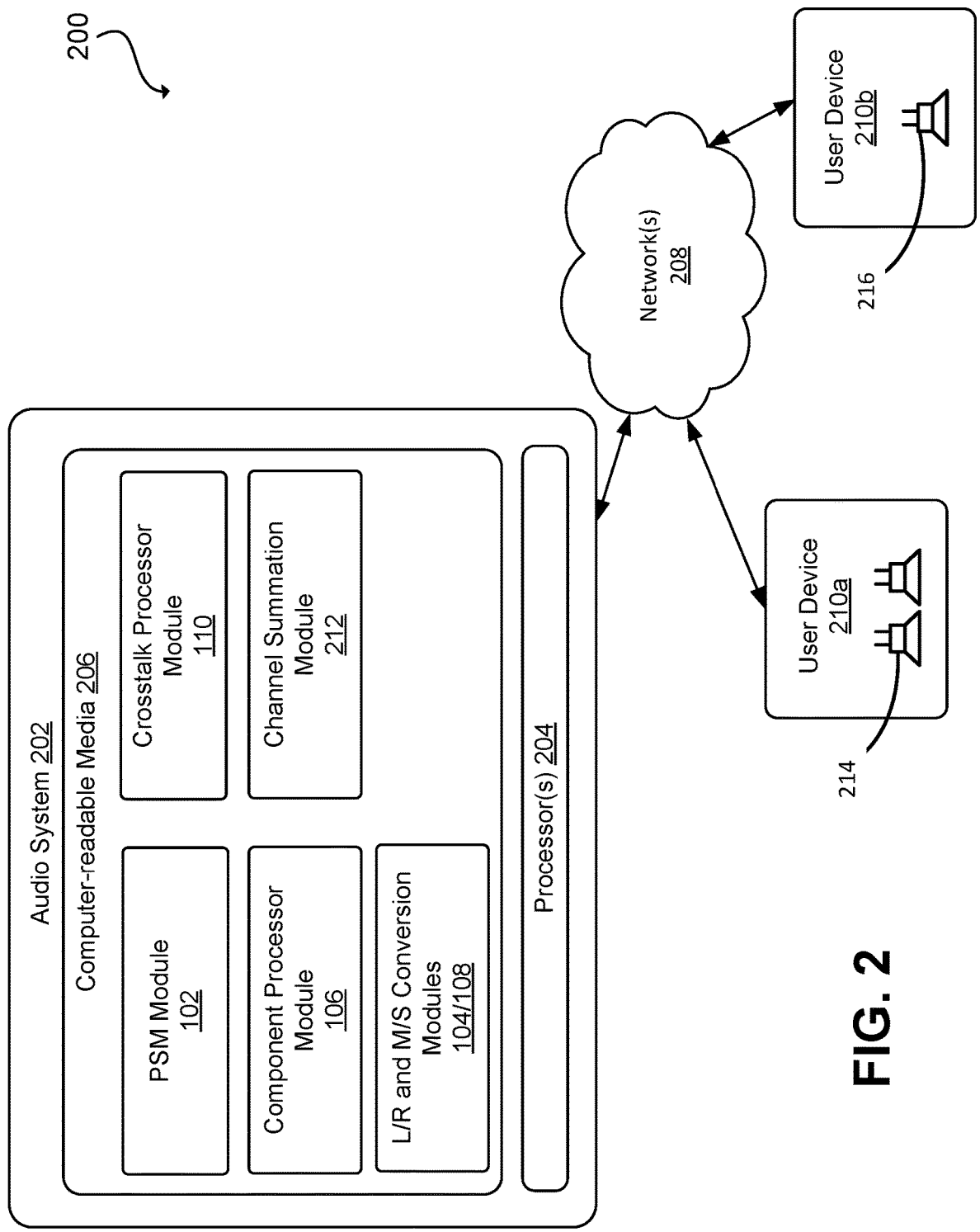
FIG. 2 is a block diagram of a computing system environment, in accordance with some embodiments.

FIG. 2 is a block diagram of a computing system environment 200, in accordance with some embodiments. The computing system 200 may include an audio system 202, which may include one or more computing devices (e.g., servers), connected to user devices 210a and 210b via a network 208. The audio system 202 provides audio content to the user devices 210a and 210b (also individually referred to as user device 210) via the network 208. The network 208 facilitates communication between the system 202 and the user devices 210. The network 106 may include various types of networks, including the Internet.

The audio system 202 includes one or more processors 204 and computer-readable media 206. The one or more processors 204 execute program modules that cause the one or more processors 204 to perform functionality, such as generating multiple output channels from a monaural channel. The processor(s) 204 may include one or more of a central processing unit (CPU), a graphics processing unit (GPU), a controller, a state machine, other types of processing circuitry, or one or more of these in combination. A processor 204 may further include a local memory that stores program modules, operating system data, among other things.

The computer-readable media 206 is a non-transitory storage medium that stores program code for the PSM module 102, the component processor module 106, the crosstalk processor module 110, L/R and M/S conversion modules 104 and 108, and a channel summation module 212. The PSM module 102 generates multiple output channels from a monaural channel, which may be further processed using the component processor module 106, the crosstalk processor module 110, and/or L/R and M/S conversion modules 104 and 108. The system 202 provides the multiple output channels to the user device 210a, which includes multiple speakers 214 to render each of the output channels.

The channel summation module 212 generates a monaural output channel by adding together the multiple output channels generated by the PSM module 102 and/or other modules. The system 202 provides the monaural output channel to the user device 210b, which includes a single speaker 216 to render the monaural output channel. In some embodiments, the channel summation module 212 is located at the user device 210b. The audio system 202 provides the multiple output channels to the user device 210b, which converts the multiple channels into the monaural output channel for the speaker 216. A user device 210 presents audio content to the user. The user device 210 may be a computing device of a user, such as a music player, smart speaker, smart phone, wearable device, tablet, laptop, desktop, or the like.

Mid/Side Space Coloration

In some embodiments, spatial cues are encoded into an audio signal by creating a coloration effect in mid/side space, while avoiding it in left/right. In some embodiments, this is achieved by applying an allpass filter in left/right space, having properties specifically selected to result in a target coloration in mid/side. For example, in two-channel systems, the relationship between left/right phase angle and mid/side gain may be expressed using Equation (4) below:

$$\alpha_\omega^M = \left[ 20\log_{10}\left(2\cos\left(\frac{\theta_\omega^L}{2}\right)\right) 20\log_{10}\left(2\sin\left(\frac{\theta_\omega^L}{2}\right)\right) \right] \quad (4)$$

where $\alpha_\omega^M$ is a 2-dimensional row vector comprised of the mid and side target gain factors, respectively, in decibels, at a particular frequency $\omega$, and $\theta_\omega^L$ is a target function of phase relationships between left and right channels. Solving Equation (4) for $\theta_\omega^L$ provides the desired frequency-dependent phase differential to apply in left/right space, in accordance with Equations (5) and (6) below:

$$\theta_\omega^L = 2\cos^{-1}\left(\frac{10^{\frac{\alpha_{\omega 1}^M}{20}}}{2}\right) \quad (5)$$

$$\theta_\omega^L = 2\sin^{-1}\left(\frac{10^{\frac{\alpha_{\omega 2}^M}{20}}}{2}\right) \quad (6)$$

Note that if the constraint that the system be colorless in left/right space is applied, only either the mid or side component's transfer function can be specified. As such, the system of Equations (5) and (6) is over-determined, where only one of the above equations can be solved without breaking the required symmetry. In some embodiments, selecting a particular equation yields control over either the mid- or side-component. If the constraint that the system be colorless in left/right space were dropped, an additional degree of freedom may be achieved. In systems with more than two channels, different techniques such as pairwise or hierarchical sum and difference transformations may be used in lieu of mid and side.

Example All-Pass Filter Implementations for Encoding Elevation Cues

In some embodiments, spatial perceptual cues may be encoded into an audio signal by embedding frequency-dependent amplitude cues (i.e., coloration) into mid/side space, while constraining the left/right signal to be colorless. For example, elevation cues (e.g., spatial perceptual cues located along a sagittal plane) may be encoded using this framework, since the left/right cues for elevation are theoretically symmetric in coloration.

In some embodiments, a salient feature of Head-Related Transfer Function (HRTF)-based elevation cues is a notch which starts around 8 kHz and rises monotonically as a function of elevation to roughly 16 kHz, which may be used to derive an appropriate coloration of the mid channel with which to encode elevation. Using this mid-encoded cue, a corresponding frequency-dependent phase shift may be derived, which may further be used to derive a function to be implemented via a filter network (e.g., the PSM module 102), such as those described below. In some embodiments, HRTF-based elevation cues may be characterizes as a notch starting at around 8 kHz and rising monotonically as a function of elevation to roughly 12 kHz.

Figure 3:
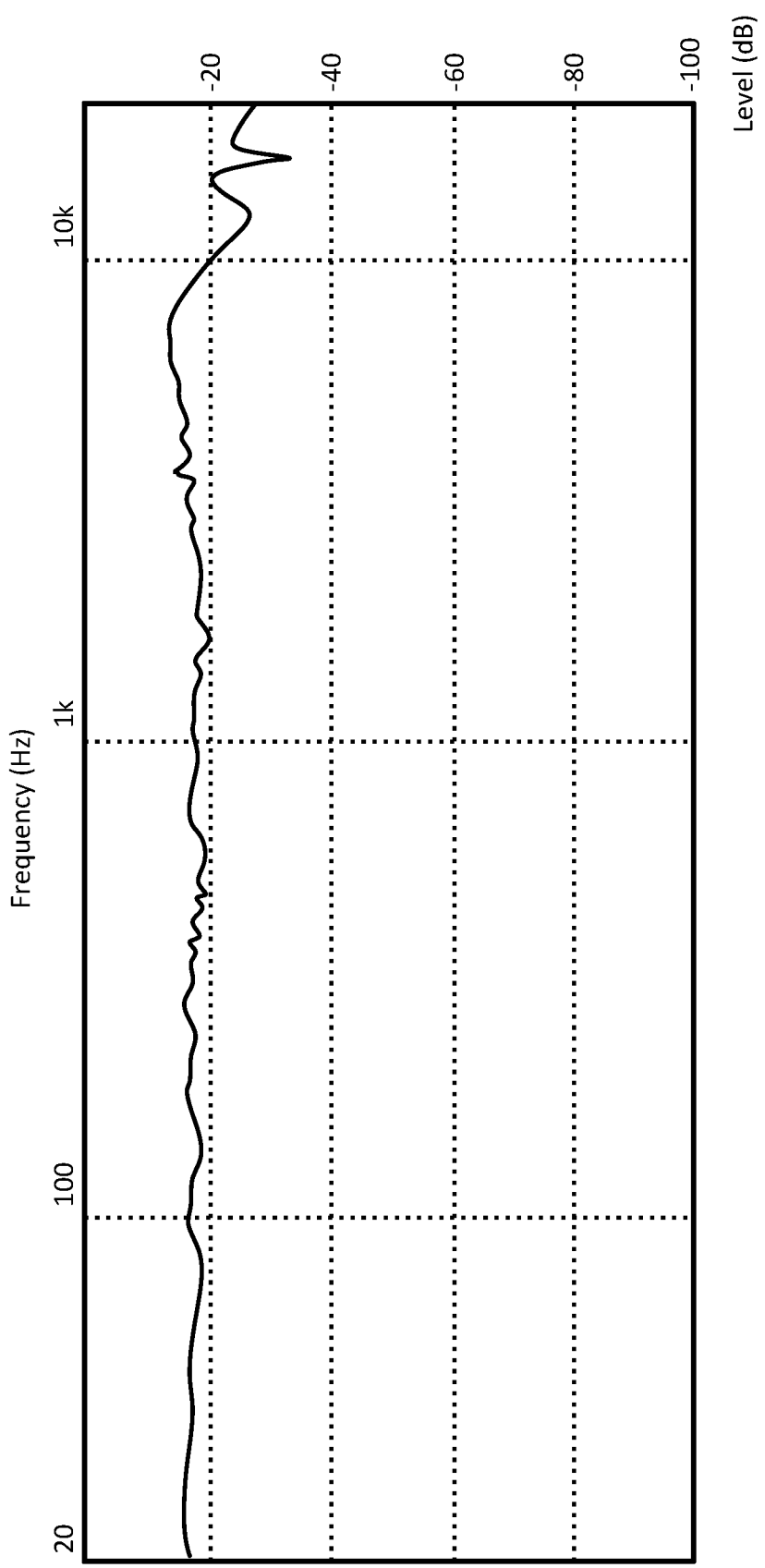
FIG. 3 illustrates a graph showing a sampled HRTF, measured at an elevation of 60 degrees, in accordance with some embodiments.
Figure 4:
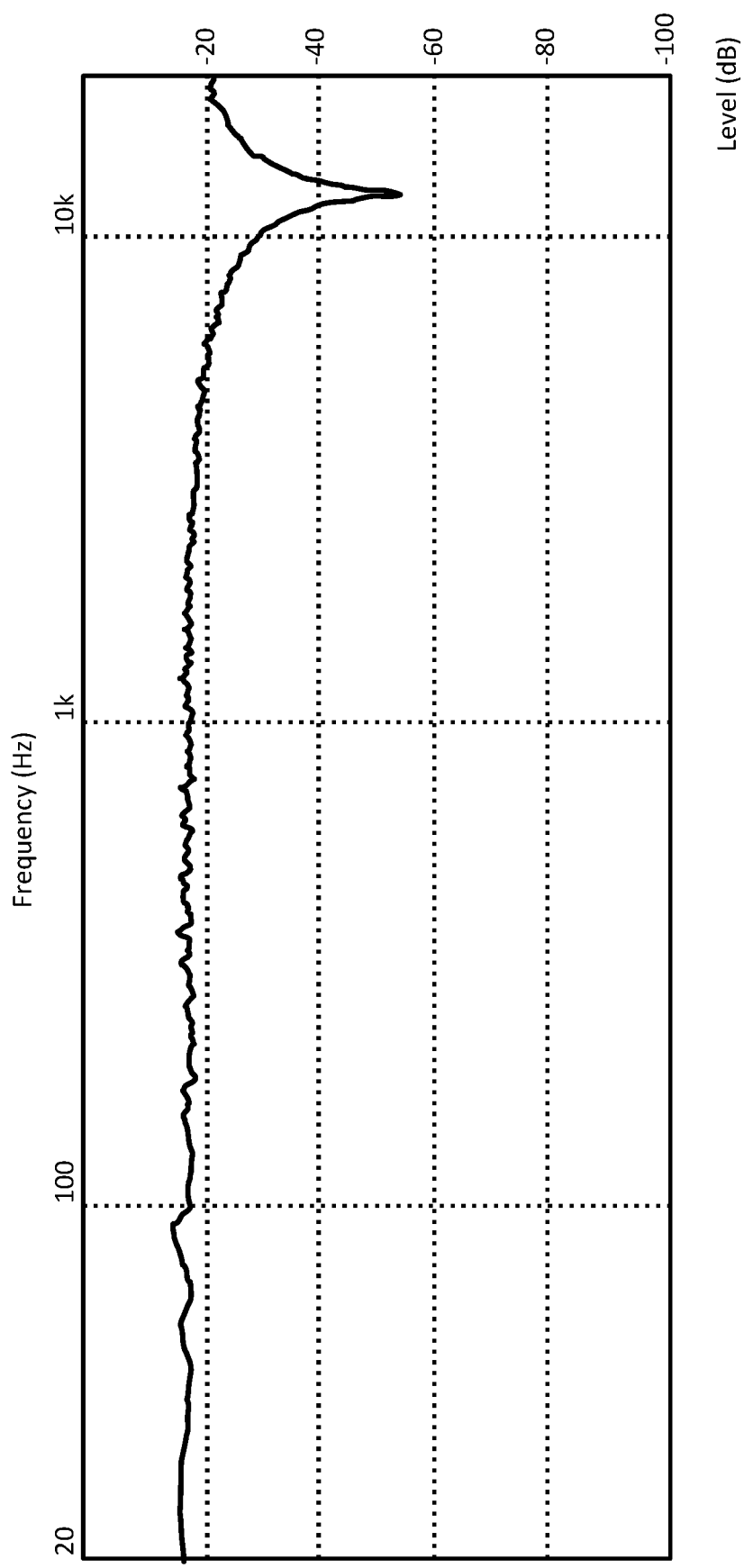
FIG. 4 illustrates a graph showing an example of a perceptual cue characterized by a target magnitude function corresponding to a narrow region of infinite attenuation at 11 kHz, in accordance with some embodiments.

For ease of discussion, the following example filter frameworks are discussed in relation to encoding the same perceptual cue, in accordance with some embodiments, where the target angle of elevation is 60 degrees (e.g., spatially shifting the audio content to 60 degrees above horizontal in the sagittal plane), although it is understood that in other embodiments, similar techniques may be used to encode perceptual cues with different angles of elevation. FIG. 3 illustrates a graph showing a sampled HRTF, measured at an elevation of 60 degrees, in accordance with some embodiments. FIG. 4 illustrates a graph showing an example of a perceptual cue characterized by a target magnitude function corresponding to a narrow region of infinite attenuation at approximately 11 kHz, in accordance with some embodiments. Such cues may be used in producing the perception of elevation in most individuals, across a wide variety of presentation scenarios. While the graph of FIG. 4 illustrates a simplification of a sampled HRTF, it is understood that more complex cues may also be derived based on framework described herein.

Design Using Second-Order Allpass Sections

In some embodiments, the PSM module 102 is implemented using two independent cascades of second-order all-pass filters, plus a delay element, to achieve the desired phase shift in left/right space to encode perceptual cues such as that described above in relation to FIG. 4. In some embodiments, the second-order sections are implemented as biquad sections, wherein the coefficients are applied to feedback and feedforward taps of up to two samples of delay. As discussed herein, the convention of naming feedback coefficients of one and two samples A1 and A2, respectively, and feedforward coefficients of zero, one and two samples B0, B1, and B2, respectively, is used.

In some embodiments, the PSM module 102 is implemented using second-order allpass filters configured to perform cancellation of poles and zeros, to allow the magnitude component of the transfer function to be kept flat while the phase response is altered. By using allpass filter sections on both channels in left/right space, a particular phase shift over the spectrum can be guaranteed. This has the added benefit of allowing for a given phase offset between the left and right, which will result in an increased sense of spatial extend in addition to the desired null in mid/side space.

Table 1 below illustrates an example set of biquad coefficients that may be used in a second-order allpass filter framework having an additional 2-sample delay on the right channel, in accordance with some embodiments. The biquad coefficients illustrated in Table 1 may be designed for a 44.1 kHz sampling rate, but may be used for systems with other sampling rates (e.g., 48 kHz) sampling rate as well.

TABLE 1

| | | | | | | | | |
|---|---|---|---|---|---|---|---|---|
| $B0_{left}$ | 0.161758 | 0.733029 | 0.94535 | 0.990598 | $B0_{right}$ 0.479401 | 0.876218 | 0.976599 | 0.9975 |
| $B1_{left}$ | 0.0 | 0.0 | 0.0 | 0.0 | $B1_{right}$ 0.0 | 0.0 | 0.0 | 0.0 |
| $B2_{left}$ | −1.0 | | | | $B2_{right}$ | | | |
| $A1_{left}$ | 0.0 | 0.0 | 0.0 | 0.0 | $A1_{right}$ 0.0 | 0.0 | 0.0 | 0.0 |
| $A2_{left}$ | −0.161758 | −0.733029 | −0.94535 | −0.990598 | $A2_{right}$ −0.479401 | −0.876218 | −0.976599 | −0.9975 |

Figure 5:
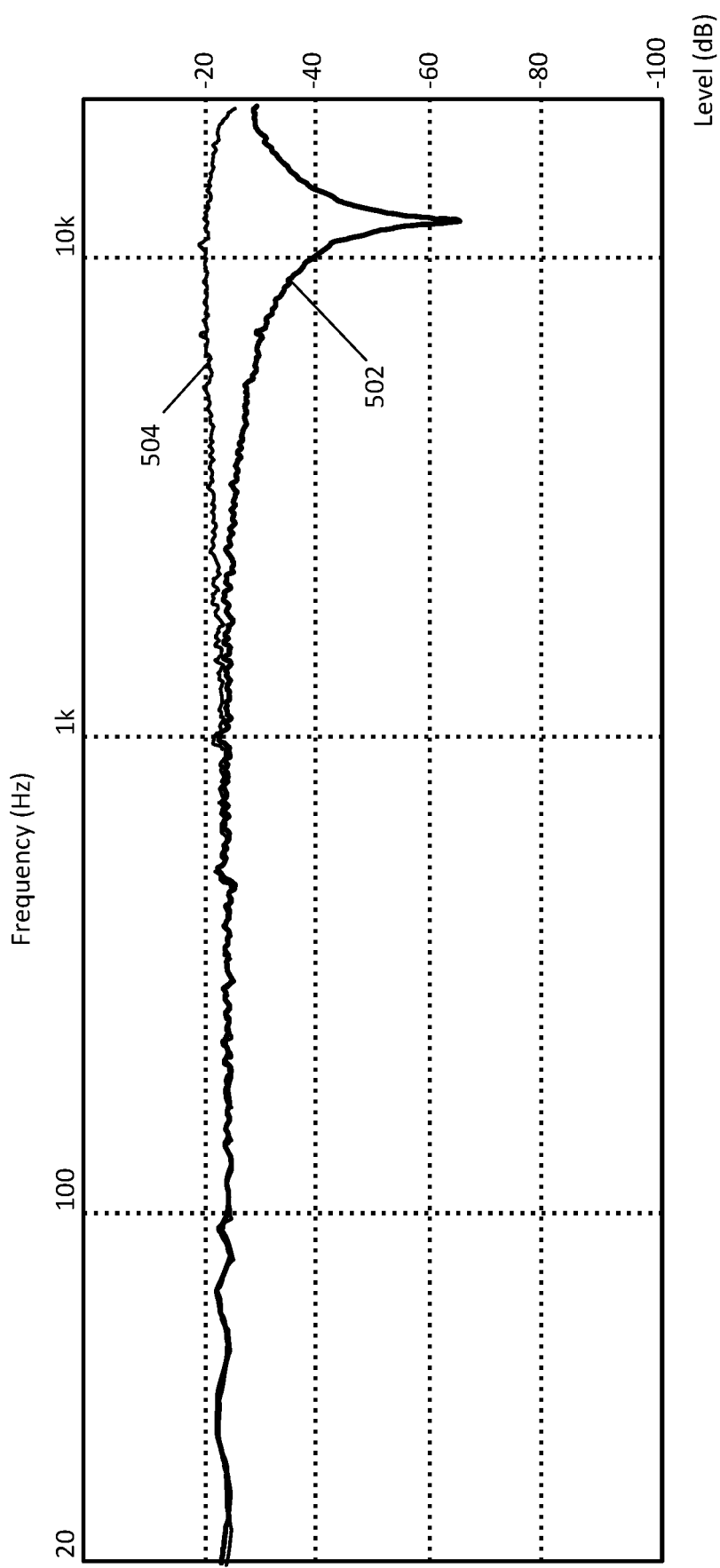
FIG. 5 illustrates a frequency plot generated by driving the second-order allpass filter sections having the coefficients shown in Table 1 with white noise, in accordance with some embodiments.

The network of filters having the coefficients shown in Table 1 may produce an appropriate phase response in left/right space that results in a pronounced null/amplification in mid/side space at 11 kHz. FIG. 5 illustrates a frequency plot generated by driving the second-order allpass filter sections having the coefficients shown in Table 1 with white noise, in accordance with some embodiments, showing an output frequency response of a summation 502 of multiple channels (mid) and a difference 504 of multiple channels (side).

In some embodiments, the PSM module 102 implemented using second-order allpass filter sections may be further augmented with the use of crossover networks to exclude processing on frequency regions that do not require it. The use of a crossover network may increase the flexibility of the embodiment by permitting further processing on the perceptually significant cues, to the exclusion of unnecessary auditory data.

In some embodiments, the PSM module 102 implemented using second-order allpass filter sections may be implemented using a network of serially chained Hilbert Transforms, as will be described in greater detail below.

Example Hilbert Transform Perceptual Soundstage Modification (HPSM) Module

Figure 6:
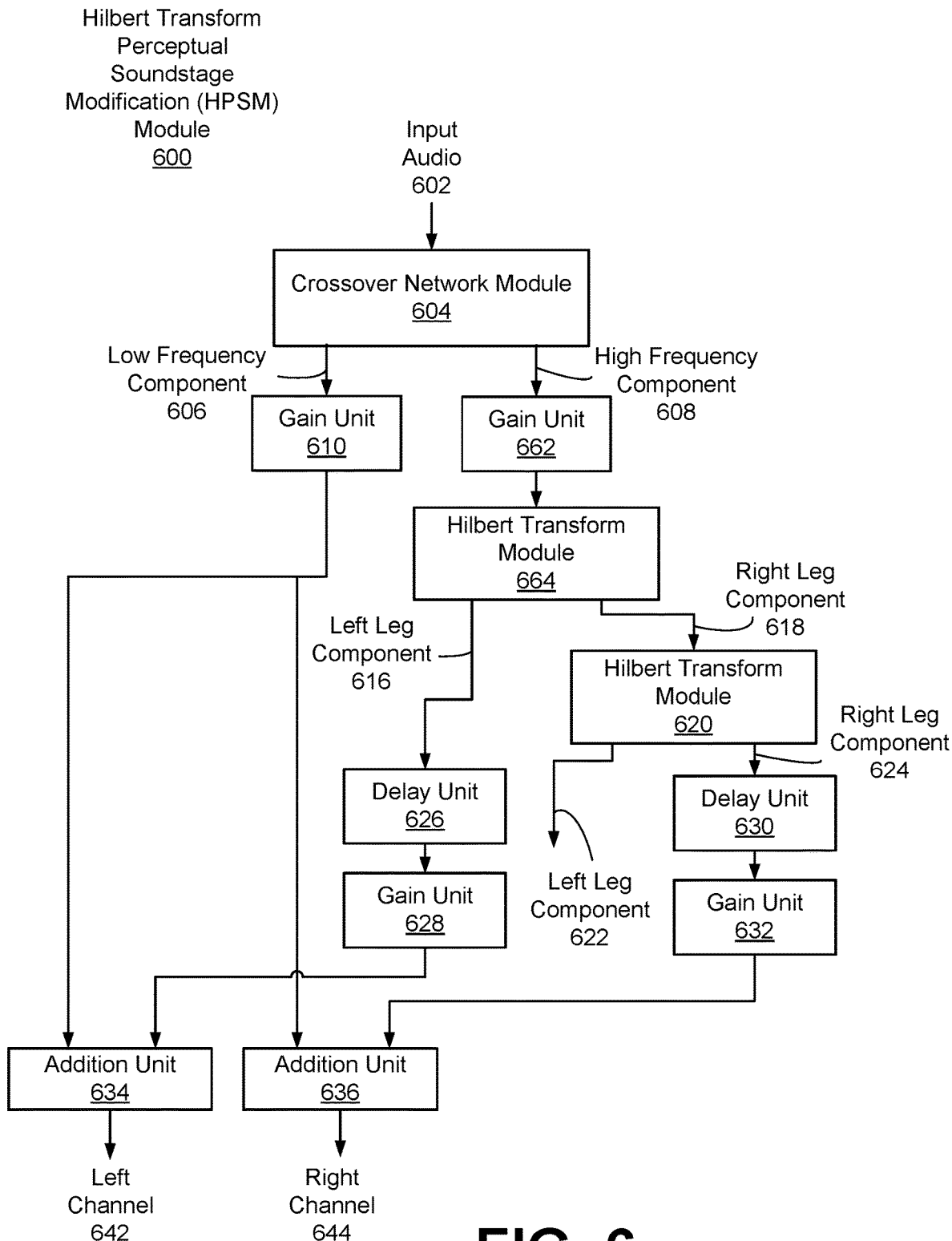
FIG. 6 is a block diagram of a PSM module implemented using Hilbert transforms, in accordance with one or more embodiments.

FIG. 6 is a block diagram of a PSM module implemented using Hilbert transforms, in accordance with one or more embodiments. The PSM module 600, which may also be referred to as a Hilbert Transform Perceptual Soundstage Modification (HPSM) Module, applies a network of serially chained Hilbert Transforms to an input audio 602 (which may correspond to input audio 120 shown in FIG. 1) to perceptually shift the input audio 602.

The module 600 includes a crossover network module 604, a gain unit 610, a gain unit 612, a Hilbert Transform module 614, a Hilbert Transform module 620, a delay unit 626, a gain unit 628, a delay unit 630, a gain unit 632, an addition unit 634, and an addition unit 636. Some embodiments of the module 600 have different components than those described here. Similarly, in some cases, functions can be distributed among the components in a different manner than is described here.

The crossover network module 604 receives the input audio 602 and generates a low frequency component 606 and a high frequency component 608. The low frequency component includes a subband of the input audio 602 having a lower frequency than a subband of the high frequency component 608. In some embodiments, the low frequency component 606 includes a first portion of the input audio including the low frequencies, and the high frequency component 608 includes the remaining portion of the input audio including with the high frequencies.

As discussed in greater detail below, the high frequency component 608 is processed using a series of Hilbert Transforms while the low frequency component 606 bypasses the series of Hilbert Transforms, and then the low frequency component and the processed high frequency component 608 are recombined. The crossover frequency between the frequency component 606 and the high frequency component 608 may be adjustable. For example, more frequencies may be included in the high frequency component 608 to increase the perceptual strength of the spatial shifting by the HPSM module 600, while more frequencies may be included in the low frequency component 606 to reduce the perceptual strength of shifting. In another example, the crossover frequency is set such that frequencies for a sound source of interest (e.g., a voice) are included in the high frequency component 608.

The input audio 602 may include a mono channel or may be a mixdown of a stereo signal or other multi-channel signal (e.g., surround sound, ambisonics, etc.). In some embodiments, the input audio 602 is audio content associated with a sound source that is to be incorporated within an audio mix. For example, the input audio 602 may be a voice that is processed by the module 600 and the processed result is combined with other audio content (e.g., background music) to generate the audio mix.

The gain unit 610 applies a gain to the low frequency component 606 and the gain unit 612 applies a gain to the high frequency component 608. The gain units 610 and 612 may be used to adjust the overall levels of the low frequency component 606 and high frequency component 608 with respect to each other. In some embodiments, the gain unit 610 or gain unit 612 may be omitted from the module 600.

The Hilbert Transform Modules 614 and 620 apply a series of Hilbert Transforms to the high frequency component 608. The Hilbert Transform module 614 applies a Hilbert Transform to the high frequency component 608 to generate a left leg component 616 and a right leg component 618. The left leg component 616 and the right leg component 618 are audio components that are 90 degrees out of phase with respect to each other. In some embodiments, the left leg component 616 and right leg component 618 are out of phase with respect to each other at an angle other than 90 degrees, such as between 20 degrees to 160 degrees.

The Hilbert Transform module 620 applies a Hilbert Transform to the right leg component 618 generated by the Hilbert Transform module 614 to generate a left leg component 122 and a right leg component 624. The left leg component 622 and the right leg component 624 are audio components that are 90 degrees out of phase with respect to each other. In some embodiments, Hilbert Transform module 620 generates the right leg component 624 without generating the left leg component 122. In some embodiments, the left leg component 622 and right leg component 624 are out of phase with respect to each other at an angle other than 90 degrees, such as between 20 degrees to 160 degrees.

In some embodiments, each of the Hilbert Transform modules 614 and 620 is implemented in the time-domain and includes cascaded allpass filters and a delay, as discussed in greater detail below in connection with FIG. 7. In other embodiments, the Hilbert Transform modules 614 and 620 are implemented in the frequency domain.

The delay unit 626, gain unit 628, delay unit 630, and gain unit 632 provide tuning controls for manipulating the perceptual results of the process by the module 600. The delay unit 626 applies a time delay to the left leg component 616 generated by the Hilbert Transform module 614. The gain unit 628 applies a gain to the left leg component 616. In some embodiments, the delay unit 626 or gain unit 628 may be omitted from the module 600.

The delay unit 630 applies a time delay to the right leg component 624 generated by the Hilbert Transform module 620. The gain unit 632 applies a gain to the right leg component 624. In some embodiments, the delay unit 630 or gain unit 632 may be omitted from the module 600.

The addition unit 634 combines the low frequency component 606 with the left leg component 616 to generate the left channel 642. The left leg component 616 is an output from the first Hilbert Transform module 614 in the series. The left leg component 616 may include a delay applied by the delay unit 626 and a gain applied by the gain unit 628.

The addition unit 636 combines the low frequency component 606 with the right leg component 624 to generate the right channel 644. The right leg component 624 is an output from the second Hilbert Transform module 620 in the series. The right leg component 624 may include a delay applied by the delay unit 626 and a gain applied by the gain unit 628.

Figure 7:
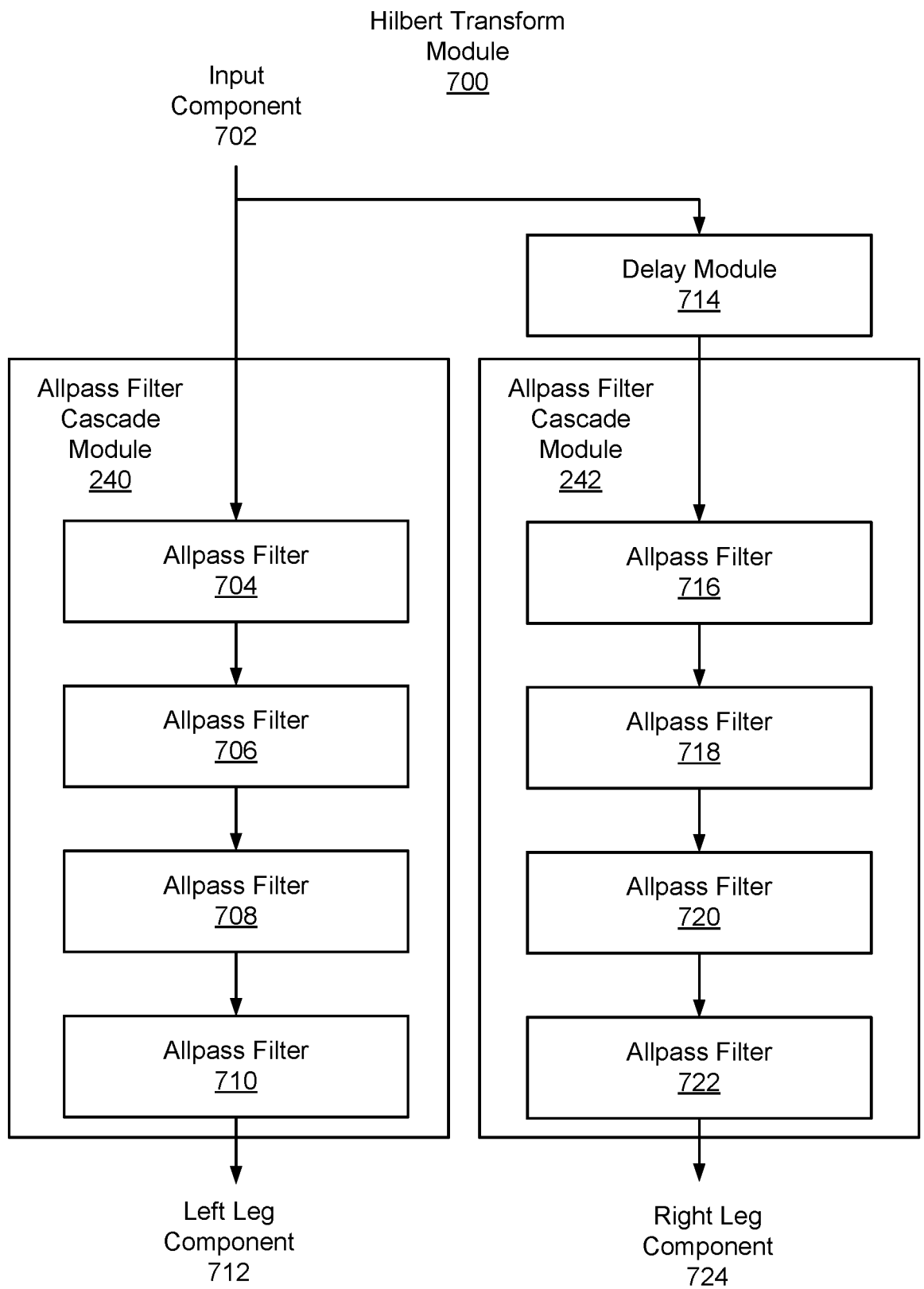
FIG. 7 is a block diagram of a Hilbert Transform module, in accordance with one or more embodiments.

FIG. 7 is a block diagram of a Hilbert Transform module 700, in accordance with one or more embodiments. The Hilbert Transform module 700 is an example of the Hilbert Transform module 614 or Hilbert Transform module 620. The Hilbert Transform module 700 receives an input component 702 and generates a left leg component 712 and a right leg component 724 using the input component 702. Some embodiments of the Hilbert Transform module 700 have different components than those described here. Similarly, in some cases, functions can be distributed among the components in a different manner than is described here.

The Hilbert Transform module 700 includes an allpass filter cascade module 740 to generate the left leg component 712 and a delay unit 714 and allpass filter cascade module 742 to generate the right leg component 724. The allpass filter cascade module 714 includes a series of allpass filters 704, 706, 708, and 710. The delay unit 714 applies a time delay to the input component 702. The allpass filter cascade module 742 include a series of allpass filters 716, 718, 720, and 722. Each of the allpass filters 704 through 710 and 716 through 722 pass frequencies equally in gain while changing the phase relationship among different frequencies. In some embodiments, each allpass filter 704 through 710 and 716 through 722 is a biquad filter as defined by Equation (7):

$$H(z) = \frac{b_0 + b_1 z^{-1} + b_2 z^{-2}}{a_0 + a_1 z^{-1} + a_2 z^{-2}} \quad (7)$$

where z is a complex variable, and $a_0$, $a_1$, $a_2$, $b_0$, $b_1$, and $b_2$ are digital filter coefficients. Different biquad filters may include different coefficients to apply different phase changes.

The allpass filter cascade modules 740 and 742 may each include different numbers of allpass filters. The Hilbert Transform module 700 is an 8th order filter with eight allpass filters, four for each of the left leg component 712 and right leg component 724. In other embodiments, the Hilbert Transform module 700 is an 8th order filter (e.g., four allpass filters for each of the allpass filter cascade modules 740 and 742) or a 6th order filter (e.g., three allpass filters for each of the allpass filter cascade modules 740 and 742).

As discussed above in connection with FIG. 6, the module 600 includes a series of Hilbert Transform modules 614 and 620. Using the Hilbert Transform module 700 for each of the Hilbert Transform modules 614 and 620, the left leg component 616 is generated by one allpass filter cascade module 740 applied to the high frequency component 608. The right leg component 624 is generated by two passes through the Hilbert Transform module 700, by two of the delay units 714 and two of the allpass filter cascade modules 742. In some embodiments, the Hilbert Transform module 614 and 620 may be different. For example, the Hilbert Transform modules 614 and 620 may include different order filters, such as an 8th order filter for one of the Hilbert Transform modules and a 6th order filter for another one of the Hilbert Transform modules.

Using the Hilbert Transform module 700 for the Hilbert Transform modules 614 and 620, the right leg component 624 includes phase and delay relationship with the right leg component 618 created by allpass filters and delay of the Hilbert Transform module 620. The right leg component 624 also includes phase and delay relationships with the high frequency component 608 created by the allpass filters and delays of the Hilbert Transform modules 614 and 620. In some embodiments, the Hilbert Transform module 620 generates the left leg component 622 and right leg component 624 using the left leg component 616 rather than the right leg component 618. This results in the right leg component 624 having a phase and delay relationship with the high frequency component 608 created by the allpass filters (e.g., and no delay) of the Hilbert Transform 614 and the delay and allpass filters of the Hilbert Transform module 620.

Figure 8:
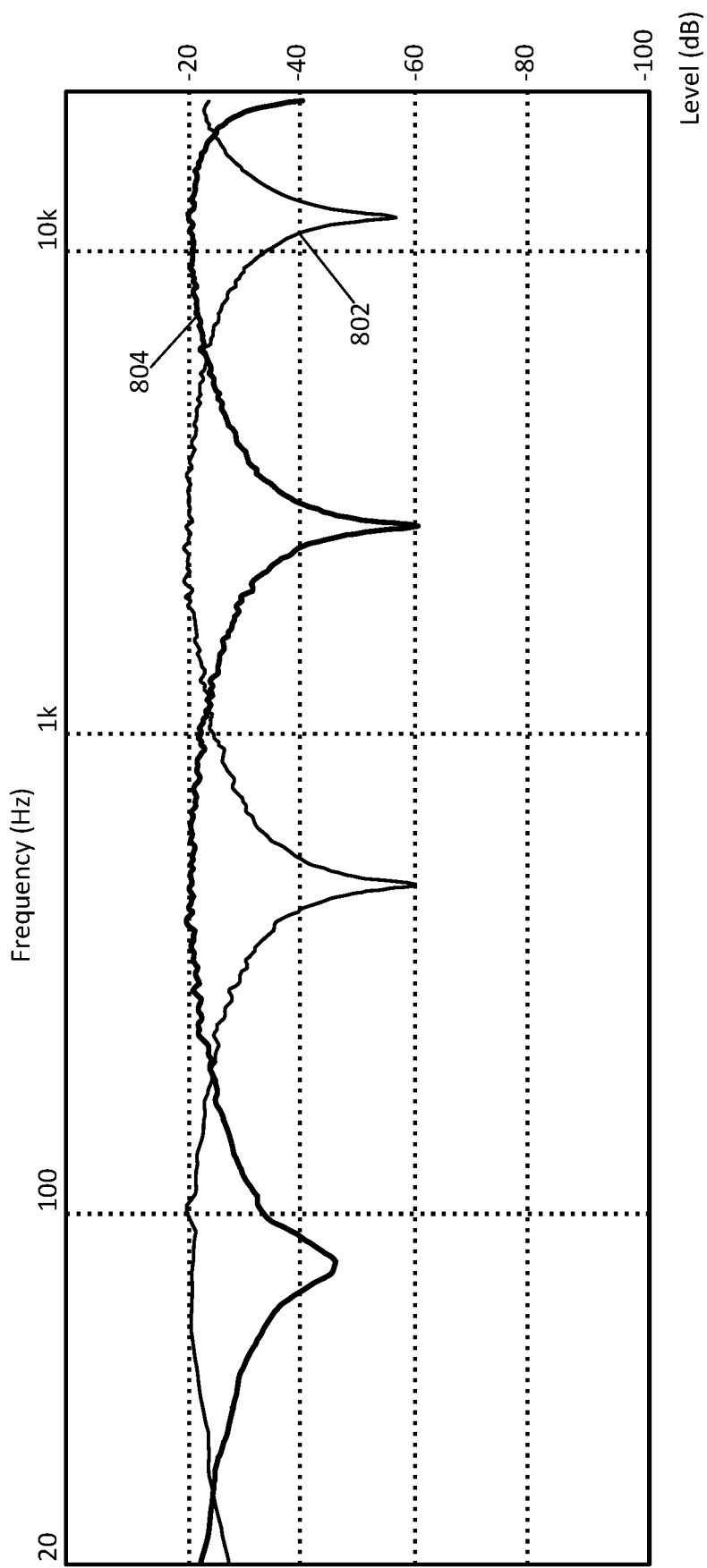
FIG. 8 illustrates a frequency plot generated by driving the HPSM module of FIG. 6 with white noise, in accordance with some embodiments, showing an output frequency response of a summation of multiple channels (mid) and a difference of multiple channels (side).

FIG. 8 illustrates a frequency plot generated by driving the HPSM module (as described in FIG. 6) with white noise, in accordance with some embodiments, showing an output frequency response of a summation 802 of multiple channels (mid) and a difference 804 of multiple channels (side).

As shown in FIG. 8, while this filter indeed produces the desired perceptual cue in the region about 11 kHz, it also imparts additional coloration to the mid and side in lower frequencies. In some embodiments, this can be corrected for by applying a crossover network (such as crossover network module 604 illustrated in FIG. 6) to the input audio, so that the HPSM module only processes audio data within a desired frequency range (e.g., a high frequency component), or by directly removing the pole/zero pairs corresponding to that region of spectral transformation.

Design Using First-Order Non-Orthogonal Rotation-Based Decorrelation (FNORD)

Figure 9:
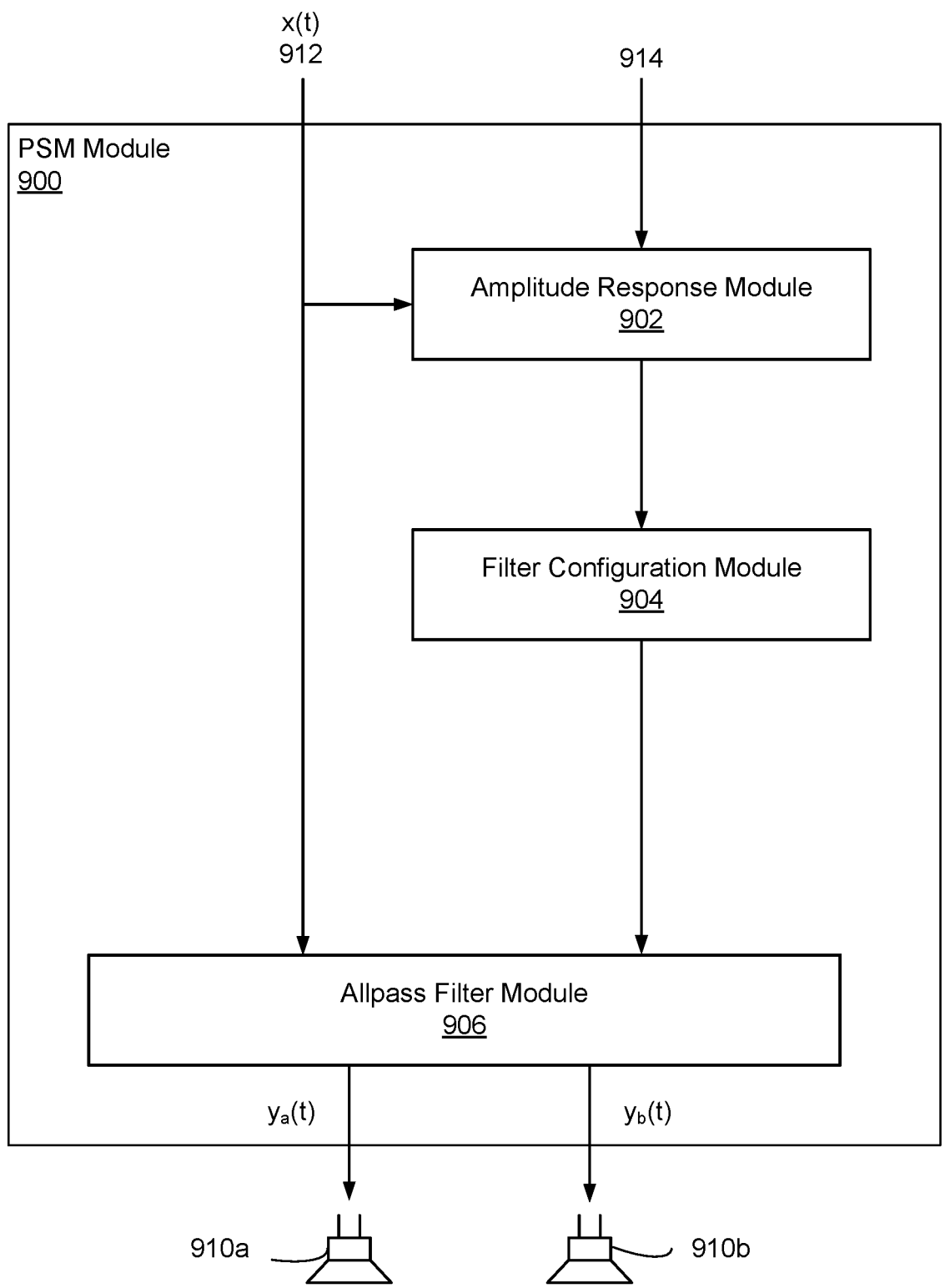
FIG. 9 is a block diagram of a PSM module implemented using an FNORD filter network, in accordance with some embodiments.

In some embodiments, a similar perceptual effect may be achieved using First Order Non-Orthogonal Rotation-Based Decorrelation (FNORD) filter network. FIG. 9 is a block diagram of a PSM module 900 implemented using an FNORD filter network, in accordance with some embodiments. The PSM module 900, which may correspond to the PSM module 102 illustrated in FIG. 1, provides for decorrelating a mono channel into multiple channels, and includes an amplitude response module 902, an allpass filter configuration module 904, and an allpass filter module 906. The PSM module 900 processes an monaural input channel x(t) 912 to generate multiple output channels, such as a channel $y_a(t)$ that is provided to a speaker 910a and a channel $y_b(t)$ that is provided to a speaker 910b (which may correspond to left speaker 112 and right speaker 114 illustrated in FIG. 1). Although two output channels are shown, the PSM module 900 may generate any number of output channels (each referred to as a channel y(t)). The PSM module 900 may be implemented as part of a computing device, such as a music player, speaker, smart speaker, smart phone, wearable device, tablet, laptop, desktop, or the like. Although FIG. 9 illustrates the PSM module 900 as containing the amplitude response module 902 and the filter configuration module 904 in addition to the allpass filter module 906, in some embodiments, PSM module 900 may contain the allpass filter module 906, with the amplitude response module 902 and/or the filter configuration module 904 implemented separately from the PSM module 900.

The amplitude response module 902 determines a target amplitude response defining one or more spatial cues to be encoded into the output channels y(t) (e.g., into the mid- and side-components of the output channels y(t)). The target amplitude response is defined by relationships between amplitude values and frequency values of the channels (e.g., mid- and side-components of the channels), such as amplitude as a function of frequency. In some embodiments, the target amplitude response defines one or spatial cues on the channels, which may include a target broadband attenuation, a target subband attenuation, a critical point, a filter characteristic, or a soundstage location. The amplitude response module 902 may receive data 914 and the monaural channel x(t) 912 and use these inputs to determine the target amplitude response. The data 914 may include information such as characteristics of the spatial cues to be encoded, characteristics of a presentation device (e.g., one or more speakers), expected content of the audio data, or perceptual capacity of the listener in context. In some embodiments, the monaural channel x(t) 912 may correspond to the audio input 120 illustrated in FIG. 1, or a portion of the audio input (e.g., a high frequency component of the input audio, such as high frequency component 608 of input audio 602 illustrated in FIG. 6). In embodiments where the monaural channel x(t) 912 corresponds to a portion of the audio input, the output channels y(t) may be combined with channels corresponding to a remaining portion of the audio input (e.g., with a low frequency component as illustrated in FIG. 6) to generate combined output channels.

Target broadband attenuation is a specification of the attenuation across all frequencies. Target subband attenuation is a specification of the amplitude for a range of frequencies defined by the subband. The target amplitude response may include one or more target subband attenuation values each for a different subband.

A critical point is a specification of the curvature of the target amplitude response of a filter, described as a frequency value at which the gain for one of the output channels (e.g., a side-component of the output channels) is at a predefined value, such as −3 dB or −∞ dB. The placement of this point may have a global effect on the curvature of the target amplitude response. One example of a critical point corresponds with the frequency at which the target amplitude response is −∞ dB. Because the behavior of the target amplitude response is to nullify the signal at frequencies near this point, this critical point is a null point. Another example of a critical point corresponds with the frequency at which the target amplitude response is −3 dB. Because the behavior of the target amplitude response for the summation and difference channels (e.g., mid- and side-components of the channels) intersect at this point, this critical point is a crossover point.

The filter characteristic is a parameter specifying how the mid- and side-components of the channels are to be filtered. Examples of filter characteristics include a high-pass filter characteristic, a low-pass characteristic, a band-pass characteristic, or a band-reject characteristic. The filter characteristic describes the shape of the resulting sum as if it were the result of an equalization filtering. The equalization filtering may be described in terms of what frequencies may pass through the filter, or what frequencies are rejected. Thus, a low-pass characteristic allows the frequencies below an inflection point to pass through and attenuates the frequencies above the inflection point. A high-pass characteristic does the opposite by allowing frequencies above an inflection point to pass through and attenuating the frequencies below the inflection point. A band-pass characteristic allows the frequencies in a band around an inflection point to pass through, attenuating other frequencies. A band-reject characteristic rejects frequencies in a band around an inflection point, allowing other frequencies to pass through.

The target amplitude response may define more than one spatial cue to be encoded into the output channels y(t). For example, the target amplitude response may define spatial cues specified by the critical point and a filter characteristic of the mid or side components of the allpass filter. In another example, the target amplitude response may define spatial cues specified by the target broadband attenuation, the critical point, and the filter characteristic. Although discussed as being as independent specifications, the specifications may be interdependent on one another for most regions of the parameter space. This result may be caused by the system being nonlinear with respect to phase. To address this, additional, higher-level descriptors of the target amplitude response may be devised which are nonlinear functions of the target amplitude response parameters.

The filter configuration module 904 determines properties of a single-input, multi-output allpass filter based on the target amplitude response received from the amplitude response module 902. In particular, the filter configuration module determines a transfer function of the allpass filter based on the target amplitude response and determines coefficients of the allpass filter based on the transfer function. The allpass filter is a decorrelating filter that encodes spatial cues described in terms of a target amplitude response and is applied to the monaural input channel x(t) to generate the output channels $y_a(t)$ and $y_b(t)$.

The allpass filter may include different configurations and parameters based on the spatial cues and/or constraints defined by the target amplitude response. A filter having the target amplitude response of the encoded spatial cues may be colorless, e.g., conserving the spectral content (e.g., entirely) of the individual output channels (e.g., left/right output channels). As such, the filter may be used to encode elevation cues by embedding coloration into mid/side space in the form of frequency-dependent amplitude cues, while preserving spectral content of the left and right signals. Because the filter is colorless, monaural content can be placed at particular locations in the soundstage (e.g., as specified by the target elevation angle), where the spatial placement of the audio is decoupled from its overall coloration.

Figure 10A:
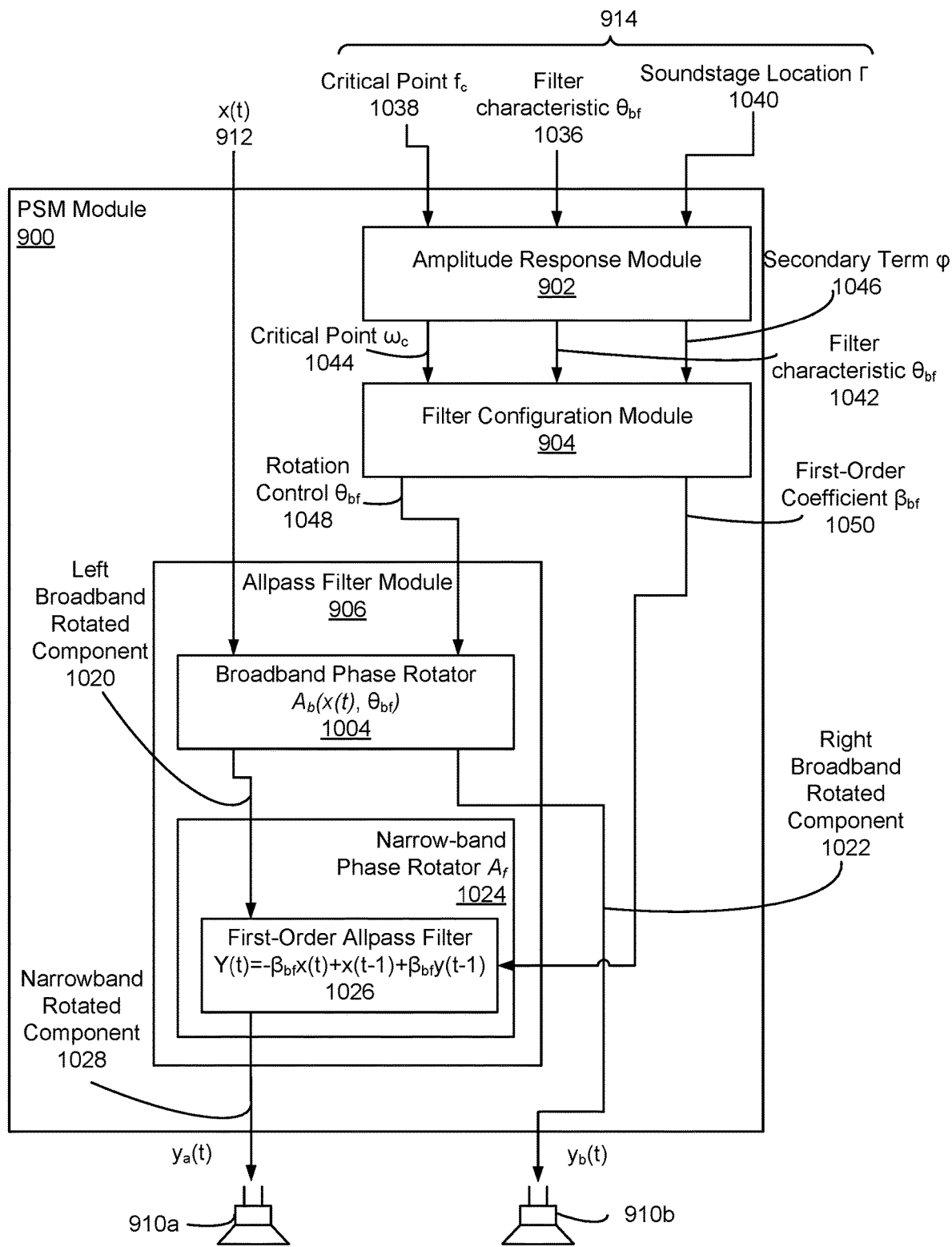
FIG. 10A is a detailed block diagram of a PSM Module 900, in accordance with some embodiments.
Figure 10B:
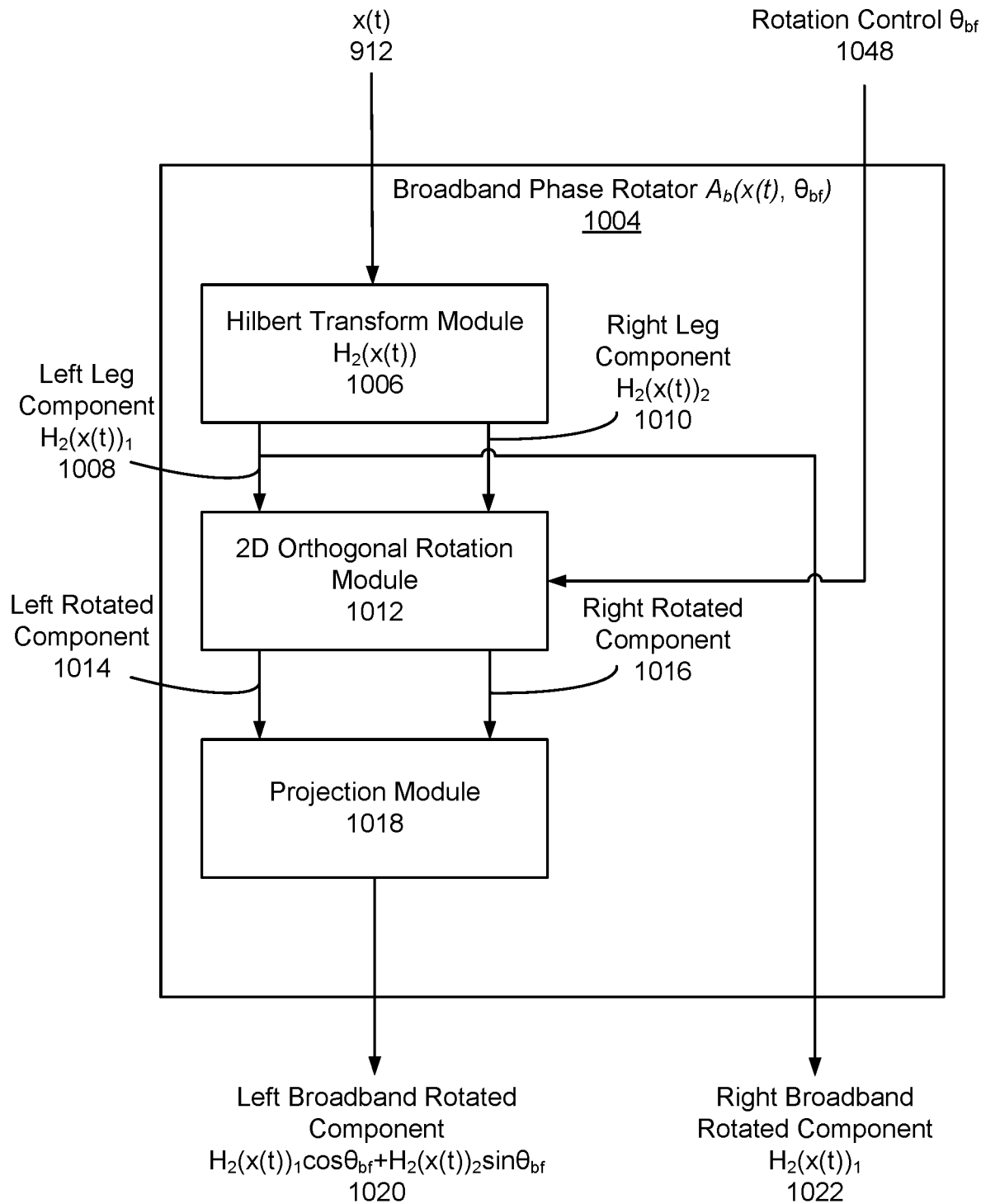
FIG. 10B is a block diagram of a Broadband Phase Rotator implemented within the allpass filter module of the PSM module, in accordance with some embodiments.

FIGS. 10A and 10B are block diagrams of an example PSM Module based on the First Order Non-Orthogonal Rotation-Based Decorrelation (FNORD) technique, in accordance with some embodiments. FIG. 10A shows a detailed view of the PSM module 900, in accordance with some embodiments, while FIG. 10B provides a more detailed view of the broadband phase rotator 1004 within the allpass filter module 906 of the PSM module 900, in accordance with some embodiments.

As in FIG. 10A, the allpass filter module 906 receives information in the form of a monaural input audio signal x(t) 912, a rotation control parameter $\theta_{bf}$ 1048, and a first-order coefficient $\beta_{bf}$ 1050. The input audio signal x(t) 912 and the rotation control parameter $\theta_{bf}$ 1048 are utilized by the broadband phase rotator 1004, which processes the input audio signal 912 using the rotation control parameter $\theta_{bf}$ 1048 to generate a left broadband rotated component 1020 and a right broadband rotated component 1022. The left broadband rotated component 1020 is then provided to the narrow-band phase rotator 1024 for further processing, whereas the right broadband rotated component 1022 is output as the output channel $y_b(t)$ of the PSM module 900 (e.g., as the right output channel), in accordance with some embodiments. The narrow-band phase rotator 1024 receives the left broadband rotated component 1020 from the broadband phase rotator 1004, and the first-order coefficient $\beta_{bf}$ 1050 from the filter configuration module 904, to generate a narrowband rotated component 1028, which is then provided as the output channel $y_a(t)$ of the PSM module 900 (e.g., as the left output channel).

In accordance with some embodiments, control data 914 for configuring the amplitude response module 902 may comprise a critical point $f_c$ 1038, a filter characteristic $\theta_{bf}$ 1036, and a soundstage location $\Gamma$ 1040. This data is provided to the PSM module 900 via the amplitude response module 902, which determines intermediate representations of the data in the form of a critical point (in radians) $\omega_c$ 1044, a filter characteristic $\theta_{bf}$ 1042, and a secondary term $\varphi$ 1046. In some embodiments, the amplitude response module 902 modifies one or more of parameters of the control data 914 (e.g., the critical point $f_c$ 1038, filter characteristic $\theta_{bf}$ 1036, and/or soundstage location $\Gamma$ 1040) based upon one or more parameters of the input audio signal x(t) 912. In some embodiments, such as that shown in FIG. 10A, the filter characteristic $\theta_{bf}$ 1042 is equivalent to the filter characteristic $\theta_{bf}$ 1036. These intermediate representations 1042, 1044, and 1046 are provided to the filter configuration module 904, which generates filter configuration data which may comprise at least a first-order coefficient $\beta_{bf}$ 1050 and a rotation control parameter 1048. The first-order coefficient $\beta_{bf}$ 1050 is provided to the allpass filter module 906 via the first-order allpass filter 1026. In some embodiments, the rotation control parameter $\theta_{bf}$ 1048 may be equivalent to the filter characteristic $\theta_{bf}$ 1036 and 1042, while in others, this parameter may be scaled for convenience. For example, in some embodiments, the filter characteristic is associated with a parameter range (e.g., 0 to 0.5) having a meaningful center point, and rotation control parameter is scaled relative to the filter characteristic to change the parameter range, e.g., to 0 to 1. In some embodiments, the filter characteristic is scaled linearly (e.g., to preserve increased resolution in the poles in comparison to the center point), while in other embodiments, a non-linear mapping may be used (e.g., for increased numerical resolution about the center point). In the equations below, the rotation control parameter $\theta_{bf}$ is treated as unscaled, although it is understood that the same principles may apply when the rotation control parameter is scaled. The rotation control parameter $\theta_{bf}$ 1048 is provided to the allpass filter module 906 via the broadband phase rotator 1004.

FIG. 10B describes in detail an example implementation of the broadband phase rotator 1004, in accordance with some embodiments. The broadband phase rotator 1004 receives information in the form of the monaural input audio signal x(t) 912 and the rotation control parameter $\theta_{bf}$ 1048. The input audio signal x(t) 912 is first processed by the Hilbert transform module 1006 to generate a left leg component 1008 and a right leg component 1010. The Hilbert transform module 1006 module may be implemented using the configuration shown in FIG. 7, in accordance with some embodiments, although it is understood that other implementations of the Hilbert transform module 1006 may be used in other embodiments. The left leg component 1008 and right leg component 1010 are provided to the 2D orthogonal rotation module 1012. The left leg component 1008 is also provided to the output of the broadband phase rotator 1004 as the right broadband rotated component 1022. As the broadband phase rotator 1004 is configured to rotate the left leg and right leg signals relative to each other, one way to accomplish this in some embodiments is to hold the left leg component 1008 constant as the right broadband rotated component 1022, and rotate the left and right leg components to form the left broadband rotated component 1020.

In addition to the left leg component 1008 and the right leg component 1010, the 2D orthogonal rotation module 1012 may also receive a rotation control parameter $\theta_{bf}$ 1048 from the filter configuration module 904, in accordance with some embodiments, as shown in FIG. 10A. The 2D orthogonal rotation module 1012 uses this data to generate the left rotated component 1014 and the right rotated component 1016. The projection module 1018 then receives the left rotated component 1014 and right rotated component 1016, which are combined (e.g., added) to form the left broadband rotated component 1020. As shown in FIG. 10A, the broadband phase rotator 1004 outputs the left broadband rotated component 1020 to the narrow-band phase rotator 1024 for generating the narrowband rotated component 1028 as the left output channel $y_a(t)$ of the PSM module, and the right broadband rotated component 1022 as the right output channel $y_b(t)$ of the PSM module (which bypasses the narrow-band phase rotator 1024 or passes through it unchanged). In other embodiments, the narrowband rotated component 1028 and the left leg component 1008 (which serves as the right broadband rotated component 1022 in the embodiment shown in FIGS. 10A and 10B) are instead mapped to right and left output channels $y_b(t)$ and $y_a(t)$, respectively.

In some embodiments, the PSM module 900 may be described formally via Equation (8) below:

$$fnord(x(t), \theta_{bf}, \beta_{bf}) = \begin{bmatrix} A_f(A_b(x(t), \theta_{bf})_1, \beta_{bf})_1 \\ H_2(x(t))_1 \end{bmatrix}^T \quad (8)$$

In some embodiments, this single-input, multi-output allpass filter is composed of a number of parts, each of which will be explained in turn. In accordance with some embodiments, these components may include $A_f$, $A_b$, and $H_2$.

In accordance with some embodiments, $A_f$ may correspond to the narrow-band phase rotator 1024 in FIG. 10A. $A_f$ is a first-order allpass filter with one channel's output assuming the form of Equation (9):

$$y(t) \equiv -\beta_f x(t) + x(t-1) + \beta_f y(t-1) \quad (9)$$

where $\beta_f$ is a coefficient of the filter that ranges from −1 to +1. The second output of the filter may simply pass through the input unchanged. Thus, in accordance with some embodiments, filter $A_f$ implementation may be defined via Equation (10):

$$A_f(x(t), \beta_f) \equiv [y(t), x(t)] \quad (10)$$

The transfer function of $A_f$ is expressed as the differential phase shift $\vartheta_\omega$ from one output to the other. This differential phase shift is a function of radian frequency $\omega$ as defined by Equation (11):

$$\vartheta_\omega = -\omega + 2\tan^{-1}\left(\frac{\beta_f \sin(\omega)}{1 + \beta_f \cos(\omega)}\right) \quad (11)$$

where the target amplitude response may be derived by substituting $\vartheta_\omega$ for $\theta$ in either Equation (5) or (6), depending on whether the response is to be placed in the mid (Equation (5)) or side (Equation (6)).

The frequency fc at which the summation gain $\alpha f$=3 dB may be used as critical point for tuning is defined by:

$$\omega_c \equiv 2\pi \frac{f_c}{f_s} \quad (12)$$

and $$\beta_f = \frac{\tan\left(\frac{\omega_c}{2}\right) - 1}{\tan\left(\frac{\omega_c}{2}\right) + 1} \quad (13)$$

By normalizing the target amplitude response to 0 dB, this critical point corresponds to the parameter fc, which may be a −3 dB point. In Equation (8), the output of $A_f$ is subscripted to acknowledge that, in accordance with some embodiments, only the first channel's output used.

In Equation (8), $A_b$ is a single-input multi-output allpass filter, which may correspond to the broadband phase rotator 1004 in FIG. 10A. $A_b$ may be formally defined as in Equation (14):

$$A_b(x(t), \theta) = [(H_2(x(t))_1 \cos\theta + H_2(x(t))_2 \sin\theta) H_2(x(t))_1] \quad (14)$$

where $H_2(x(t))$ is a discrete form of the filter, implemented using a pair of quadrature allpass filters, defined using a continuous-time prototype according to Equation (15):

$$H(x(t)) \equiv [H(x(t))_1 H(x(t))_2] \equiv \left[\hat{x}(t) \frac{1}{\pi} \int_{-\infty}^{\infty} \frac{\hat{x}(\tau)}{t-\tau} d\tau\right] \quad (15)$$

In some embodiments, the allpass filter $\mathcal{H}(x((t))$ provides constraints on the 90 degree phase relationship between the two output signals and unity magnitude relationship between the input and both output signals, but does not necessarily guarantee a particular phase relationship between the input (mono) signal and either of the two (stereo) output signals.

The discrete form of $\mathcal{H}(x((t))$ is notated $H_2$ (x(t)), and is defined by its action on the monaural signal x(t). The result is a 2-dimensional vector as defined by Equation (16):

$$H(x(t)) \equiv [H(x(t))_1 H(x(t))_2] \quad (16)$$

The discrete single-input, multi-output allpass filter $H_2$ $(x(t))_2$ may correspond with the Hilbert transform module 1006 in FIG. 10B, and also with the Hilbert transform module 700 in FIG. 7, in accordance with some embodiments. In Equation (14), $\theta$ determines the angle of rotation of the first output of Ab, relative to the second, in accordance with some embodiments.

Finally, the parameters supplied to the complete system $A_{bf}$ in Equation (8) may be determined as follows, in accordance with some embodiments. These parameters may include $\beta_{bf}$ and $\theta_{bf}$, which may correspond with the rotation control parameter $\theta_{bf}$ 1048 and first-order coefficient $\beta_{bf}$ 1050 in FIG. 10A. In some embodiments, $\beta_{bf}$ may be determined from a center radian frequency $\omega_c$ as follows:

$$\beta_{bf} = -\frac{\tan\left(\frac{(\omega_c - \varphi)}{2}\right)}{\left(\tan\left(\frac{(\omega_c - \varphi)}{2}\right)\cos(\omega_c)\right) - \sin(\omega_c)} \quad (17)$$

where $\omega_c$ may be calculated from a desired center frequency $f_c$ using Equation (12). In FIG. 10A, $\omega_c$ corresponds with the critical point $\omega_c$ 1044, $f_c$ with critical point $f_c$ 1038, and the action of Equation (17) partially performed within the filter configuration module 904, resulting in the first-order coefficient $\beta_{bf}$. In some embodiments, the secondary term $\varphi$ 1046 may be derived from $\theta_{bf}$ and a boolean soundstage location parameter $\Gamma$ via Equation (18):

$$\varphi \equiv 2\pi\left(\left(\left(\theta_{bf} + \left(\frac{\Gamma}{2}\right)\right) \% \frac{1}{2}\right) - \frac{1}{2}\right) \quad (18)$$

This secondary term $\varphi$ 1046 is provided to the filter configuration module 904 by the amplitude response module 902 in FIG. 10A.

In some embodiments, the high-level parameters $f_c$, $\theta_{bf}$, and $\Gamma$ may be sufficient for the intuitive and convenient tuning this system. In accordance with such embodiments, the center frequency $f_c$ determines an inflection point in Hz at which the target amplitude response asymptotically approaches −∞ dB. The parameter $\theta_{bf}$ allows for the control over the filter characteristic about the inflection point fc. For $0 < \theta_{bf} < \frac{1}{4}$, the characteristic is low-pass, with a null at $f_c$ and a spectral slope in the target amplitude function that smoothly interpolates from favoring low frequencies to flat, as $\theta_{bf}$ increases. For $\frac{1}{4} < \theta_{bf} < \frac{1}{2}$, the characteristic smoothly interpolates from flat with a null at $f_c$ to high-pass, as $\theta$bf increases. At the point $\theta_{bf} = \frac{1}{4}$, the target amplitude function is purely band-reject, with a null at $f_c$. The parameter $\Gamma$ is a boolean value which places the target amplitude function determined by $f_c$ and $\theta_{bf}$ into either the mid channel (i.e., L+R) or the side channel (i.e., L−R). Due to the allpass constraint on both outputs to the filter network, the action of $\Gamma$ is to toggle between complementary target amplitude responses.

Figure 11:
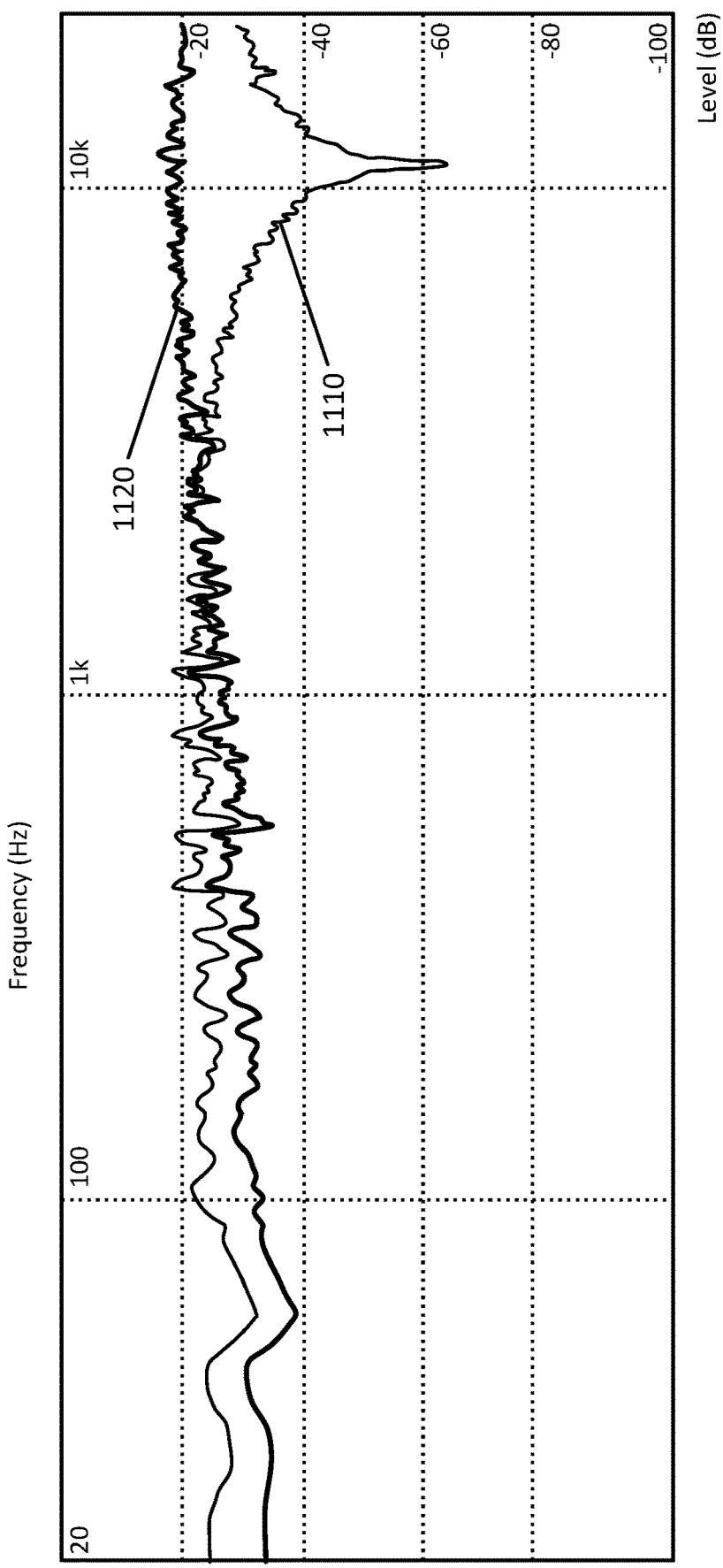
FIG. 11 illustrates a frequency response graph showing the output frequency response of an FNORD filter network configured to achieve an amplitude response for a vertical cue of 60 degrees, in accordance with some embodiments.

In some embodiments, to achieve a amplitude response for a vertical cue of 60 degrees, the FNORD filter network described above may be configured using the parameters $f_c=11$ kHz, $\theta_{bf}=0.13$, and $\Gamma=1$. FIG. 11 illustrates a frequency response graph showing the output frequency response of an FNORD filter network configured to achieve an amplitude response for a vertical cue of 60 degrees, in accordance with some embodiments. FIG. 11 illustrates the output frequency response in the mid-component 1110, and in the side component 1120, where the FNORD filter network is driven by white noise. In some embodiments, the filter parameters $f_c$, $\theta_{bf}$, and/or $\Gamma$ are selected based on analysis of HRTF-based elevation cues at the desired angle.

In some embodiments, the PSM module 900 uses a frequency-domain specification for the allpass filter. For example, in some cases, a more complex spatial cue, e.g., one sampled from anthropometric datasets, may be required. Within certain limitations, the above-described technique may be used to embed an arbitrary cue into the phase differential of the audio stream, based upon the magnitude frequency-domain representation of the cue. For example, the filter configuration module 904 may use equations in the form of Equations (5) or (6) to determine a vectorized transfer function of K phase angles $$\underset{\theta}{L} \equiv \begin{bmatrix} \underset{\theta_1}{L}, \underset{\theta_2}{L}, \dots, \underset{\theta_K}{L} \end{bmatrix}$$

from a vectorized target amplitude response of K narrowband attenuation coefficients in the mid or side:

$$\underset{\alpha}{M} \equiv \begin{bmatrix} \underset{\alpha_1}{M}, \underset{\alpha_2}{M}, \dots, \underset{\alpha_K}{M} \end{bmatrix}.$$

The phase angle vector $\theta$ generates a Finite Impulse Response filter as defined by Equation (19):

$$B_n\left(\begin{bmatrix} \underset{\theta_1}{L} \\ \underset{\theta_2}{L} \\ \vdots \\ \underset{\theta_K}{L} \end{bmatrix}\right) \equiv DFT^{-1}\left(\begin{bmatrix} \cos\left(\underset{\theta_1}{L}\right) + j\sin\left(\underset{\theta_1}{L}\right) \\ \cos\left(\underset{\theta_2}{L}\right) + j\sin\left(\underset{\theta_2}{L}\right) \\ \vdots \\ \cos\left(\underset{\theta_K}{L}\right) + j\sin\left(\underset{\theta_K}{L}\right) \\ \cos\left(\underset{\theta_{K-1}}{L}\right) + j\sin\left(\underset{\theta_{K-1}}{L}\right) \\ \vdots \\ \cos\left(\underset{\theta_2}{L}\right) + j\sin\left(\underset{\theta_2}{L}\right) \end{bmatrix}\right) \quad (19)$$

where $DFT^{-1}$ denotes the inverse Discrete Fourier Transform (idft) and $j \equiv \sqrt{-1}$. The vector of $2(K-1)$ FIR filter coefficients $B_n(\theta)$ may then be applied to $x(t)$ as defined by Equation (20):

$$A_n\left(x(t), \frac{L}{\theta}\right) \equiv \left[B_n\left(\frac{L}{\theta}\right) \circledast x(t), x(t)\right] \quad (20)$$

where $\circledast$ denotes the convolution operation.

To reproduce the effect from the previous examples, and achieve a target amplitude response corresponding to a height cue of 60 degrees, an observed HRIR $h_{60°}$ may be sampled and applied to a DFT of length $2(K-1)$ to result in $\tilde{h}_{60°}$, which may be used to determine a target amplitude response vector $\underset{\alpha}{M}$ (using the following operation:

$$\underset{\alpha}{M}[i] = \sqrt{\Re(\tilde{h}_{60°}[i])^2 + \Im(\tilde{h}_{60°}[i])^2} \; \forall \; i \in (1, 2, \dots, K) \quad (21)$$

where $\Re$ and $\Im$ are operations returning the real and imaginary components of a complex number, respectively, and all operations are applied to the vectors component-wise. This target amplitude response, inserted into either the mid or side, may now be applied to one of Equations (5) or (6) to determine a vector of K phase angles $$\underset{\theta}{L} \equiv \begin{bmatrix} \underset{\theta_1}{L}, \underset{\theta_2}{L}, \dots, \underset{\theta_K}{L} \end{bmatrix},$$

from which an FIR filter B may be derived. This filter is then inserted into Equation (19) to derive the single-input, multi output allpass filter.

While Equations (19) and (20) provide an effective means for constraining the target amplitude response, its implementation will often rely on relatively high-order FIR filters, resulting from an inverse DFT operation. This may be unsuitable for systems with constrained resources. In such cases, a low-order infinite impulse response (IIR) implementation may be used, such as discussed in connection with Equation (8).

The allpass filter module 906 applies the allpass filter as configured by the filter configuration module 904 to the monaural channel $x(t)$ to generate the output channels $y_a(t)$ and $y_b(t)$. Application of the allpass filter to the channel $x(t)$ may be performed as defined by Equation (8), (20), or as depicted in FIG. 9, or FIG. 10A. The allpass filter module 906 provides each output channel to a respective speaker, such as the channel $y_a(t)$ to the speaker 910a and the channel $y_b(t)$ to the speaker 910b. Although not shown in FIG. 9, it is understood that the output channels $y_a(t)$ and $y_b(t)$ may be provided to the speakers 910a and 910b via one or more intervening components (e.g., component processor module 106, crosstalk processor module 110, and/or L/R to M/S converter module and M/S to L/R converter module 104 and 108, as shown in FIG. 1).

Hyper-Mid Processing

Figure 12:
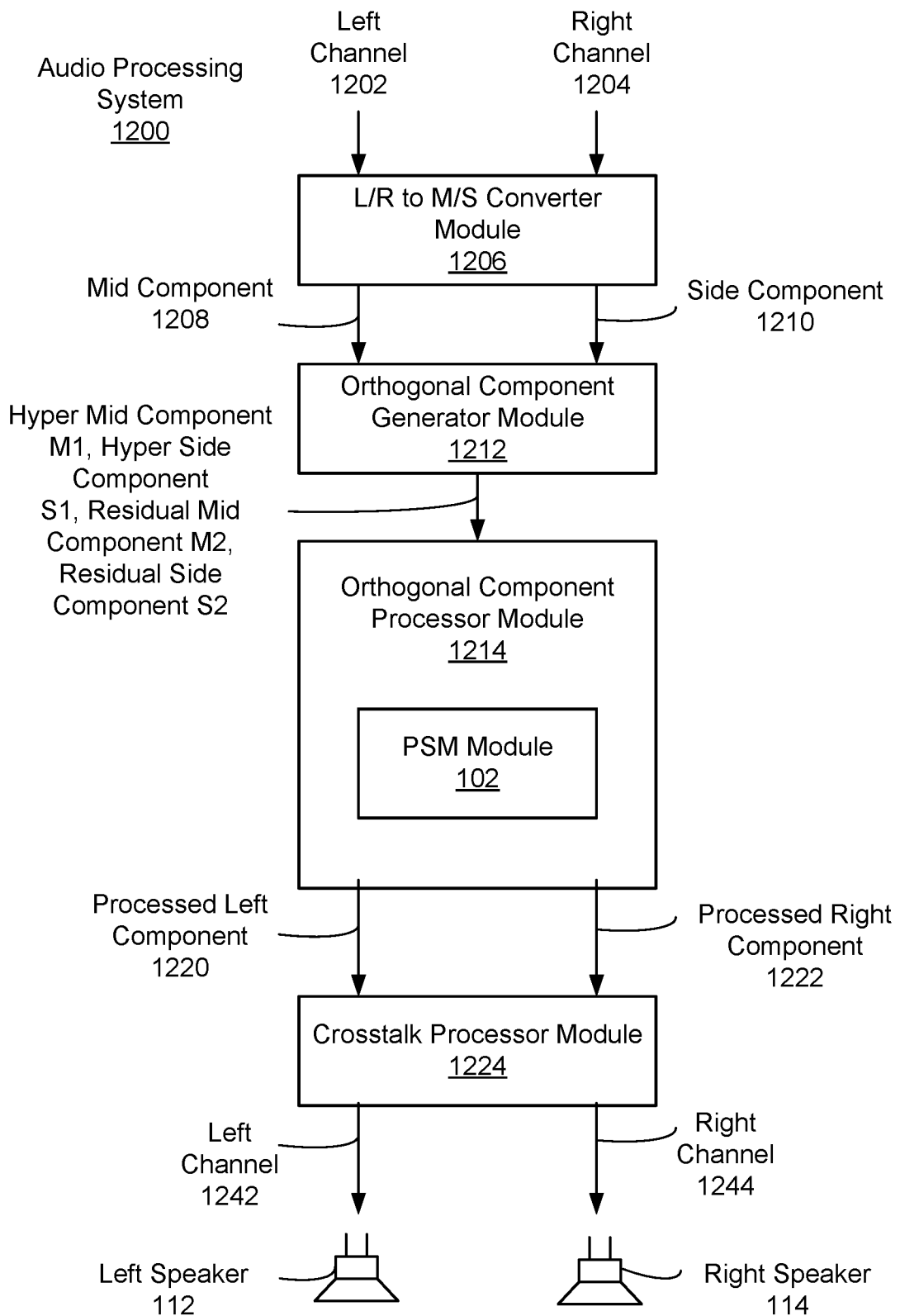
FIG. 12 is a block diagram of an audio processing system 1000, in accordance with one or more embodiments.

In some embodiments, PSM processing may be performed on a target portion of a received audio signal, such as mid component of the audio signal, or a hyper mid component of the audio signal. FIG. 12 is a block diagram of an audio processing system 1200, in accordance with one or more embodiments. The system 1200 generates a hyper mid component to isolate a target portion (e.g., voice) of an audio signal, and performs PSM processing on the hyper mid component to spatially shift the target portion. Some embodiments of the system 1200 have different components than those described here. Similarly, in some cases, functions can be distributed among the components in a different manner than is described here.

The system 1200 includes an L/R to M/S converter module 1206, an orthogonal component generator module 1212, an orthogonal component processor module 1214 including the PSM module 102, and a crosstalk processor module 1224.

The L/R to M/S converter module 1206 receives a left channel 1202 and a right channel 1204 and generates a mid component 1208 and a side component 1210 from the channels 1202 and 1204. The discussion regarding the L/R to M/S converter module 104 may be applicable to the L/R to M/S converter module 1206.

The orthogonal component generator module 1212 processes the mid component 1208 and the side component 1210 to generate at least one of: a hyper mid component M1, a hyper side component S1, a residual mid component M2, and a residual side component S2. The hyper mid component M1 is the spectral energy mid component 1208 with the spectral energy of the side component 1210 removed. The hyper side component S1 is the spectral energy of the side component 1210 with the spectral energy of the mid component 1208 removed. The residual mid component M2 is the spectral energy of the mid component 1208 with the spectral energy of the hyper mid component M1 removed. The residual side component S2 is the spectral energy of the side component 1210 with the spectral energy of the hyper side component S1 removed. The system 1200 generates the left channel 1242 and the right output channel 1244 by processing at least one of the hyper mid component M1, the hyper side component S1, the residual mid component M2, and the residual side component S2. The orthogonal component generator module 1212 is further described with respect to FIGS. 13A, 13B, and 13C.

The orthogonal component processor module 1214 processes one or more of the hyper mid component M1, the hyper side component S1, the residual mid component M2, and/or the residual side component S2, and converts the processed components into a processed left component 1220 and a processed right component 1222. The discussion regarding the component processor module 106 may be applicable to the orthogonal component processor module 1214, except that the processing is performed on the hyper mid component M1, the hyper side component S1, the residual mid component M2, and/or the residual side component S2 rather than mid and side components. For example, the processing on the components M1, M2, S1, and S2 may include various types of such as spatial cue processing (e.g., amplitude or delay-based panning, binaural processing, etc.), single or multi-band equalization, single or multi-band dynamics processing (e.g., compression, expansion, limiting, etc.), single or multi-band gain or delay stages, adding audio effects, or other types of processing. In some embodiments, the orthogonal component processor module 1214 performs subband spatial processing and/or crosstalk compensation processing using the hyper mid component M1, the hyper side component S1, the residual mid component M2, and/or the residual side component S2. The orthogonal component processor module 1214 may further include an L/R to M/S converter to convert the components M1, S2, S1, and S2 into a processed left component 1220 and a processed right component 1222.

The orthogonal component processor module 1214 further includes the PSM module 102, which may operate on one or more of the hyper mid component M1, the hyper side component S1, the residual mid component M2, and/or the residual side component S2. For example, the PSM module 102 may receive the hyper mid component M1 as input and generate spatially shifted left and right channels. The hyper mid component M1 may include an isolated portion of the audio signal representing the voice, for example, and thus may be selected for the HPSM processing. The left channel generated by the PSM module 102 is used to generate the processed left component 1020 and the right channel generated by the PSM module 102 is used to generate the processed right component 1222. The orthogonal component processor module 1214 is further described with respect to FIG. 12.

The crosstalk processor module 1224 receives and performs crosstalk processing on the processed left component 1220 and the processed right component 1222. The crosstalk processor module 1224 outputs the left channel 1242 and the right channel 1244. The discussion regarding the crosstalk processor module 1224 may be applicable to crosstalk processor module 1224. In some embodiments, crosstalk processing (e.g., simulation or cancellation) may be performed prior to the orthogonal component processing, such as prior to conversion of the left channel 1202 and right channel 1204 into mid and side components. The left channel 1242 may be provided to the left speaker 112 and the right channel 1244 may be provided to the right speaker 114.

Example Orthogonal Component Generator

Figure 13A:
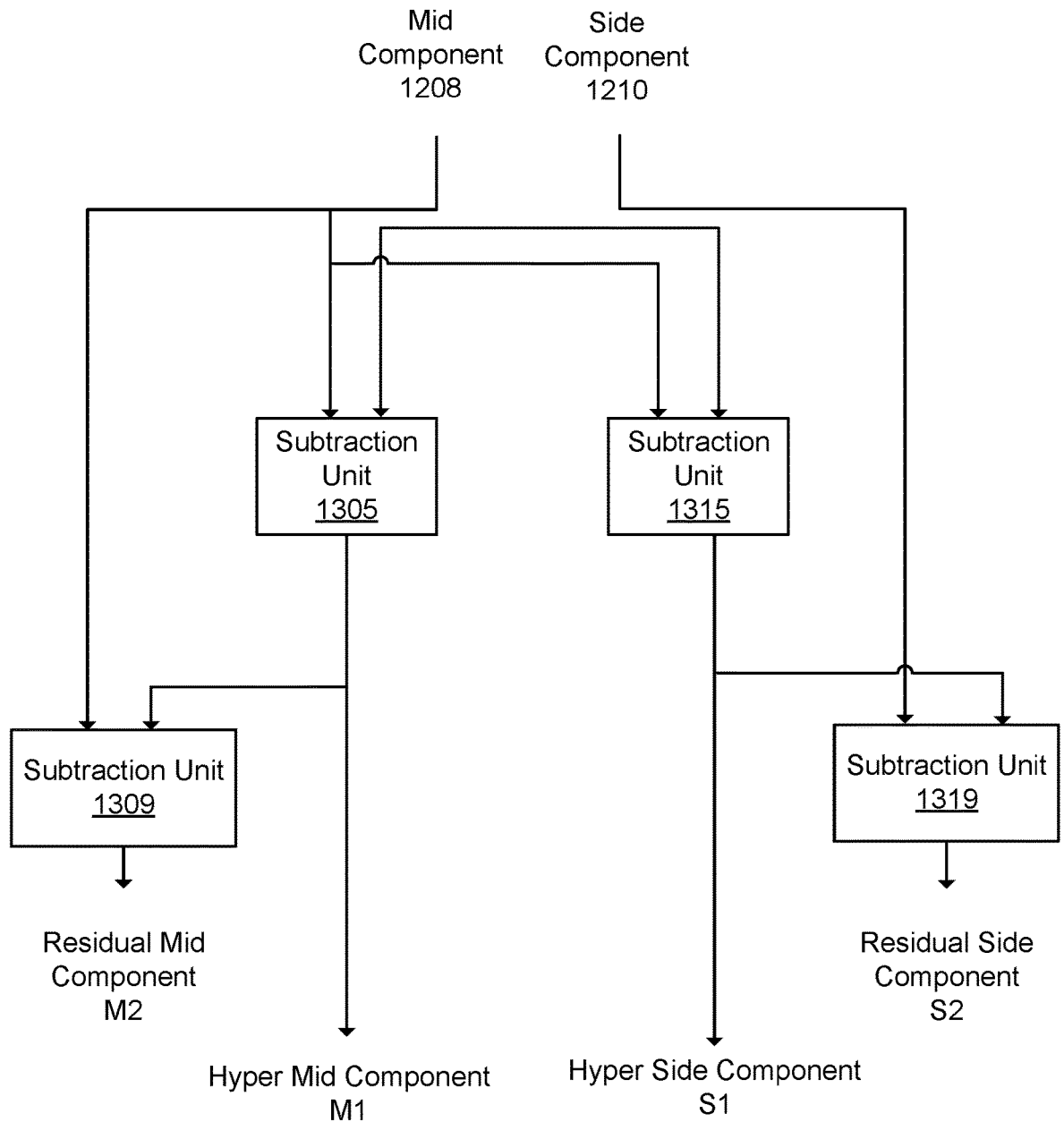
FIG. 13A is a block diagram of an orthogonal component generator, in accordance with one or more embodiments.
Figure 13B:
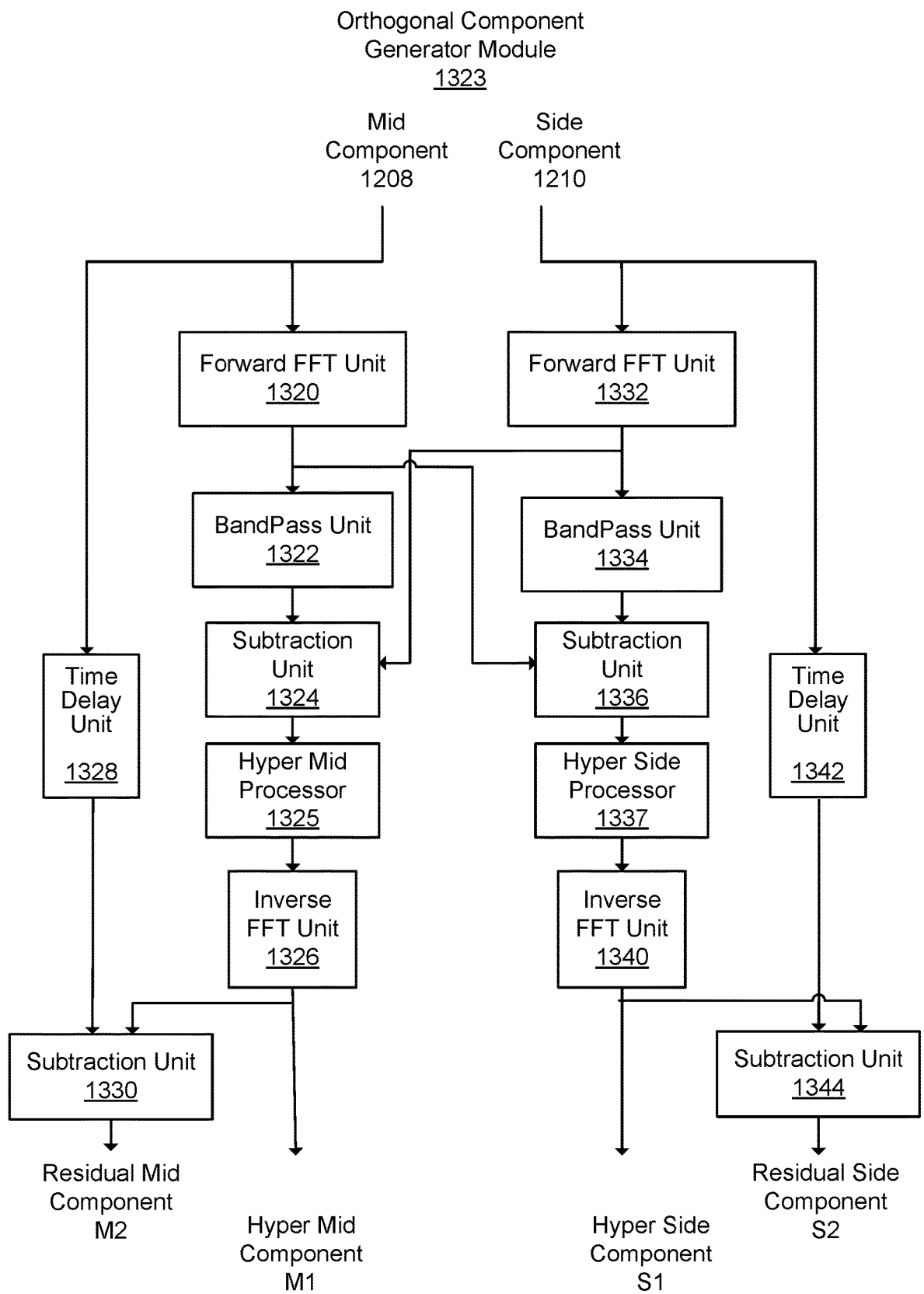
FIG. 13B is a block diagram of an orthogonal component generator, in accordance with one or more embodiments.
Figure 13C:
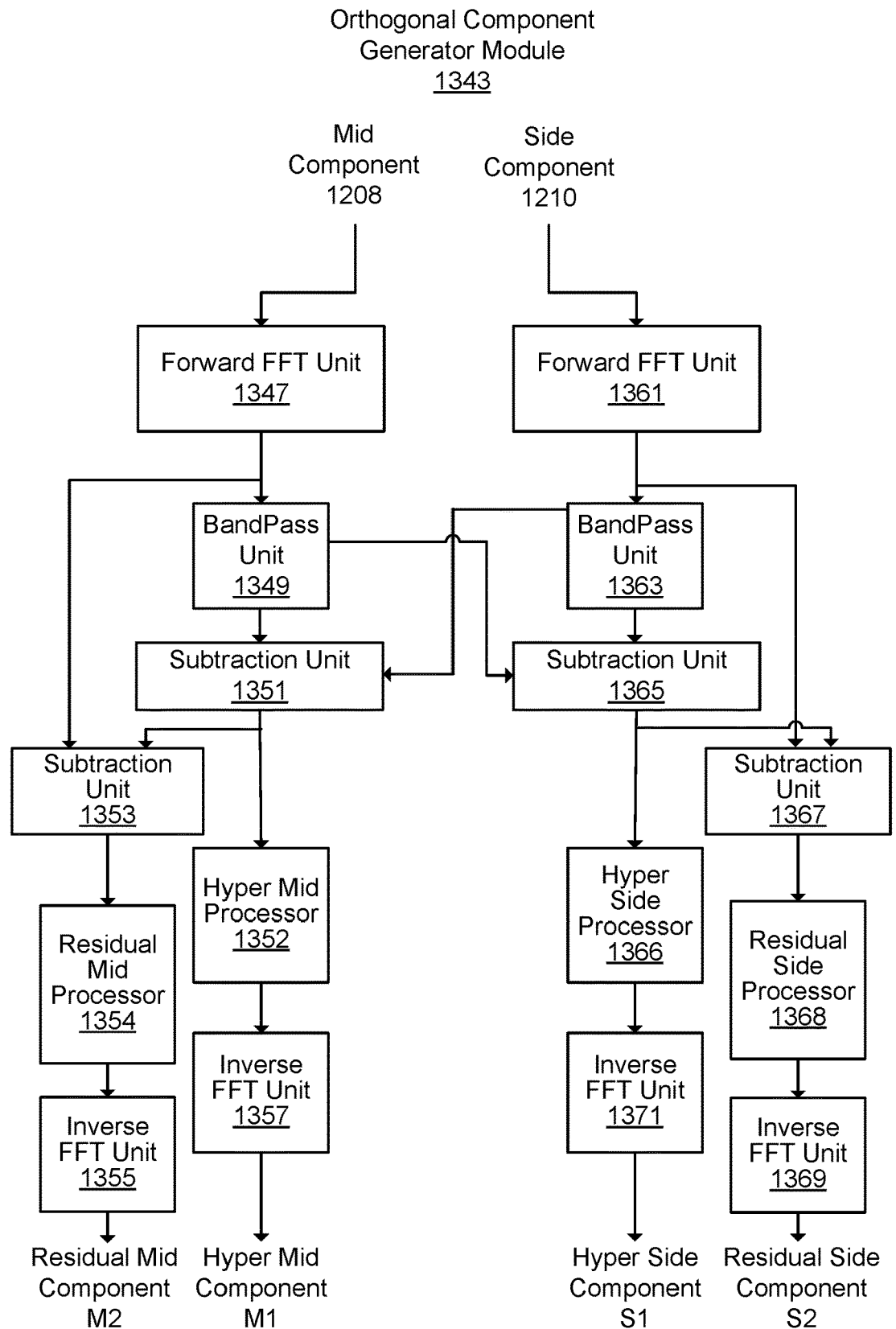
FIG. 13C is a block diagram of an orthogonal component generator, in accordance with one or more embodiments.

FIGS. 13A-C are block diagrams of orthogonal component generator modules 1313, 1323, and 1343, respectively, in accordance with one or more embodiments. The orthogonal component generator modules 1313, 1323, and 1343 are examples of the orthogonal component generator module 1212. Some embodiments of the module modules 1313, 1323, and 1343 have different components than those described here. Similarly, in some cases, functions can be distributed among the components in a different manner than is described here.

With reference to FIG. 13A, the orthogonal component generator module 1313 includes a subtraction unit 1305, a subtraction unit 1309, a subtraction unit 1315, and a subtraction unit 1319. As described above, the orthogonal component generator module 1313 receives the mid component 1208 and the side component 1210, and outputs one or more of the hyper mid component M1, the hyper side component S1, the residual mid component M2, and the residual side component S2.

The subtraction unit 1305 removes spectral energy of the side component 1210 from spectral energy of the mid component 1208 to generate the hyper mid component M1. For example, the subtraction unit 1305 subtracts a magnitude of the side component 1210 in the frequency domain from a magnitude of the mid component 1208 in the frequency domain, while leaving phase alone, to generate the hyper mid component M1. Subtraction in the frequency domain may be performed using a Fourier transformation on the time domain signal to generate signals in the frequency domain, and then subtraction of the signals in the frequency domain. In other examples, the subtraction in the frequency domain could be performed in other ways, such as using a wavelet transform instead of a Fourier transform. The subtraction unit 1309 generates a residual mid component M2 by removing spectral energy of the hyper mid component M1 from the spectral energy of the mid component 1208. For example, the subtraction unit 1309 subtracts a magnitude of the hyper mid component M1 in the frequency domain from a magnitude of the mid component 1208 in the frequency domain, while leaving phase alone, to generate the residual mid component M2. Whereas subtracting the side from the mid in the time domain results in the original right channel of the signal, the above operations in the frequency domain isolates and differentiates between a portion of the spectral energy of the mid component that is different from the spectral energy of the side component (referred to as M1, or hyper mid), and a portion of the spectral energy of the mid component that is the same as the spectral energy of the side component (referred to as M2, or residual mid).

In some embodiments, additional processing may be used when subtraction of the spectral energy of the side component 1210 from spectral energy of the mid component 1006 results in a negative value for the hyper mid component M1 (e.g., for one or more of the bins in the frequency domain). In some embodiments, the hyper mid component M1 is clamped at a 0 value when the subtraction of the spectral energy of the side component 1210 from the spectral energy of the mid component 1208 results in a negative value. In some embodiments, the hyper mid component M1 is wrapped around by taking the absolute value of the negative value as the value of the hyper mid component M1. Other types of processing may be used when the subtraction of the spectral energy of the side component 1210 from the spectral energy of the mid component 1208 results in a negative value for M1. Similar additional processing may be used when the subtractions that generate the hyper side component S1, residual side component S2, or residual mid component M2 results in a negative, such as clamping at 0, wrap around, or other processing. Clamping the hyper mid component M1 at 0 will provide spectral orthogonality between M1 and both side components when the subtraction results in a negative value. Likewise, clamping the hyper side component S1 at 0 will provide spectral orthogonality between S1 and both mid components when the subtraction results in a negative value. By creating orthogonality between the hyper mid and side components and their appropriate mid/side counterpart components (i.e. side component for hyper mid, mid component for hyper side), the derived residual mid M2 and residual side S2 components contain spectral energy that is not orthogonal to (i.e. in common with) their appropriate mid/side counterpart components. That is, when applying clamping at 0 for the hyper mid, and using that M1 component to derive the residual mid, a hyper mid component that has no spectral energy in common with the side components and a residual mid component that has spectral energy that is fully in common with the side components is generated. The same relationships apply to hyper side and residual side when clamping the hyper side to 0. When applying frequency domain processing there is typically a tradeoff in resolution between frequency and timing information. As the frequency resolution increases (i.e. as the FFT window size, and number of frequency bins, grows), the time resolution decreases, and vice versa. The above-described spectral subtraction occurs on a per-frequency-bin basis, and it may therefore be preferable in certain situations, such as when removing vocal energy from the hyper mid component, to have a large FFT window size (e.g. 8192 samples, resulting in 4096 frequency bins given a real-valued input signal). Other situations may require more time resolution and therefore lower overall latency and lower frequency resolution (e.g. 512 sample FFT window size, resulting in 256 frequency bins given a real-valued input signal). In the latter case, the low frequency resolution of the mid and side, when subtracted from each other to derive the hyper mid M1 and hyper side S1 components, may produce audible spectral artifacts because of the spectral energy of each frequency bin being an average representation of energy over too large a frequency range. In this case, taking the absolute value of the difference between mid and side when deriving the hyper mid M1 or hyper side S1 can help mitigate perceptual artifacts by allowing per-frequency-bin divergence from true orthogonality in components. In addition to or in place of wrapping around 0, we may apply a coefficient to the subtrahend value, scaling that value between 0 and 1, and therefore providing a method for interpolation between at one extreme (i.e. with a value of 1), full orthogonality of hyper and residual mid/side components, and at the other extreme (i.e. with a value of 0), a hyper mid M1 and hyper side S1 that are identical to their corresponding original mid and side components.

The subtraction unit 1315 removes the spectral energy of the mid component 1208 in the frequency domain from the spectral energy of the side component 1210 in the frequency domain, while leaving phase alone, to generate the hyper side component S1. For example, the subtraction unit 1315 subtracts a magnitude of the mid component 1208 in the frequency domain from a magnitude of the side component 1210 in the frequency domain, while leaving phase alone, to generate the hyper side component S1. The subtraction unit 1319 removes spectral energy of the hyper side component S1 from the spectral energy of the side component 1210 to generate a residual side component S2. For example, the subtraction unit 1319 subtracts a magnitude of the hyper side component S1 in the frequency domain from a magnitude of the side component 1210 in the frequency domain, while leaving phase alone, to generate the residual side component S2.

In FIG. 13B, the orthogonal component generator module 1323 is similar to the orthogonal component generator module 1313 in that it receives the mid component 1006 and the side component 1210 and generates the hyper mid component M1, the residual mid component M2, the hyper side component S1, and the residual side component S2. The orthogonal component generator module 1323 differs from the orthogonal generator module 1313 by generating the hyper mid component M1 and hyper side component S1 in the frequency domain and then converting these components back to the time domain to generate the residual mid component M2 and residual side component S2. The orthogonal component generator module 1323 includes a forward FFT unit 1320, a bandpass unit 1322, a subtraction unit 1324, a hyper mid processor 1325, an inverse FFT unit 1326, a time delay unit 1328, a subtraction unit 1330, a forward FFT unit 1332, a bandpass unit 1334, a subtraction unit 1336, a hyper side processor 1337, an inverse FFT unit 1340, a time delay unit 1342, and a subtraction unit 1344.

The forward fast Fourier transform (FFT) unit 1320 applies a forward FFT to the mid component 1208, converting the mid component 1208 to a frequency domain. The converted mid component 1208 in the frequency domain includes a magnitude and a phase. The bandpass unit 1322 applies a bandpass filter to the frequency domain mid component 1208, where the bandpass filter designates the frequencies in the hyper mid component M1. For example, to isolate a typical human vocal range, the bandpass filter may designate frequencies between 300 and 8000 Hz. In another example, to remove audio content associated with a typical human vocal range, the bandpass filter may keep lower frequencies (e.g., generated by a bass guitar or drums) and higher frequencies (e.g., generated by cymbals) in the hyper mid component M1. In other embodiments, the orthogonal component generator module 1323 applies various other filters to the frequency domain mid component 1208, in addition to and/or in place of the bandpass filter applied by the bandpass unit 1322. In some embodiments, the orthogonal component generator module 1323 does not include the bandpass unit 1322 and does not apply any filters to the frequency domain mid component 1208. In the frequency domain, the subtraction unit 1324 subtracts the side component 1210 from the filtered mid component to generate the hyper mid component M1. In other embodiments, in addition to and/or in lieu of later processing applied to the hyper mid component M1 as performed by an orthogonal component processor module (e.g., the orthogonal component processor module of FIG. 12), the orthogonal component generator module 1323 applies various audio enhancements to the frequency domain hyper mid component M1. The hyper mid processor 1325 performs processing on the hyper mid component M1 in the frequency domain prior to its conversion to the time domain. The processing may include subband spatial processing and/or crosstalk compensation processing. In some embodiments, the hyper mid processor 1325 performs processing on the hyper mid component M1 instead of and/or in addition to processing that may be performed by the orthogonal component processor module 1214. The inverse FFT unit 1326 applies an inverse FFT to the hyper mid component M1, converting the hyper mid component M1 back to the time domain. The hyper mid component M1 in the frequency domain includes a magnitude of M1 and the phase of the mid component 1208, which the inverse FFT unit 1326 converts to the time domain. The time delay unit 1328 applies a time delay to the mid component 1208, such that the mid component 1208 and the hyper mid component M1 arrive at the subtraction unit 1330 at the same time. The subtraction unit 1330 subtracts the hyper mid component M1 in the time domain from the time delayed mid component 1208 in the time domain, generating the residual mid component M2. In this example, the spectral energy of the hyper mid component M1 is removed from the spectral energy of the mid component 1208 using processing in the time domain.

The forward FFT unit 1332 applies a forward FFT to the side component 1210, converting the side component 1210 to the frequency domain. The converted side component 1210 in the frequency domain includes a magnitude and a phase. The bandpass unit 1334 applies a bandpass filter to the frequency domain side component 1210. The bandpass filter designates the frequencies in the hyper side component S1. In other embodiments, the orthogonal component generator module 1323 applies various other filters to the frequency domain side component 1210, in addition to and/or in place of the bandpass filter. In the frequency domain, the subtraction unit 1336 subtracts the mid component 1208 from the filtered side component 1210 to generate the hyper side component S1. In other embodiments, in addition to and/or in lieu of later processing applied to the hyper side component S1 as performed by an orthogonal component processor (e.g., the orthogonal component processor module 1214), the orthogonal component generator module 1323 applies various audio enhancements to the frequency domain hyper side component S1. The hyper side processor 1337 performs processing on the hyper side component S1 in the frequency domain prior to its conversion to the time domain. The processing may include subband spatial processing and/or crosstalk compensation processing. In some embodiments, the hyper side processor 1337 performs processing on the hyper side component S1 instead of and/or in addition to processing that may be performed by the orthogonal component processor module 1214. The inverse FFT unit 1340 applies an inverse FFT to the hyper side component S1 in the frequency domain, generating the hyper side component S1 in the time domain.

The hyper side component S1 in the frequency domain includes a magnitude of S1 and the phase of the side component 1210, which the inverse FFT unit 1326 converts to the time domain. The time delay unit 1342 time delays the side component 1210 such that the side component 1210 arrives at the subtraction unit 1344 at the same time as the hyper side component S1. The subtraction unit 1344 subsequently subtracts the hyper side component S1 in the time domain from the time delayed side component 1210 in the time domain, generating the residual side component S2. In this example, the spectral energy of the hyper side component S1 is removed from the spectral energy of the side component 1210 using processing in the time domain.

In some embodiments, the hyper mid processor 1325 and hyper side processor 1337 may be omitted if the processing performed by these components is performed by the orthogonal component processor module 1214.

In FIG. 13C, the orthogonal component generator module 1343 is similar to the orthogonal component generators module 1323 in that it receives the mid component 1208 and the side component 1210 and generates the hyper mid component M1, the residual mid component M2, the hyper side component S1, and the residual side component S2, except that the orthogonal component generator module 1343 generates each of the components M1, M2, S1, and S2 in the frequency domain and then converts these components to the time domain. The orthogonal component generator module 1343 includes a forward FFT unit 1347, a bandpass unit 1349, a subtraction unit 1351, a hyper mid processor 1352, a subtraction unit 1353, a residual mid processor 1354, an inverse FFT unit 1355, an inverse FFT unit 1357, a forward FFT unit 1361, a bandpass unit 1363, a subtraction unit 1365, a hyper side processor 1366, a subtraction unit 1367, a residual side processor 1368, an inverse FFT unit 1369, and an inverse FFT unit 1371.

The forward FFT unit 1347 applies a forward FFT to the mid component 1208, converting the mid component 1208 to the frequency domain. The converted mid component 1208 in the frequency domain includes a magnitude and a phase. The forward FFT unit 1361 applies a forward FFT to the side component 1210, converting the side component 1210 to the frequency domain. The converted side component 1210 in the frequency domain includes a magnitude and a phase. The bandpass unit 1349 applies a bandpass filter to the frequency domain mid component 1208, the bandpass filter designating the frequencies of the hyper mid component M1. In some embodiments, the orthogonal component generator module 1343 applies various other filters to the frequency domain mid component 1208, in addition to and/or instead of the bandpass filter. The subtraction unit 1351 subtracts the frequency domain side component 1210 from the frequency domain mid component 1208, generating the hyper mid component M1 in the frequency domain. The hyper mid processor 1352 performs processing on the hyper mid component M1 in the frequency domain, prior to its conversion to the time domain. In some embodiments, the hyper mid processor 1352 performs subband spatial processing and/or crosstalk compensation processing. In some embodiments, the hyper mid processor 1352 performs processing on the hyper mid component M1 instead of and/or in addition to processing that may be performed by the orthogonal component processor module 1214. The inverse FFT unit 1357 applies an inverse FFT to the hyper mid component M1, converting it back to the time domain. The hyper mid component M1 in the frequency domain includes a magnitude of M1 and the phase of the mid component 1208, which the inverse FFT unit 1357 converts to the time domain. The subtraction unit 1353 subtracts, in the frequency domain, the hyper mid component M1 from the mid component 1208 to generate the residual mid component M2. The residual mid processor 1354 performs processing on the residual mid component M2 in the frequency domain, prior to its conversion to the time domain. In some embodiments, the residual mid processor 1354 performs subband spatial processing and/or crosstalk compensation processing on the residual mid component M2. In some embodiments, the residual mid processor 1354 performs processing on the residual mid component M2 instead of and/or in addition to processing that may be performed by the orthogonal component processor module 1214. The inverse FFT unit 1355 applies an inverse FFT to convert the residual mid component M2 to the time domain. The residual mid component M2 in the frequency domain includes a magnitude of M2 and the phase of the mid component 1208, which the inverse FFT unit 1355 converts to the time domain.

The bandpass unit 1363 applies a bandpass filter to the frequency domain side component 1210. The bandpass filter designates frequencies in the hyper side component S1. In other embodiments, the orthogonal component generator module 1343 applies various other filters to the frequency domain side component 1210, in addition to and/or in place of the bandpass filter. In the frequency domain, the subtraction unit 1365 subtracts the mid component 1208 from the filtered side component 1210 to generate the hyper side component S1. The hyper side processor 1366 performs processing on the hyper side component S1 in the frequency domain, prior to its conversion to the time domain. In some embodiments, the hyper side processor 1366 performs subband spatial processing and/or crosstalk compensation processing on the hyper side component S1. In some embodiments, the hyper side processor 1366 performs processing on the hyper side component S1 instead of and/or in addition to processing that may be performed by the orthogonal component processor module 1214. The inverse FFT unit 1371 applies an inverse FFT to convert the hyper side component S1 back to the time domain. The hyper side component S1 in the frequency domain includes a magnitude of S1 and the phase of the side component 1210, which the inverse FFT unit 1371 converts to the time domain. The subtraction unit 1367 subtracts, in the frequency domain, the hyper side component S1 from the side component 1210, generating the residual side component S2. The residual side processor 1368 performs processing on the residual side component S2 in the frequency domain, prior to its conversion to the time domain. In some embodiments, the residual side processor 1368 performs subband spatial processing and/or crosstalk compensation processing on the residual side component S2. In some embodiments, the residual side processor 1368 performs processing on the residual side component S2 instead of and/or in addition to processing that may be performed by the orthogonal component processor module 1214. The inverse FFT unit 1369 applies an inverse FFT to the residual side component S2, converting it to the time domain. The residual side component S2 in the frequency domain includes a magnitude of S2 and the phase of the side component 1210, which the inverse FFT unit 1369 converts to the time domain.

In some embodiments, the hyper mid processor 1352, hyper side processor 1366, residual mid processor 1354, or residual side processor 1368 may be omitted if the processing performed by these components is performed by the orthogonal component processor module 1214.

Example Orthogonal Component Processor

Figure 14A:
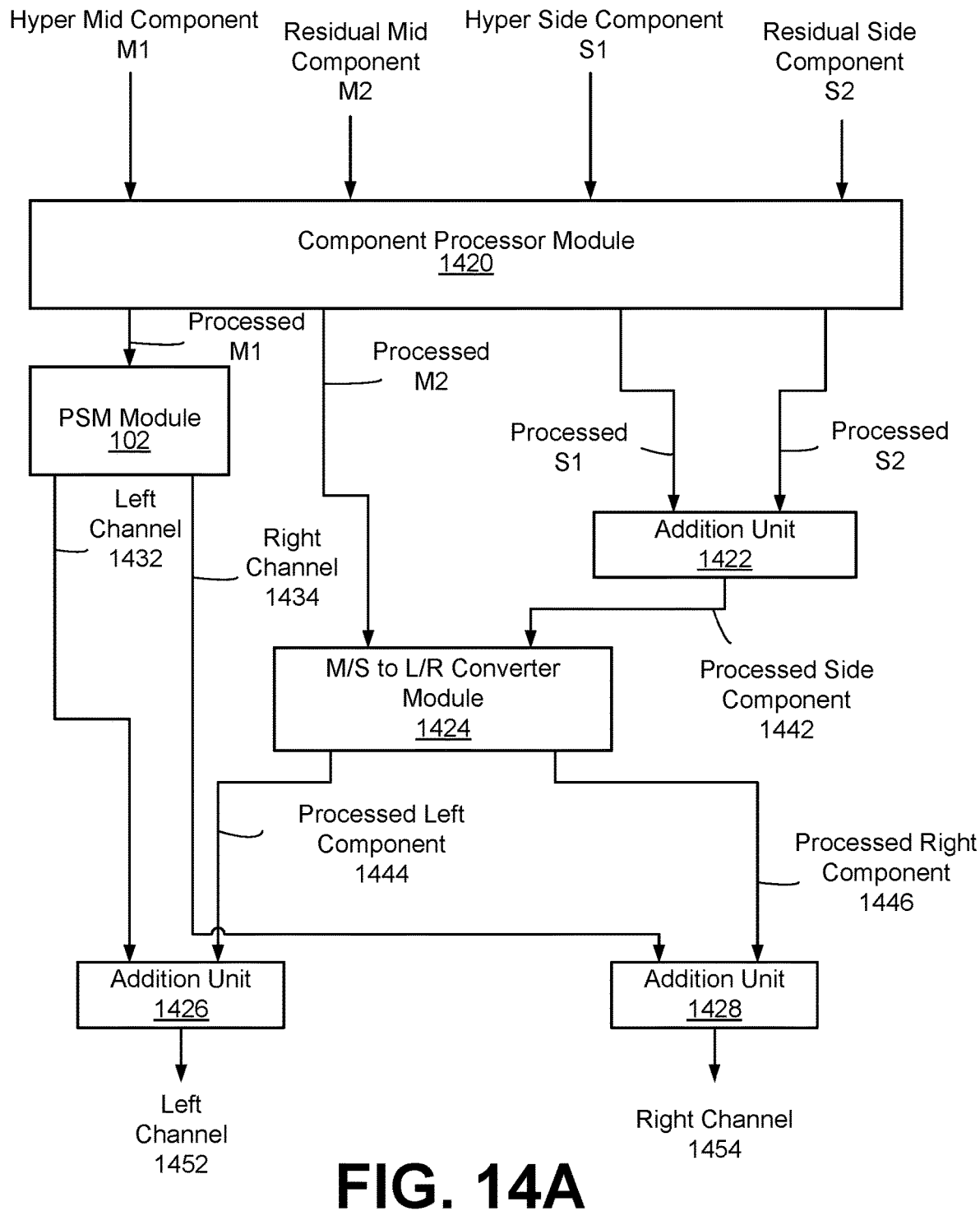
FIG. 14A is a block diagram of an orthogonal component processor module, in accordance with one or more embodiments.

FIG. 14A is a block diagram of an orthogonal component processor module 1417, in accordance with one or more embodiments. The orthogonal component processor module 1417 is an example of the orthogonal component processor module 1412. Some embodiments of the module 1417 have different components than those described here. Similarly, in some cases, functions can be distributed among the components in a different manner than is described here.

The orthogonal component processor module 1417 includes a component processor module 1420, the PSM module 102, an addition unit 1422, an M/S to L/R converter module 1424, an addition unit 1426, and an addition 1428.

The component processor module 1420 performs processing like the component processor module 106, except using the hyper mid component M1, the hyper side component S1, the residual mid component M2, and/or the residual side component S2 rather than mid and side components. For example, the component processor module 1420 performs subband spatial processing and/or crosstalk compensation processing on at least one of the hyper mid component M1, the residual mid component M2, the hyper side component S1, and the residual side component S2. As a result of the subband spatial processing and/or crosstalk compensation by the component processor module 1420, the orthogonal component processor module 1417 outputs at least one of a processed M1, a processed M2, a processed S1, and a processed S2. In some embodiments, one or more of the components M1, M2, S1, or S2 may bypass the component processor module 1420.

In some embodiments, the orthogonal component processor module 1417 performs subband spatial processing and/or crosstalk compensation processing on at least one of the hyper mid component M1, the residual mid component M2, the hyper side component S1, and the residual side component S2 in the frequency domain. The orthogonal component generator module 410 may provide the components M1, M2, S1, or S2 in the frequency domain to the orthogonal component processor module 1417 without performing inverse FFTs. After generating the processed M1, processed M2, and the processed side component 1442, the orthogonal component processor module 1417 may perform the inverse FFTs to convert these components back to the time domain. In some embodiments, the orthogonal component processor module 1417 performs inverse FFTs on the processed M1, the processed M2, the processed S1, and the processed S1, and generates the processed side component 1446 in the time domain.

Figure 15:
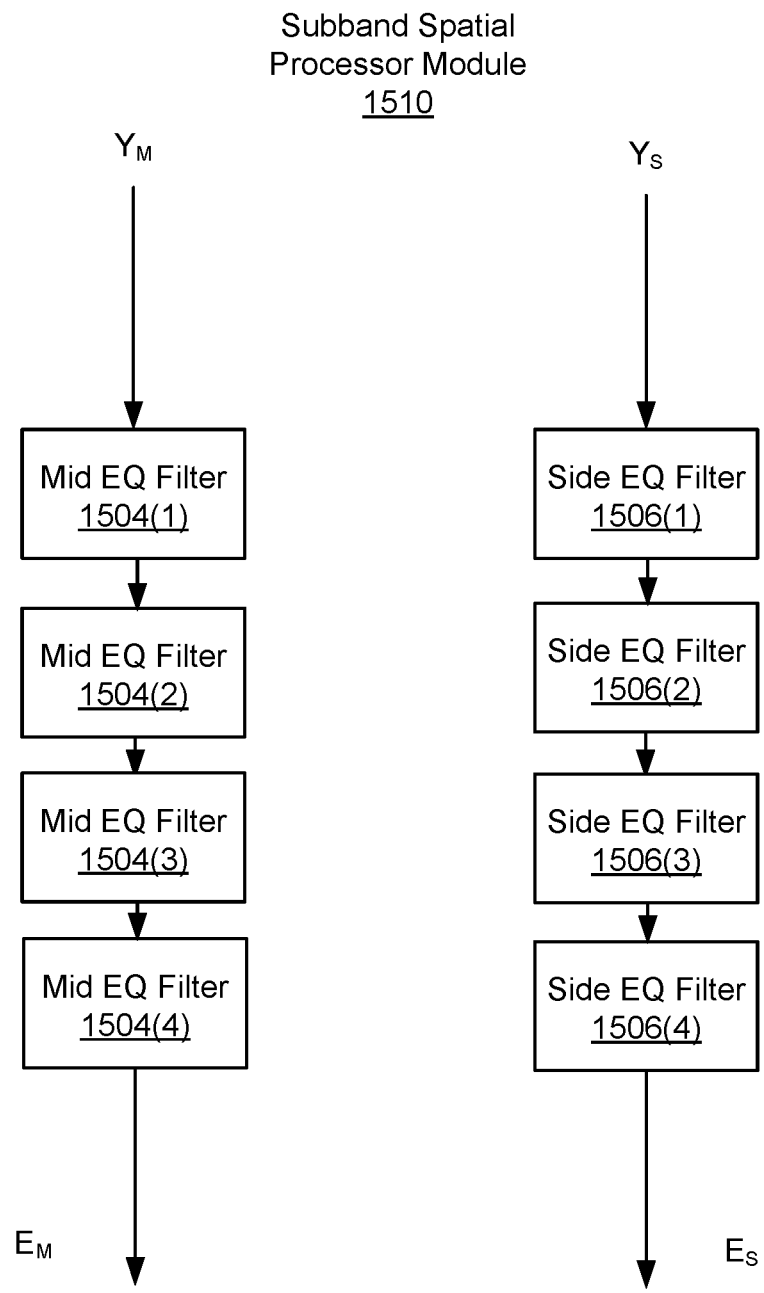
FIG. 15 is a block diagram of a subband spatial processor module, in accordance with one or more embodiments.
Figure 16:
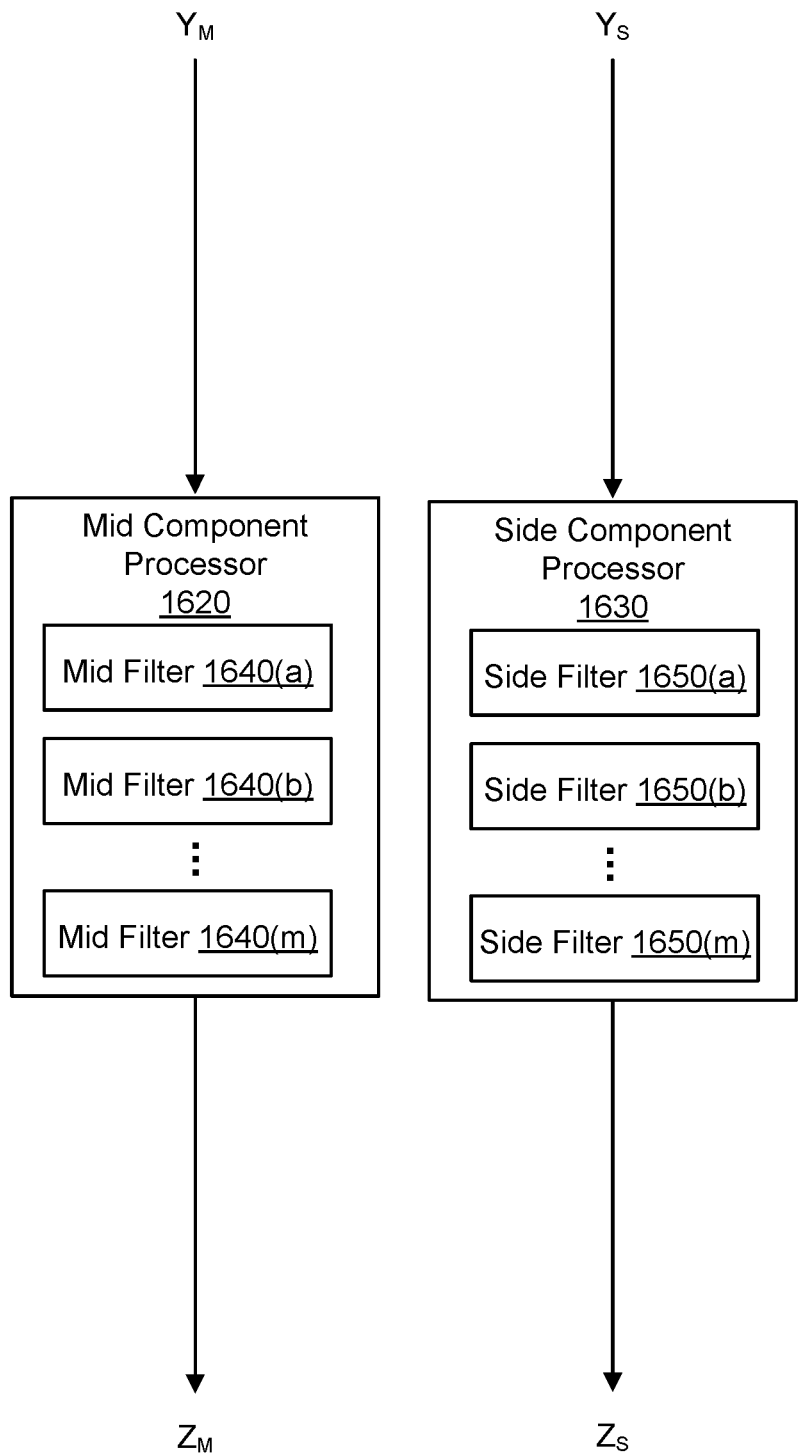
FIG. 16 is a block diagram of a crosstalk compensation processor module, in accordance with one or more embodiments.

Example components of the orthogonal component processor module 1417 are shown in FIGS. 15 and 16. In some embodiments, the orthogonal component processor module 1417 performs both subband spatial processing and crosstalk compensation processing. The processing performed by the orthogonal component processor module 1417 is not limited to subband spatial processing or crosstalk compensation processing. Any type of spatial processing using mid/side space may be performed by the orthogonal component processor module 1417, such as by using the hyper mid component in place of the mid component or the hyper side component in place of the side component. Some other types of processing may include gain application, amplitude or delay-based panning, binaural processing, reverberation, dynamic range processing such as compression and limiting, as well as other linear or non-linear audio processing techniques and effects ranging from chorus or flanging to machine learning-based approaches to vocal or instrumental style transfer, conversion or re-synthesis, etc.

The PSM module 102 receives the processed M1 and applies the PSM processing to spatially shift the processed M1, resulting a left channel 1432 and a right channel 1434.

Although the PSM module 102 is shown as being applied to the hyper mid component M1, PSM module may be applied to one or more of the components M1, M2, S1, or S2. In some embodiments, a component that is processed by the PSM module 102 bypasses the processing by the component processor module 1420. For example, the PSM module 102 may process the hyper mid component M1 rather than the processed M1.

The addition unit 1422 adds the processed S1 with the processed S2 to generate a processed side component 1442. The M/S to L/R converter module 1424 generates a processed left component 1444 and a processed right component 1446 using the processed M2 and the processed side component 1442. In some embodiments, the processed left component 1444 is generated based on a sum of the processed M2 and the processed side component 1442 and the processed right component 1446 is generated based on a difference between the processed M2 and the processed side component 1442. Other M/S to L/R types of transformations may be used to generate the processed left component 1444 and the processed right component 1446.

The addition unit 1426 adds the left channel 1432 from the PSM module 102 with the processed left component 1444 to generate the left channel 1452. The addition unit 1428 adds the right channel 1434 from the PSM module 102 with the processed right component 1446 to generate the right channel 1454. More generally, one or more left channels from the PSM module 102 may be added with a left component from the M/S to L/R converter module 1424 (e.g., generated using hyper/residual components that are not processed by the PSM module 102) to generate the left channel 1452, and one or more right channels from the PSM module 102 may be added with a right component from the M/S to L/R converter module 1424 (e.g., generated using hyper/residual components that are not processed by the PSM module 102) to generate the right channel 1454.

As such, the orthogonal component processor module 1417 applies the PSM processing to a hyper mid component M1 of an audio signal, as isolated by L/R to M/S converter module 1206 and the orthogonal component generator module 1212. The PSM enhanced stereo signal (including left channel 1432 and right channel 1434) can then be summed with the residual Left/Right signal (e.g., the processed left component 1444 and processed right component 1446, generated without the hyper-Mid component). Other approaches to isolating components of the input signal used for PSM processing may be used in addition to or in place of this example, including machine-learning-based audio source separation.

Figure 14B:
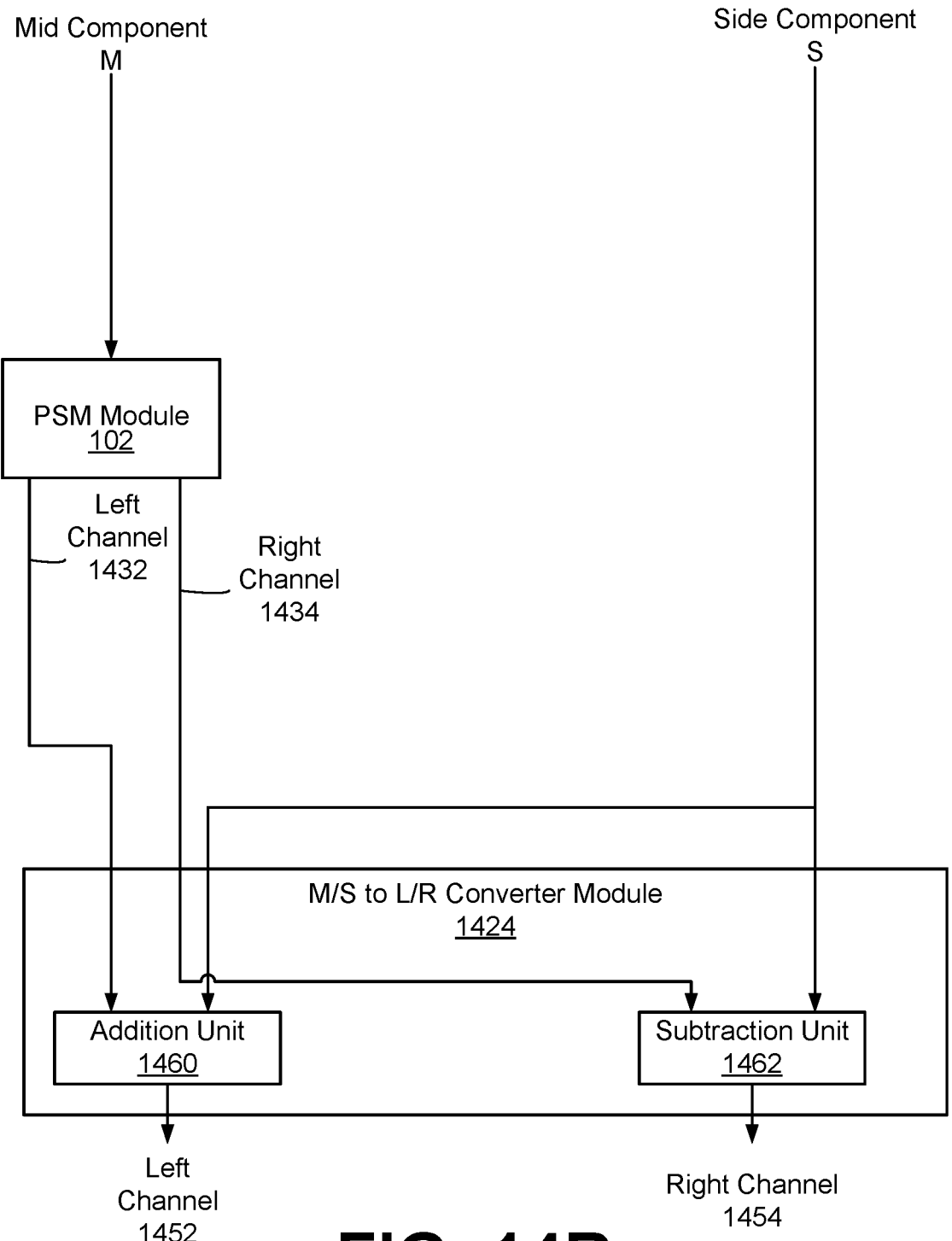
FIG. 14B illustrates a block diagram of a orthogonal component processor module, in accordance with one or more embodiments.

In some embodiments, the orthogonal component processor module 1417 applies PSM processing a mid component M of an audio signal, instead of hyper mid component M1. FIG. 14B illustrates a block diagram of a orthogonal component processor module 1419, in accordance with one or more embodiments. In some embodiments, the orthogonal component processor module 1419 of FIG. 14B may be implemented as part of an audio processing system similar to system 1200 illustrated in FIG. 12, but without the orthogonal component generator module 1212, such that the orthogonal component processor module receives mid component and side component signals (e.g., mid component 1208 and side component 1210), instead of hyper mid, hyper side, residual mid, and residual side components. In some embodiments, the orthogonal component processor module 1410 includes a component processor module similar to component processor module 106 to generate processed mid and processed side components from the received mid and side components (not shown). The PSM module 102 receives the mid component M (or processed mid), and applies PSM processing to spatially shift the received mid signal to generate a PSM-processed left channel 1432 and a PSM-processed right channel 1434 of the mid signal, which are combined with the side component S (or processed side) by the M/S to L/R converter module 1424 to generate left channel 1452 and right channel 1454. For example, as shown in FIG. 14B, the M/S to L/R converter module 1424 uses an addition unit 1460 to generate the left channel 1452 as a sum of the PSM-processed left channel 1432 and the side component S, and a subtraction unit 1462 to generate the right channel 1454 as a difference between the PSM-processed right channel 1434 and the side component S. In other words, M/S to L/R converter module 1424 serves to mix a side signal (which in the left-right basis lies in the subspace defined by the left component being the inverse of the right component) into the PSM-processed stereo signal in left-right space, by combining the signal with the left channel, and an inverse of the signal with the right channel.

Example Subband Spatial Processor

FIG. 15 is a block diagram of a subband spatial processor module 1510, in accordance with one or more embodiments. The subband spatial processor module 1510 is an example of a component of the component processor module 106 or 1520. The subband spatial processor module 1510 includes a mid EQ filter 1504(1), a mid EQ filter 1504(2), a mid EQ filter 1504(3), a mid EQ filter 1504(4), a side EQ filter 1506(1), a side EQ filter 1506(2), a side EQ filter 1506(3), and a side EQ filter 1506(4). Some embodiments of the subband spatial processor module 1510 have different components than those described here. Similarly, in some cases, functions can be distributed among the components in a different manner than is described here.

The subband spatial processor module 1510 receives a nonspatial component Ym and a spatial component Ys and gain adjusts subbands of one or more of these components to provide a spatial enhancement. When the subband spatial processor module 1510 is part of the component processor module 1420, the nonspatial component Ym may be the hyper mid component M1 or the residual mid component M2. The spatial component Ys may be the hyper side component S1 or the residual side component S2. When the subband spatial processor module 1510 is part of the component processor module 106, the nonspatial component Ym may be the mid component 126 and the spatial component Ys may be the side component 128.

The subband spatial processor module 1510 receives the nonspatial component Ym and applies the Mid EQ filters 1504(1) to 1504(4) to different subbands of Ym to generate an enhanced nonspatial component Em. The subband spatial processor module 1510 also receives the spatial component Ys and applies the Side EQ filters 1506(1) to 1506(4) to different subbands of Ys to generate an enhanced spatial component Es. The subband filters can include various combinations of peak filters, notch filters, low pass filters, high pass filters, low shelf filters, high shelf filters, bandpass filters, bandstop filters, and/or all pass filters. The subband filters may also apply gains to respective subbands. More specifically, the subband spatial processor module 1510 includes a subband filter for each of n frequency subbands of the nonspatial component Ym and a subband filter for each of the n subbands of the spatial component Ys. For n=4 subbands, for example, the subband spatial processor module 1510 includes a series of subband filters for the nonspatial component Ym including a mid equalization (EQ) filter 1504(1) for the subband (1), a mid EQ filter 1504(2) for the subband (2), a mid EQ filter 1504(3) for the subband (3), and a mid EQ filter 1504(4) for the subband (4). Each mid EQ filter 1504 applies a filter to a frequency subband portion of the nonspatial component Ym to generate the enhanced nonspatial component Em.

The subband spatial processor module 1510 further includes a series of subband filters for the frequency subbands of the spatial component Ys, including a side equalization (EQ) filter 1506(1) for the subband (1), a side EQ filter 1506(2) for the subband (2), a side EQ filter 1506(3) for the subband (3), and a side EQ filter 1506(4) for the subband (4). Each side EQ filter 1506 applies a filter to a frequency subband portion of the spatial component Ys to generate the enhanced spatial component Es.

Each of the n frequency subbands of the nonspatial component Ym and the spatial component Ys may correspond with a range of frequencies. For example, the frequency subband (1) may corresponding to 0 to 300 Hz, the frequency subband (2) may correspond to 300 to 510 Hz, the frequency subband (3) may correspond to 510 to 2700 Hz, and the frequency subband (4) may correspond to 2700 Hz to Nyquist frequency. In some embodiments, each of the n frequency subbands are a consolidated set of critical bands. The critical bands may be determined using a corpus of audio samples from a wide variety of musical genres. A long term average energy ratio of mid to side components over the 24 Bark scale critical bands is determined from the samples. Contiguous frequency bands with similar long term average ratios are then grouped together to form the set of critical bands. The range of the frequency subbands, as well as the number of frequency subbands, may be adjustable.

In some embodiments, the subband spatial processor module 1510 processes the residual mid component M2 as nonspatial component Ym and uses one of the side component, the hyper side component S1, or the residual side component S2 as the spatial component Ys.

In some embodiments, the subband spatial processor module 1510 processes one or more of the hyper mid component M1, hyper side component S1, residual mid component M2, and residual side component S2. The filters applied to the subbands of each of these components may be different. The hyper mid component M1 and residual mid component M2 may each be processed as discussed for the nonspatial component Ym. The hyper side component S1 and residual side component S2 may each be processed as discussed for the spatial component $Y_s$.

Example Crosstalk Compensation Processor

FIG. 16 is a block diagram of a crosstalk compensation processor module 1610, in accordance with one or more embodiments. The crosstalk compensation processor module 1610 is an example of a component of the component processor module 106 or 1420. Some embodiments of the crosstalk compensation processor module 1610 have different components than those described here. Similarly, in some cases, functions can be distributed among the components in a different manner than is described here.

The crosstalk compensation processor module 1610 includes a mid component processor 1620 and a side component processor 1630. The crosstalk compensation processor module 1610 receives a nonspatial component Ym and a spatial component Ys and applies filters to one or more of these components to compensate for spectral defects caused by (e.g., subsequent or prior) crosstalk processing. When the crosstalk compensation processor module 1610 is part of the component processor module 1420, the nonspatial component Ym may be the hyper mid component M1 or the residual mid component M2. The spatial component Ys may be the hyper side component S1 or the residual side component S2. When the crosstalk compensation processor module 1610 is part of the component processor module 106, the nonspatial component Ym may be the mid component 126 and spatial component Ys may be the side component 128.

The crosstalk compensation processor module 1610 receives the nonspatial component Ym and the mid component processor 1620 applies a set of filters to generate an enhanced nonspatial crosstalk compensated component Zm. The crosstalk compensation processor module 1610 also receives the spatial subband component Ys and applies a set of filters in a side component processor 1630 to generate an enhanced spatial subband component Es. The mid component processor 1620 includes a plurality of filters 1640, such as m mid filters 1640(a), 1640(b), through 1640(m). Here, each of the m mid filters 1640 processes one of m frequency bands of the nonspatial component Xm. The mid component processor 1620 accordingly generates a mid crosstalk compensation channel Zm by processing the nonspatial component Xm. In some embodiments, the mid filters 1640 are configured using a frequency response plot of the nonspatial Xm with crosstalk processing through simulation. In addition, by analyzing the frequency response plot, any spectral defects such as peaks or troughs in the frequency response plot over a predetermined threshold (e.g., 10 dB) occurring as an artifact of the crosstalk processing can be estimated. These artifacts result primarily from the summation of the delayed and possibly inverted contralateral signals with their corresponding ipsilateral signal in the crosstalk processing, thereby effectively introducing a comb filter-like frequency response to the final rendered result. The mid crosstalk compensation channel Zm can be generated by the mid component processor 1620 to compensate for the estimated peaks or troughs, where each of the m frequency bands corresponds with a peak or trough. Specifically, based on the specific delay, filtering frequency, and gain applied in the crosstalk processing, peaks and troughs shift up and down in the frequency response, causing variable amplification and/ or attenuation of energy in specific regions of the spectrum. Each of the mid filters 1640 may be configured to adjust for one or more of the peaks and troughs.

The side component processor 1630 includes a plurality of filters 1650, such as m side filters 1650(a), 1650(b) through 1650(m). The side component processor 1630 generates a side crosstalk compensation channel Zs by processing the spatial component Xs. In some embodiments, a frequency response plot of the spatial Xs with crosstalk processing can be obtained through simulation. By analyzing the frequency response plot, any spectral defects such as peaks or troughs in the frequency response plot over a predetermined threshold (e.g., 10 dB) occurring as an artifact of the crosstalk processing can be estimated. The side crosstalk compensation channel Zs can be generated by the side component processor 1630 to compensate for the estimated peaks or troughs. Specifically, based on the specific delay, filtering frequency, and gain applied in the crosstalk processing, peaks and troughs shift up and down in the frequency response, causing variable amplification and/or attenuation of energy in specific regions of the spectrum. Each of the side filters 1650 may be configured to adjust for one or more of the peaks and troughs. In some embodiments, the mid component processor 1620 and the side component processor 1630 may include a different number of filters.

In some embodiments, the mid filters 1640 and side filters 1650 may include a biquad filter having a transfer function defined by Equation (7). One way to implement such a filter is the direct form I topology as defined by Equation (22):

$$Y[n] = \frac{b_0}{a_0}X[n-1] + \frac{b_1}{a_0}X[n-1] + \frac{b_2}{a_0}X[n-2] - \frac{a_1}{a_0}Y[n-1] - \frac{a_2}{a_0}Y[n-2] \quad (22)$$

where X is the input vector, and Y is the output. Other topologies may be used, depending on their maximum word-length and saturation behaviors. The biquad can then be used to implement a second-order filter with real-valued inputs and outputs. To design a discrete-time filter, a continuous-time filter is designed, and then transformed into discrete time via a bilinear transform. Furthermore, resulting shifts in center frequency and bandwidth may be compensated using frequency warping.

For example, a peaking filter may have an S-plane transfer function defined by Equation (23):

$$H(s) = \frac{s^2 + s\left(\frac{A}{Q}\right) + 1}{s^2 + s\left(\frac{A}{Q}\right) + 1} \quad (23)$$

where s is a complex variable, A is the amplitude of the peak, and Q is the filter "quality," and the digital filter coefficients are defined by the following Equations (24):

$$b_0 = 1 + \alpha A \quad (24)$$
$$b_1 = -2 * \cos(\omega_0)$$
$$b_2 = 1 - \alpha A$$
$$a_0 = 1 + \frac{\alpha}{A}$$
$$a_1 = -2\cos(\omega_0)$$
$$a_2 = 1 + \frac{\alpha}{A}$$

where $\omega_0$ is the center frequency of the filter in radians and $$\alpha = \frac{\sin(\omega_0)}{2Q}.$$

Furthermore, the filter quality Q may be defined by Equation (25):

$$Q = \frac{f_c}{\Delta f} \quad (25)$$

where is a bandwidth and $f_c$ is a center frequency. The mid filters 1640 are shown as being in a series, and the side filters 1650 are shown as being in a series. In some embodiments, the mid filters 1640 are applied in parallel to the mid component $X_m$, and the side filters are applied in parallel to the side component $X_s$.

In some embodiments, the crosstalk compensation processor module 1610 processes each of the hyper mid component M1, hyper side component S1, residual mid component M2, and residual side component S2. The filters applied to of each of these components may be different.

Example Crosstalk Processor

Figure 17:
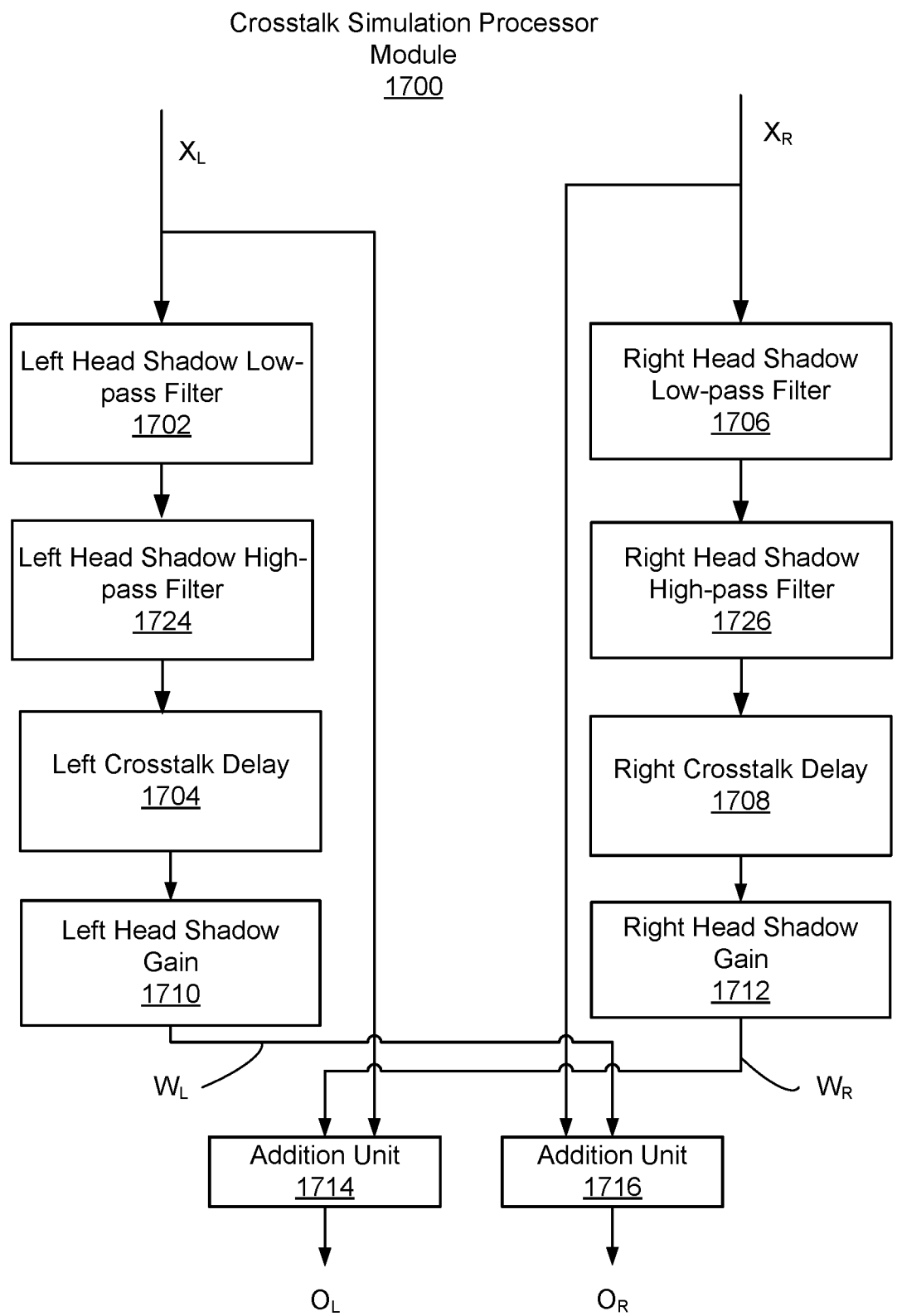
FIG. 17 is a block diagram of a crosstalk simulation processor module, in accordance with one or more embodiments.

FIG. 17 is a block diagram of a crosstalk simulation processor module 1700, in accordance with one or more embodiments. The crosstalk simulation processor module 1700 is an example of a crosstalk processor module 110 or crosstalk processor module 1224. Some embodiments of the crosstalk simulation processor module 1700 have different components than those described here. Similarly, in some cases, functions can be distributed among the components in a different manner than is described here.

The crosstalk simulation processor module 1700 generates contralateral sound components for output to the stereo headphones, thereby providing a loudspeaker-like listening experience on headphones. The left input channel $X_L$ may be the processed left component 134/1220 and the right input channel $X_R$ may be the processed right component 136/1222.

The crosstalk simulation processor module 1700 includes a left head shadow low-pass filter 1702, a left head shadow high-pass filter 1724, a left cross-talk delay 1704, and a left head shadow gain 1710 to process the left input channel $X_L$. The crosstalk simulation processor module 1700 further includes a right head shadow low-pass filter 1706, a right head shadow high-pass filter 1726, a right cross-talk delay 1708, and a right head shadow gain 1712 to process the right input channel $X_R$. The crosstalk simulation processor module 1500 further includes an addition unit 1714 and an addition unit 1716.

The left head shadow low-pass filter 1702 and left head shadow high-pass filter 1724 apply modulation on the left input channel $X_L$ that models the frequency response of the signal after passing through the listener's head. The output of the left head shadow high-pass filter 1724 is provided to the left crosstalk delay 1704, which applies a time delay. The time delay represents transaural distance that is traversed by a contralateral sound component relative to an ipsilateral sound component. The left head shadow gain 1710 applies a gain to the output of the left crosstalk delay 1704 to generate the right left simulation channel $W_L$.

Similarly for the right input channel $X_R$, the right head shadow low-pass filter 1706 and right head shadow high-pass filter 1726 apply modulation to the right input channel $X_R$ that models the frequency response of the listener's head. The output of the right head shadow high-pass filter 1726 is provided to the right crosstalk delay 1708, which applies a time delay. The right head shadow gain 1712 applies a gain to the output of the right crosstalk delay 1708 to generate the right crosstalk simulation channel $W_R$.

The application of the head shadow low-pass filter, head shadow high-pass filter, crosstalk delay, and head shadow gain for each of the left and right channels may be performed in different orders.

The addition unit 1714 adds the right crosstalk simulation channel $W_R$ and the left input channel $X_L$ to generate a left output channel $O_L$. The addition unit 1716 adds the left crosstalk simulation channel $W_L$ with the right input channel $X_R$ to generate a left output channel $O_R$.

Figure 18:
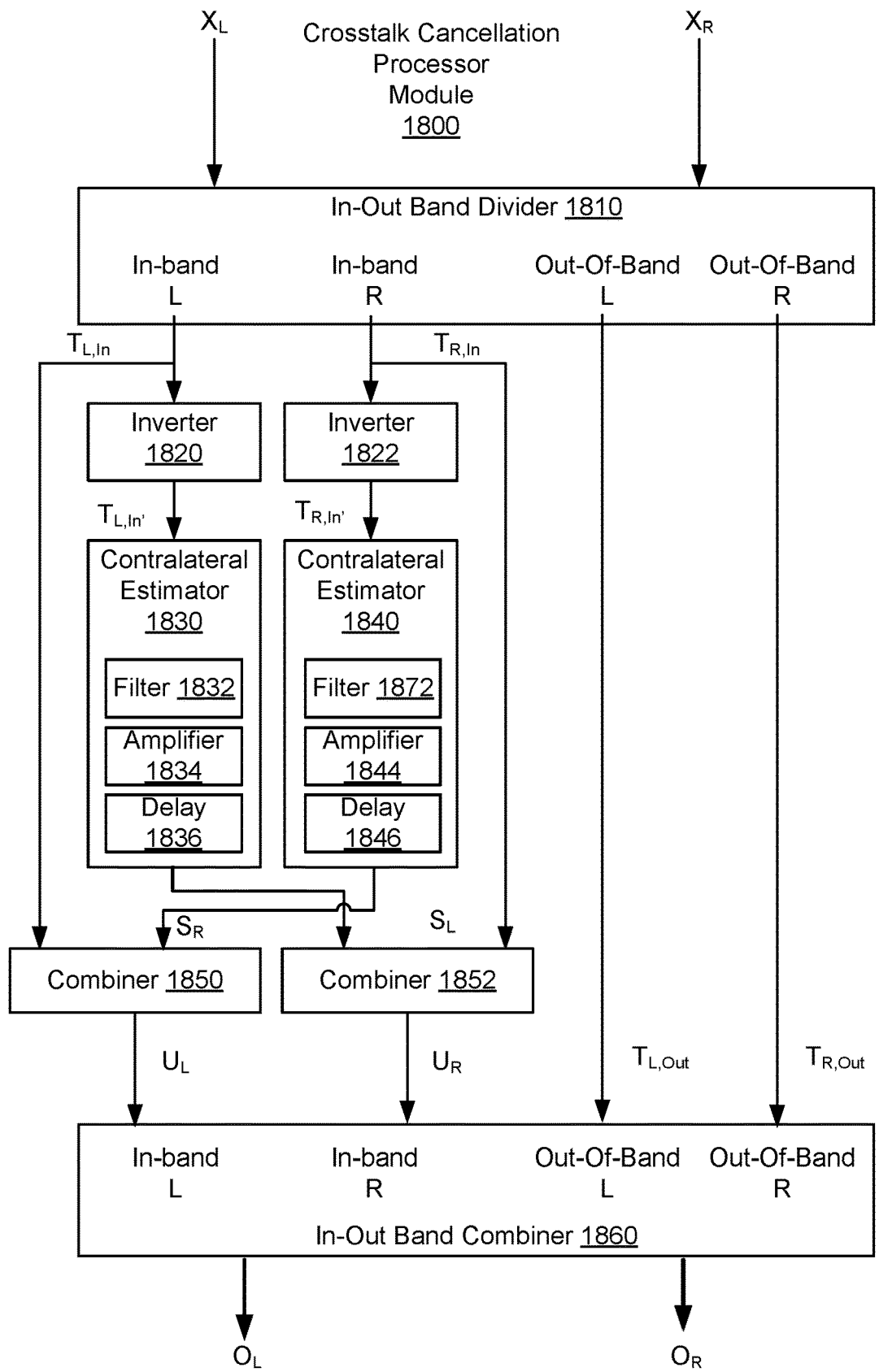
FIG. 18 is a block diagram of a crosstalk cancellation processor module, in accordance with one or more embodiments.

FIG. 18 is a block diagram of a crosstalk cancellation processor module 1800, in accordance with one or more embodiments. The crosstalk cancellation processor module 1800 is an example of a crosstalk processor module 110 or crosstalk processor module 1224. Some embodiments of the cancellation processor module 1800 have different components than those described here. Similarly, in some cases, functions can be distributed among the components in a different manner than is described here.

The crosstalk cancellation processor module 1800 receives a left input channel $X_L$ and the right input channel $X_R$, and performs crosstalk cancellation on the channels $X_L$, $X_R$ to generate the left output channel $O_L$, and the right output channel $O_R$. The left input channel $X_L$ may be the processed left component 134/1220 and the right input channel $X_R$ may be the processed right component 136/1222.

The crosstalk cancellation processor module 1800 includes an in-out band divider 1810, inverters 1820 and 1822, contralateral estimators 1830 and 1840, combiners 1850 and 1852, and an in-out band combiner 1860. These components operate together to divide the input channels $T_L$, $T_R$ into in-band components and out-of-band components, and perform a crosstalk cancellation on the in-band components to generate the output channels $O_L$, $O_R$.

By dividing the input audio signal T into different frequency band components and by performing crosstalk cancellation on selective components (e.g., in-band components), crosstalk cancellation can be performed for a particular frequency band while obviating degradations in other frequency bands. If crosstalk cancellation is performed without dividing the input audio signal T into different frequency bands, the audio signal after such crosstalk cancellation may exhibit significant attenuation or amplification in the nonspatial and spatial components in low frequency (e.g., below 350 Hz), higher frequency (e.g., above 12000 Hz), or both. By selectively performing crosstalk cancellation for the in-band (e.g., between 250 Hz and 14000 Hz), where the vast majority of impactful spatial cues reside, a balanced overall energy, particularly in the nonspatial component, across the spectrum in the mix can be retained.

The in-out band divider 1810 separates the input channels $T_L$, $T_R$ into in-band channels $T_{L,In}$, $T_{R,In}$, and out of band channels $T_{L,Out}$, $T_{R,Out}$, respectively. Particularly, the in-out band divider 1810 divides the left enhanced compensation channel $T_L$ into a left in-band channel $T_{L,In}$ and a left out-of-band channel $T_{L,Out}$. Similarly, the in-out band divider 1810 separates the right enhanced compensation channel $T_R$ into a right in-band channel $T_{R,In}$ and a right out-of-band channel $T_{R,Out}$. Each in-band channel may encompass a portion of a respective input channel corresponding to a frequency range including, for example, 250 Hz to 14 kHz. The range of frequency bands may be adjustable, for example according to speaker parameters.

The inverter 1820 and the contralateral estimator 1830 operate together to generate a left contralateral cancellation component $S_L$ to compensate for a contralateral sound component due to the left in-band channel $T_{L,In}$. Similarly, the inverter 1822 and the contralateral estimator 1840 operate together to generate a right contralateral cancellation component $S_R$ to compensate for a contralateral sound component due to the right in-band channel $T_{R,In}$.

In one approach, the inverter 1820 receives the in-band channel $T_{L,In}$ and inverts a polarity of the received in-band channel $T_{L,In}$ to generate an inverted in-band channel $T_{L,In}'$. The contralateral estimator 1830 receives the inverted in-band channel $T_{L,In}'$, and extracts a portion of the inverted in-band channel $T_{L,In}'$ corresponding to a contralateral sound component through filtering. Because the filtering is performed on the inverted in-band channel $T_{L,In}'$, the portion extracted by the contralateral estimator 1830 becomes an inverse of a portion of the in-band channel $T_{L,In}$ attributing to the contralateral sound component. Hence, the portion extracted by the contralateral estimator 1830 becomes a left contralateral cancellation component $S_L$, which can be added to a counterpart in-band channel $T_{R,In}$ to reduce the contralateral sound component due to the in-band channel $T_{L,In}$. In some embodiments, the inverter 1820 and the contralateral estimator 1830 are implemented in a different sequence.

The inverter 1822 and the contralateral estimator 1840 perform similar operations with respect to the in-band channel $T_{R,In}$ to generate the right contralateral cancellation component $S_R$. Therefore, detailed description thereof is omitted herein for the sake of brevity.

In one example implementation, the contralateral estimator 1830 includes a filter 1832, an amplifier 1834, and a delay unit 1836. The filter 1832 receives the inverted input channel $T_{L,In}'$ and extracts a portion of the inverted in-band channel $T_{L,In}'$ corresponding to a contralateral sound component through a filtering function. An example filter implementation is a Notch or Highshelf filter with a center frequency selected between 5000 and 10000 Hz, and Q selected between 0.5 and 1.0. Gain in decibels ($G_{dB}$) may be derived from Equation (26):

$$G_{dB} = -3.0 - \log_{1.333}(D) \qquad (26)$$

where D is a delay amount by delay unit 1836 in samples, for example, at a sampling rate of 48 KHz. An alternate implementation is a Lowpass filter with a corner frequency selected between 5000 and 10000 Hz, and Q selected between 0.5 and 1.0. Moreover, the amplifier 1834 amplifies the extracted portion by a corresponding gain coefficient $G_{L,In}$, and the delay unit 1836 delays the amplified output from the amplifier 1834 according to a delay function D to generate the left contralateral cancellation component $S_L$. The contralateral estimator 1840 includes a filter 1842, an amplifier 1844, and a delay unit 1846 that performs similar operations on the inverted in-band channel $T_{R,In}'$ to generate the right contralateral cancellation component $S_R$. In one example, the contralateral estimators 1830, 1840 generate the left and right contralateral cancellation components $S_L$, $S_R$, according to equations below:

$$S_L = D[G_{L,In} * F[T'_{L,In}]] \qquad (27)$$

$$S_R = D[G_{R,In} * F[T'_{R,In}]] \qquad (28)$$

where F[ ] is a filter function, and D[ ] is the delay function.

The configurations of the crosstalk cancellation can be determined by speaker parameters. In one example, filter center frequency, delay amount, amplifier gain, and filter gain can be determined, according to an angle formed between two speakers with respect to a listener. In some embodiments, values between the speaker angles are used to interpolate other values.

The combiner 1850 combines the right contralateral cancellation component SR to the left in-band channel TL,In to generate a left in-band crosstalk channel UL, and the combiner 1852 combines the left contralateral cancellation component SL to the right in-band channel TR,In to generate a right in-band crosstalk channel UR. The in-out band combiner 1860 combines the left in-band crosstalk channel UL with the out-of-band channel TL,Out to generate the left output channel OL, and combines the right in-band crosstalk channel UR with the out-of-band channel TR,Out to generate the right output channel OR.

Accordingly, the left output channel OL includes the right contralateral cancellation component SR corresponding to an inverse of a portion of the in-band channel TR,In attributing to the contralateral sound, and the right output channel OR includes the left contralateral cancellation component SL corresponding to an inverse of a portion of the in-band channel TL,In attributing to the contralateral sound. In this configuration, a wavefront of an ipsilateral sound component output by a right loudspeaker according to the right output channel OR arrived at the right ear can cancel a wavefront of a contralateral sound component output by a left loudspeaker according to the left output channel OL. Similarly, a wavefront of an ipsilateral sound component output by the left loudspeaker according to the left output channel OL arrived at the left ear can cancel a wavefront of a contralateral sound component output by the right loudspeaker according to right output channel $O_R$. Thus, contralateral sound components can be reduced to enhance spatial detectability.

Example PSM Process Flows

FIG. 19 is a flowchart of a process 1900 for PSM processing, in accordance with one or more embodiments. The process 1900 may include fewer or additional steps, and steps may be performed in different orders. In some embodiments, the PSM processing may be performed using a Hilbert Transform Perceptual Soundstage Modification (HPSM) Module.

An audio processing system (e.g., PSM module 102 of audio processing system 100 or 1200) separates 1905 an input channel into a low frequency component and a high frequency component. The crossover frequency that defines the boundary between the low frequency component and the high frequency component may be adjustable, such as to ensure that frequencies are interest for PSM processing are included in the high frequency component. In some embodiments, the audio processing system applies a gain to the low frequency component and/or the high frequency component.

The input channel may be a particular portion of an audio signal that is extracted for PSM processing. In some embodiments, the input channel is a mid component or a side component of an (e.g., stereo or multi-channel) audio signal. In some embodiments, the input channel is a hyper mid component, a hyper side component, a residual mid component, or a residual side component of an audio signal. In some embodiments, the input channel is associated with a sound source, such as a voice or instrument, that is to be combined into an audio mix with other sounds.

The audio processing system applies 1910 a first Hilbert Transform to the high frequency component to generate a first left leg component and a first right leg component, the first left leg component being 90 degrees out of phase with respect to the first right leg component.

The audio processing system applies 1915 a second Hilbert Transform to the first right leg component to generate a second left leg component and a second right leg component, the first left leg component being 90 degrees out of phase with respect to the first right leg component.

In some embodiments, the audio processing system applies a delay and/or gain to the first left leg component. The audio processing system may apply a delay and/or gain to the second right leg components. These gains and delays may be used to manipulate the perceptual results of the PSM processing.

The audio processing system combines 1920 the first left leg component with the low frequency component to generate a left channel. The audio processing system combines 1925 the second right leg component with the low frequency component to generate a right channel. The left channel may be provided to a left speaker and the right channel may be provided to a right speaker.

FIG. 20 is a flowchart of another process 2000 for PSM processing using a First Order Non-Orthogonal Rotation-Based Decorrelation (FNORD) filter network, in accordance with some embodiments. The process shown in FIG. 20 may be performed by components of an audio system (e.g., system 100, 202, or 1200). Other entities may perform some or all of the steps in FIG. 20 in other embodiments. Embodiments may include different and/or additional steps, or perform the steps in different orders.

The audio system determines 2005 a target amplitude response defining one or more spatial cues to be encoded into a monaural audio signal to generate a plurality of resulting channels, wherein the one or more spatial cues are associated with one or more frequency-dependent amplitude cues encoded into the mid/side space of the resulting channels, that do not change the overall coloration of the resulting channels. The one or more spatial cues may include at least one elevation cue associated with a target angle of elevation. Each elevation cue may correspond to one or more frequency-dependent amplitude cues to be encoded into the mid/side space of the audio signal, such as a target magnitude function corresponding to a narrow region of infinite attenuation at one or more particular frequencies. On the other hand, since left/right cues for elevation are typically symmetric in coloration, the left/right signal may be constrained to be colorless. In some embodiments, a spatial cue may be based upon a sampled HRTF.

In some embodiments, the target amplitude response may further define one or more parametric spatial cues, which may include a target broadband attenuation, a target subband attenuation, a critical point, a filter characteristic, and/or a soundstage location where the cue is to be embedded. The critical point may be an inflection point at 3 dB. The filter characteristic may include one of a high-pass filter characteristic, a low-pass characteristic, a band-pass characteristic, or a band-reject characteristic. The soundstage location may include the mid or side channels, or in the case where the number of output channels is greater than two, other subspaces within the output space, such as those determined via pairwise and/or hierarchical summations and/or differences. The one or more spatial cues may be determined based on characteristics of the presentation device (e.g., frequency response of speakers, location of speakers), the expected content of the audio data, the perceptual capacity of the listener in context, or the minimum quality expected of the audio presentation system involved. For example, if the speaker is incapable of sufficiently reproducing frequencies below 200 Hz, the a spatial cue embedded in this range should be avoided. Similarly, if the expected audio content is speech, the audio system may select a target amplitude response which only affects frequencies to which the ear is most sensitive, which lie within the expected bandwidth of speech. If the listener will be deriving audible cues from other sources in context, such as another array of speakers in the location, the audio system may determine a target amplitude response which is complementary to those simultaneous cues.

The audio system determines 2010 a transfer function for a single-input, multi-output allpass filter based on the target amplitude response. The transfer function defines relative rotations of phase angles of the output channels. The transfer function describes the effect a filter network has on its input, for each output, in terms of phase angle rotations as a function of frequency.

The audio system determines 2015 coefficients of the allpass filter based on the transfer function. These coefficients will be selected and applied to the incoming audio stream in the manner best suited for the type of cues and/or constraints. Some examples of coefficient sets are defined in Equations (12), (13), (17), and (19). In some embodiments, determining the coefficients of the allpass filter based on the transfer function includes using an inverse discrete fourier transform (idft). In this case, the coefficient set may be determined as defined by Equation (19). In some embodiments, determining the coefficients of the allpass filter based on the transfer function includes using a phase-vocoder. In this case, the coefficient set may be determined as defined by Equation (19), except these would be applied in the frequency domain, prior to resynthesizing time-domain data. In some embodiments, the coefficients include at least a rotation control parameter and a first-order coefficient, which are determined based upon the a received critical point parameters, filter characteristic parameter, and soundstage location parameter.

The audio system 2020 processes the monaural channel with the coefficients of the allpass filter to generate a plurality of channels. For example, in some embodiments, the allpass filter module receives the monaural audio channel, and performs a broadband phase rotation on the monaural audio channel to generate a plurality of broadband rotated component channels (e.g., left and right broadband rotated components), based upon a rotation control parameter, and a narrow-band phase rotation on at least one of the plurality of broadband rotated component channels based upon a first-order coefficient to determine a narrowband rotated component channel, which together with one or more remaining channels of the broadband rotated component channels, form the plurality of channels output by the audio system.

In some embodiments, if the system is operating in the time-domain, using an IIR implementation, as in Equations (8), the coefficients may scale the appropriate feedback and feedforward delays. If an FIR implementation is used, as in Equation (19), then only feedforward delays may be used. If the coefficients are determined and applied in the spectral domain, they may be applied as a complex multiplication to spectral data prior to resynthesis. The audio system may provide the plurality of output channels to presentation device, such as a user device that is connected to the audio system via a network.

The example PSM processing flows described above each utilize a network of allpass filters to encode spatial cues by perceptually placing monaural content into a particular location in the soundstage (e.g., location associated with a target elevation angle). Because the allpass filter networks described herein are colorless, these filters allow the user to decouple the spatial placement of the audio from its overall coloration.

Orthogonal Component Spatial Processing

Figure 21:
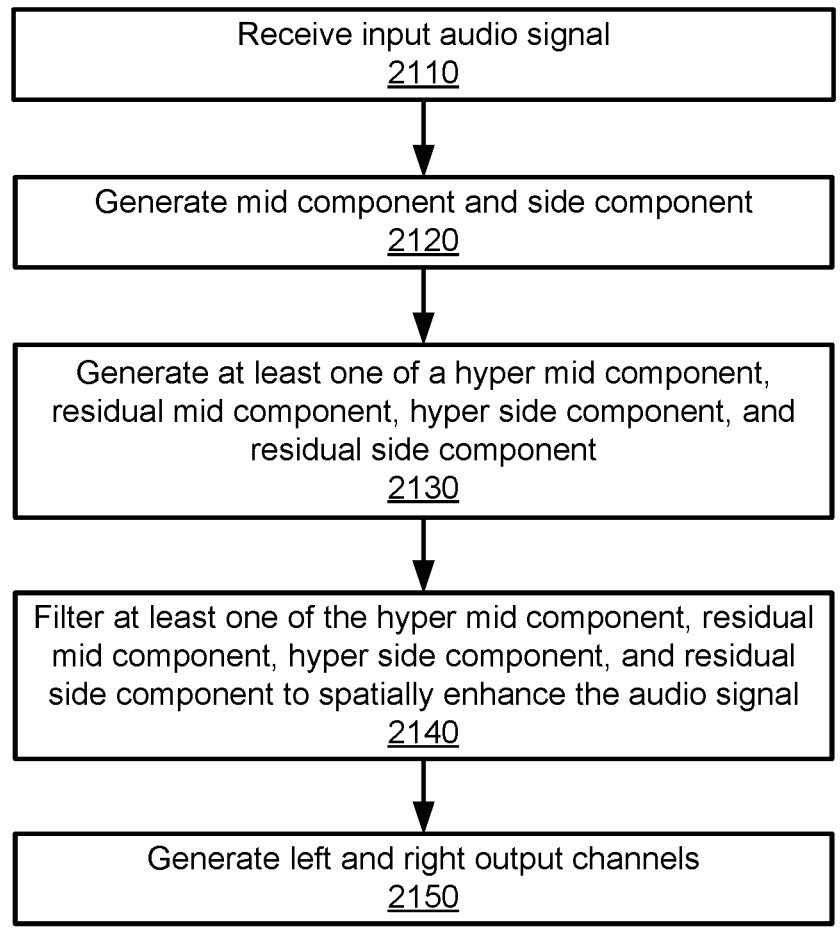
FIG. 21 is a flowchart of a process for spatial processing using at least one of a hyper mid, residual mid, hyper side, or residual side component, in accordance with one or more embodiments.

FIG. 21 is a flowchart of a process 2100 for spatial processing using at least one of a hyper mid, residual mid, hyper side, or residual side component, in accordance with one or more embodiments. The spatial processing may include gain application, amplitude or delay-based panning, binaural processing, reverberation, dynamic range processing such as compression and limiting, linear or non-linear audio processing techniques and effects, chorus effect, flanging effect, machine learning-based approaches to vocal or instrumental style transfer, conversion or re-synthesis, among other techniques. The process may be performed to provide spatially enhanced audio to a device of a user. The process may include fewer or additional steps, and steps may be performed in different orders.

An audio processing system (e.g., the audio processing system 1200) receives 2110 an input audio signal (e.g., the left channel 1202 and the right input channel 1204). In some embodiments, the input audio signal may be a multi-channel audio signal including multiple left-right channel pairs. Each left-right channel pair may be processed as discussed herein for the left and right input channels.

The audio processing system generates 2120 a nonspatial mid component (e.g., the mid component 1208) and a spatial side component (e.g., the side component 1210) from the input audio signal. In some embodiments, an L/R to M/S converter (e.g., the L/R to M/S converter module 1206) performs the conversion of the input audio signal to mid and side components.

The audio processing system generates 2130 at least one of a hyper mid component (e.g., the hyper mid component M1), a hyper side component (e.g., the hyper side component S1), a residual mid component (e.g., the residual mid component M2), and a residual side component (e.g., the residual side component S2). The audio processing system may generate at least one and/or all of the components listed above. The hyper mid component includes spectral energy of the side component removed from spectral energy of the mid component. The residual mid component includes spectral energy of the hyper mid component removed from the spectral energy of the mid component. The hyper side component includes spectral energy of the mid component removed from spectral energy of the side component. The residual side component includes spectral energy of the hyper side component removed from spectral energy of the side component. The processing used to generate M1, M2, S1, or S2 may be performed in the frequency domain or the time domain.

The audio processing system filters 2140 at least one of the hyper mid component, the residual mid component, the hyper side component, and the residual side component to enhance the audio signal. The filtering may include HPSM processing, where a series of Hilbert Transforms are applied to a high frequency component of the hyper mid component, the residual mid component, the hyper side component, or the residual side component. In one example, the hyper mid component receives HPSM processing while one or more of the residual mid component, the hyper side component, or the residual side component receive other types of filtering.

The filtering may include PSM processing, where spatial cues are encoded colorlessly either through parametric specification of the spatial cue, as discussed in greater detail above in connection with FIGS. 10A and 10B, or via anthropometric sampling of HRTF data as discussed above in connection with Equation (20). In one example, the hyper mid component receives PSM processing while one or more of the residual mid component, the hyper side component, or the residual side component receive no filtering or other types of filtering.

The filtering may include other types of filtering, such as spatial cue processing. Spatial cue processing may include adjusting a frequency dependent amplitude or a frequency dependent delay of the hyper mid component, residual mid component, hyper side component, or residual side component. Some examples of spatial cue processing include amplitude or delay-based panning or binaural processing.

The filtering may include dynamic range processing, such as compression or limiting. For example, the hyper mid component, residual mid component, hyper side component, or residual side component may be compressed according to a compression ratio when a threshold level for compression is exceeded. In another example, the hyper mid component, residual mid component, hyper side component, or residual side component may be limited to a maximum level when a threshold level for limiting is exceeded.

The filtering may include machine-learning based alterations to the hyper mid component, residual mid component, hyper side component, or residual side component. Some examples include machine-learning based vocal or instrumental style transfer, conversion, or re-synthesis.

The filtering of the hyper mid component, residual mid component, hyper side component, or residual side component may include gain application, reverberation, as well as other linear or non-linear audio processing techniques and effects ranging from chorus and/or flanging, or other types of processing. In some embodiments, the filtering may include filtering for subband spatial processing and crosstalk compensation, as discussed in greater detail below in connection with FIG. 22.

The filtering may be performed in the frequency domain or the time domain. In some embodiments, the mid and side components are converted from the time domain into the frequency domain, the hyper and/or residual components are generated in the frequency domain, the filtering is performed in the frequency domain, and the filtered components are converted to the time domain. In other embodiments, the hyper and/or residual components are converted to the time domain, and the filtering is performed in the time domain on these components.

The audio processing system generates 2150 a left output channel (e.g., the left output channel 1242) and a right output channel (e.g., the right output channel 1244) using one or more of the filtered hyper/residual components. For example, conversion from M/S to L/R may be performed using a mid component or a side component generated from at least one of the filtered hyper mid component, filtered residual mid component, filtered hyper side component, or filtered residual side component. In another example, the filtered hyper mid component or filtered residual mid component may be used as the mid component for M/S to L/R conversion, or the filtered hyper side component or residual side component may be used as the side component for M/S to L/R conversion.

Orthogonal Component Subband Spatial and Crosstalk Processing

Figure 22:
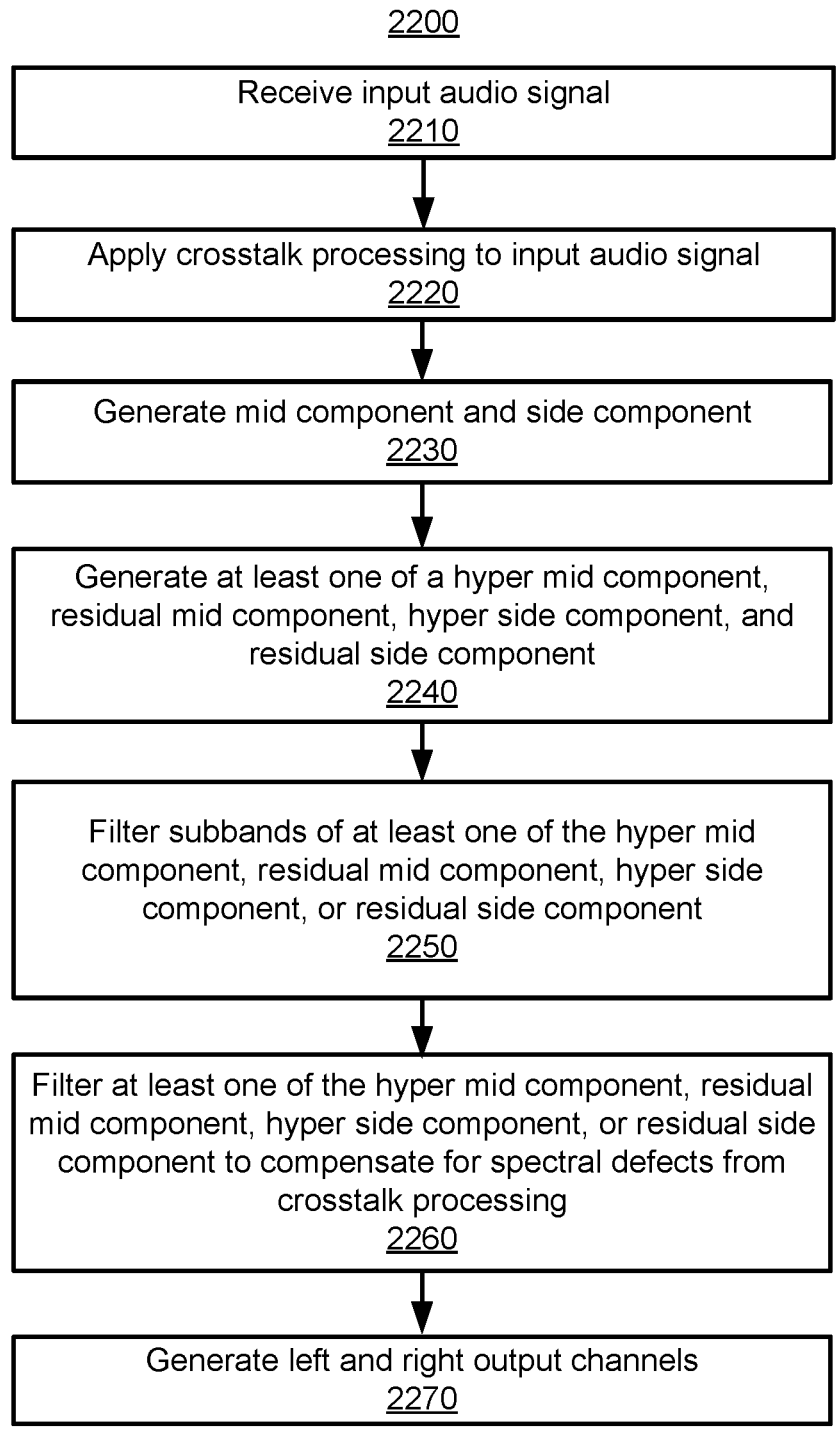
FIG. 22 is a flowchart of a process for subband spatial processing and compensation for crosstalk processing using at least one of a hyper mid, residual mid, hyper side, or residual side component, in accordance with one or more embodiments.

FIG. 22 is a flowchart of a process 2200 for subband spatial processing and compensation for crosstalk processing using at least one of a hyper mid, residual mid, hyper side, or residual side component, in accordance with one or more embodiments. The crosstalk processing may include crosstalk cancellation or crosstalk simulation. Subband spatial processing may be performed to provide audio content with enhanced spatial detectability, such as by creating the perception that sounds are directed to the listener from a large area rather than specific points in space corresponding to the locations of the loudspeakers (e.g. soundstage enhancement), and thereby producing a more immersive listening experience to the listener. Crosstalk simulation may be used for audio output to headphones to simulate a loudspeaker experience with contralateral crosstalk. Crosstalk cancellation may be used for audio output to loudspeakers to remove the effects of crosstalk interference. Crosstalk compensation compensates for spectral defects caused by the crosstalk cancellation or crosstalk simulation. The process may include fewer or additional steps, and steps may be performed in different orders. Hyper and residual mid/side components can be manipulated in different ways for different purposes. For example, in the case of crosstalk compensation, targeted subband filtering may be applied only to the hyper mid component M1 (where the majority of the vocal dialog energy in much cinematic content occurs) in an effort to remove spectral artifacts resulting from the crosstalk processing only in that component. In the case of soundstage enhancement with or without crosstalk processing, targeted subband gains may be applied to the residual mid component M2 and residual side component S2. For example, the residual mid component M2 may be attenuated and the residual side component S2 may be inversely amplified to increase the distance between these components from a gain perspective (which, if tastefully done can increase spatial detectability) without creating a drastic overall change in perceptual loudness in the final L/R signal, while also avoiding attenuation in the hyper mid M1 component (e.g., being that portion of the signal that often contains the majority of the vocal energy).

The audio processing system receives 2210 the input audio signal, the input audio signal including the left and right channels. In some embodiments, the input audio signal may be a multi-channel audio signal including multiple left-right channel pairs. Each left-right channel pair may be processed as discussed herein for the left and right input channels.

The audio processing system applies 2220 crosstalk processing to the received input audio signal. The crosstalk processing includes at least one of crosstalk simulation and crosstalk cancellation.

In steps 2230 through 2260, the audio processing system performs subband spatial processing and crosstalk compensation for the crosstalk processing using one or more of the hyper mid, hyper side, residual mid, or residual side components. In some embodiments, the crosstalk processing may be performed after the processing in steps 2230 through 2260.

The audio processing system generates 2230 a mid component and a side component from the (e.g., crosstalk processed) audio signal.

The audio processing system generates 2240 at least one of a hyper mid component, a residual mid component, a hyper side component, and a residual side component. The audio processing system may generate at least one and/or all of the components listed above.

The audio processing system filters 2250 subbands of at least one of the hyper mid component, the residual mid component, hyper side component, and residual side component to apply a subband spatial processing to the audio signal. Each subband may include a range of frequencies, such as may be defined by sets of critical bands. In some embodiments, the subband spatial processing further includes time delaying subbands of at least one of the hyper mid component, the residual mid component, hyper side component, and residual side component. In some embodiments, the filtering includes applying HPSM processing.

The audio processing system filters 2260 at least one of the hyper mid component, the residual mid component, hyper side component, and residual side component to compensate for spectral defects from the crosstalk processing of the input audio signal. The spectral defects may include peaks or troughs in the frequency response plot of the hyper mid component, the residual mid component, hyper side component, or residual side component over a predetermined threshold (e.g., 10 dB) occurring as an artifact of the crosstalk processing. The spectral defects may be estimated spectral defects.

In some embodiments, the filtering of spectrally orthogonal components for subband spatial processing in step 2250 and crosstalk compensation in step 2260 may be integrated into a single filtering operation for each spectrally orthogonal component selected for the filtering.

In some embodiments, the filter of the hyper/residual mid/side components for subband spatial processing or crosstalk compensation may be performed in connection with filtering for other purposes, such as gain application, amplitude or delay-based panning, binaural processing, reverberation, dynamic range processing such as compression and limiting, linear or non-linear audio processing techniques and effects ranging from chorus and/or flanging, machine learning-based approaches to vocal or instrumental style transfer, conversion or re-synthesis, or other types of processing using any of the hyper mid component, residual mid component, hyper side component, and residual side component.

The filtering may be performed in the frequency domain or the time domain. In some embodiments, the mid and side components are converted from the time domain into the frequency domain, the hyper and/or residual components are generated in the frequency domain, the filtering is performed in the frequency domain, and the filtered components are converted to the time domain. In other embodiments, the hyper and/or residual components are converted to the time domain, and the filtering is performed in the time domain on these components.

The audio processing system generates 2270 a left output channel and a right output channel from the filtered hyper mid component. In some embodiments, the left and right output channels are additionally based on at least one of the filtered residual mid component, filtered hyper side component, and filtered residual side component.

Example Computer

Figure 23:
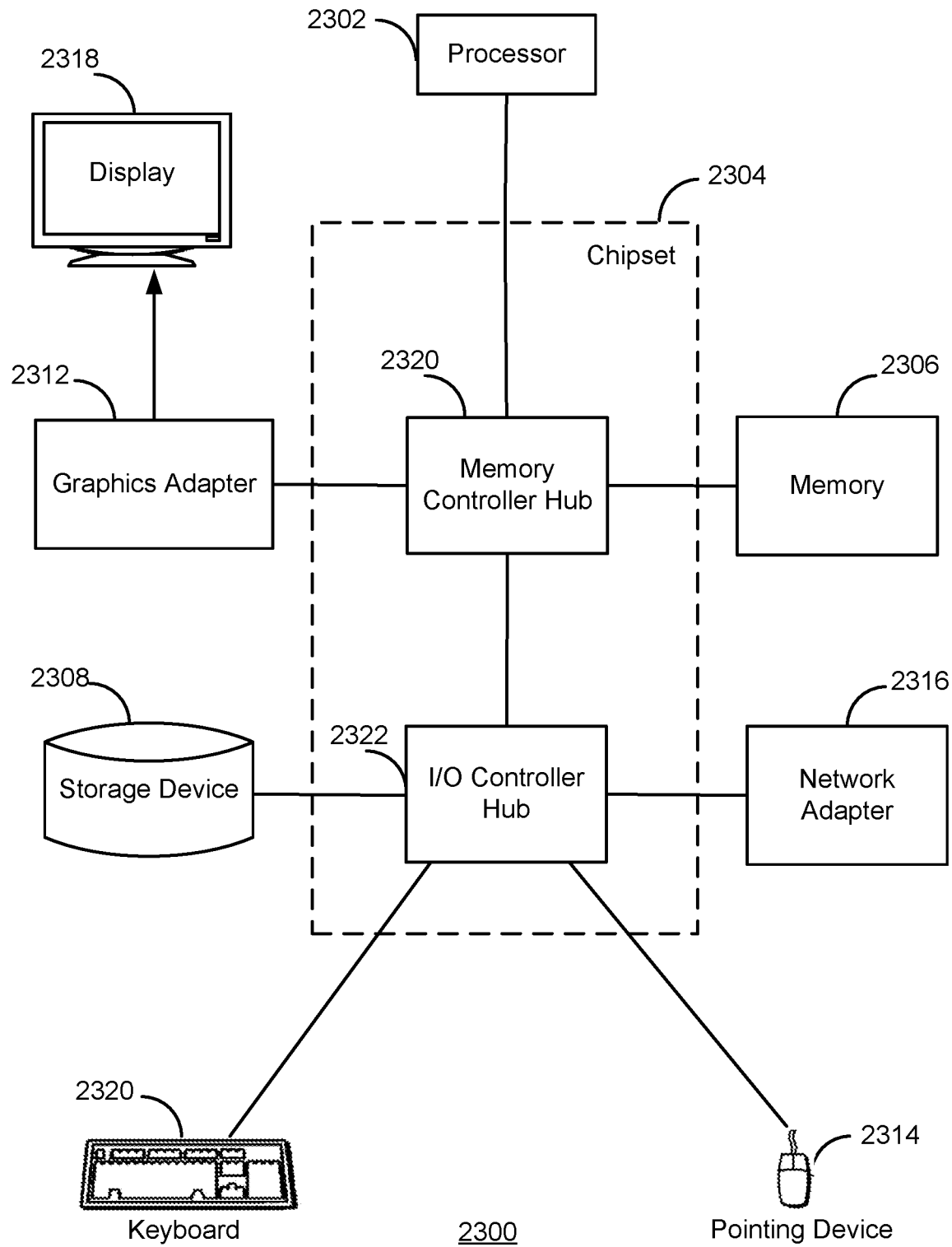
FIG. 23 is a block diagram of a computer, in accordance with some embodiments.

FIG. 23 is a block diagram of a computer 2300, in accordance with some embodiments. The computer 2300 is an example of computing device including circuitry that implements an audio system, such as the audio system 100, 202, or 1200. Illustrated are at least one processor 2302 coupled to a chipset 2304. The chipset 2304 includes a memory controller hub 2320 and an input/output (I/O) controller hub 2322. A memory 2306 and a graphics adapter 2312 are coupled to the memory controller hub 2320, and a display device 2318 is coupled to the graphics adapter 2312. A storage device 2308, keyboard 2310, pointing device 2314, and network adapter 2316 are coupled to the I/O controller hub 2322. The computer 2300 may include various types of input or output devices. Other embodiments of the computer 2300 have different architectures. For example, the memory 2306 is directly coupled to the processor 2302 in some embodiments.

The storage device 2308 includes one or more non-transitory computer-readable storage media such as a hard drive, compact disk read-only memory (CD-ROM), DVD, or a solid-state memory device. The memory 2306 holds program code (comprised of one or more instructions) and data used by the processor 2302. The program code may correspond to the processing aspects described with reference to FIGS. 1 through 2.

The pointing device 2314 is used in combination with the keyboard 2310 to input data into the computer system 2300. The graphics adapter 2312 displays images and other information on the display device 2318. In some embodiments, the display device 2318 includes a touch screen capability for receiving user input and selections. The network adapter 2316 couples the computer system 2300 to a network. Some embodiments of the computer 2300 have different and/or other components than those shown in FIG. 23.

Circuitry may include one or more processors that execute program code stored in a non-transitory computer readable medium, the program code when executed by the one or more processors configures the one or more processors to implement an audio system or modules of the audio system. Other examples of circuitry that implements an audio system or modules of the audio system may include an integrated circuit, such as an application-specific integrated circuit (ASIC), field-programmable gate array (FPGA), or other types of computer circuits.

Additional Considerations

Example benefits and advantages of the disclosed configurations include dynamic audio enhancement due to the enhanced audio system adapting to a device and associated audio rendering system as well as other relevant information made available by the device OS, such as use-case information (e.g., indicating that the audio signal is used for music playback rather than for gaming). The enhanced audio system may either be integrated into a device (e.g., using a software development kit) or stored on a remote server to be accessible on-demand. In this way, a device need not devote storage or processing resources to maintenance of an audio enhancement system that is specific to its audio rendering system or audio rendering configuration. In some embodiments, the enhanced audio system enables varying levels of querying for rendering system information such that effective audio enhancement can be applied across varying levels of available device-specific rendering information.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Upon reading this disclosure, those of skill in the art will appreciate still additional alternative structural and functional designs for a system and a process for audio content decorrelation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system, comprising:
one or more processors; and
a non-transitory computer readable medium comprising stored program code that when executed by the one or more processors, configures the one or more processors to:
separate an audio channel into a low frequency component and a high frequency component;
determine a target amplitude response defining one or more spatial cues;
convert the target amplitude response into a transfer function for configuring a single-input, multi-output allpass filter;
process the high frequency component using the allpass filter configured based upon the transfer function to produce a plurality of processed high frequency components;
combine the low frequency component with at least one of the plurality of processed high frequency components to generate one or more processed channels.

2. The system of claim 1, wherein the plurality of processed high frequency components comprises a first processed high frequency component and a second processed high frequency component, and wherein the program code further configures the one or more processors to:
combine the first processed high frequency component with the low frequency component to generate a left channel; and
combine the second processed high frequency component with the low frequency component to generate a right channel.

3. The system of claim 1, wherein the transfer function corresponds to a frequency-dependent phase shift.

4. The system of claim 1, wherein the target amplitude response defines spatial cues for a mid component or a side component of the plurality of processed high frequency components.

5. The system of claim 1, where the single-input, multi-output allpass filter is configured to apply a Hilbert transform to the high frequency component to generate a left leg component and a right leg component.

6. The system of claim 5, wherein the single-input, multi-output allpass filter is configured to:
apply a first series of allpass filters to the high frequency component to generate the left leg component; and
apply a first delay and a second series of allpass filters to the high frequency component to generate the right leg component.

7. The system of claim 5, wherein the single-input, multi-output allpass filter is configured to:
output the left leg component as a rotated right leg component;
perform a 2D rotation on the left leg component and right leg component;
output a rotated left leg component corresponding to a combined output of the 2D rotation performed on the left leg component and the right leg component.

8. The system of claim 1, wherein the single-input, multi-output allpass filter is configured to:
apply a first Hilbert Transform to the high frequency component to generate a first left leg component and a first right leg component, the first left leg component being 90 degrees out of phase with respect to the first right leg component;
apply a second Hilbert Transform to the first right leg component to generate a second left leg component and a second right leg component, the second left leg component being 90 degrees out of phase with respect to the second right leg component, wherein the plurality of processed high frequency components includes the first left leg component and the second right leg component.

9. The system of claim 1, wherein the program code further configures the one or more processors to:
generate a mid component and a side component from a received audio signal; and
generate a hyper mid component including spectral energy of the side component removed from spectral energy of the mid component, wherein the audio channel corresponds to at least the hyper mid component.

10. The system of claim 1, wherein the target amplitude response defines a compensated null for encoding a vertical spatial cue.

11. The system of claim 1, wherein the program code further configures the one or more processors to convert the target amplitude response into coefficients for the single-input, multi-output allpass filter using an inverse discrete fourier transform (idft).

12. The system of claim 1, wherein the program code further configures the one or more processors to convert the target amplitude response into coefficients for the single-input, multi-output allpass filter using a phase-vocoder.

13. The system of claim 1, wherein the target amplitude response defines one or more parametric spatial cues, including one or more of a target broadband attenuation, a critical point, a filter characteristic, and a soundstage location.

14. A non-transitory computer readable medium comprising stored program code, the program code when executed by one or more processors configures the one or more processors to:
separate an audio channel into a low frequency component and a high frequency component;
determine a target amplitude response defining one or more spatial cues;
convert the target amplitude response into a transfer function for configuring a single-input, multi-output allpass filter;
process the high frequency component using the allpass filter configured based upon the transfer function to produce a plurality of processed high frequency components;
combine the low frequency component with at least one of the plurality of processed high frequency components to generate one or more processed channels.

15. The non-transitory computer readable medium of claim 14, wherein the plurality of processed high frequency components comprises a first processed high frequency component and a second processed high frequency component, and wherein the program code further configures the one or more processors to:

combine the first processed high frequency component with the low frequency component to generate a left channel; and combine the second processed high frequency component with the low frequency component to generate a right channel.

16. The non-transitory computer readable medium of claim 14, wherein the transfer function corresponds to a frequency-dependent phase shift.

17. The non-transitory computer readable medium of claim 14, wherein the target amplitude response defines spatial cues for a mid component or a side component of the plurality of processed high frequency components.

18. The non-transitory computer readable medium of claim 14, where the single-input, multi-output allpass filter is configured to apply a Hilbert transform to the high frequency component to generate a left leg component and a right leg component.

19. The non-transitory computer readable medium of claim 18, wherein the single-input, multi-output allpass filter is configured to:

apply a first series of allpass filters to the high frequency component to generate the left leg component; and apply a first delay and a second series of allpass filters to the high frequency component to generate the right leg component.

20. The non-transitory computer readable medium of claim 18, wherein the single-input, multi-output allpass filter is configured to:

output the left leg component as a rotated right leg component;

perform a 2D rotation on the left leg component and right leg component;

output a rotated left leg component corresponding to a combined output of the 2D rotation performed on the left leg component and the right leg component.

21. The non-transitory computer readable medium of claim 14, wherein the single-input, multi-output allpass filter is configured to:

apply a first Hilbert Transform to the high frequency component to generate a first left leg component and a first right leg component, the first left leg component being 90 degrees out of phase with respect to the first right leg component;

apply a second Hilbert Transform to the first right leg component to generate a second left leg component and a second right leg component, the second left leg component being 90 degrees out of phase with respect to the second right leg component, wherein the plurality of processed high frequency components includes the first left leg component and the second right leg component.

22. The non-transitory computer readable medium of claim 14, wherein the program code further configures the one or more processors to:

generate a mid component and a side component from a received audio signal; and generate a hyper mid component including spectral energy of the side component removed from spectral energy of the mid component, wherein the audio channel corresponds to at least the hyper mid component.

23. The non-transitory computer readable medium of claim 14, wherein the target amplitude response defines a compensated null for encoding a vertical spatial cue.

24. The non-transitory computer readable medium of claim 14, wherein the program code further configures the one or more processors to convert the target amplitude response into coefficients for the single-input, multi-output allpass filter using an inverse discrete fourier transform (idft).

25. The non-transitory computer readable medium of claim 14, wherein the program code further configures the one or more processors to convert the target amplitude response into coefficients for the single-input, multi-output allpass filter using a phase-vocoder.

26. The non-transitory computer readable medium of claim 14, wherein the target amplitude response defines one or more parametric spatial cues, including one or more of a target broadband attenuation, a critical point, a filter characteristic, and a soundstage location.

27. A method, comprising, by one or more processors:

separating an audio channel into a low frequency component and a high frequency component;

determining a target amplitude response defining one or more spatial cues;

converting the target amplitude response into a transfer function for configuring a single-input, multi-output allpass filter;

processing the high frequency component using the allpass filter configured based upon the transfer function to produce a plurality of processed high frequency components;

combining the low frequency component with at least one of the plurality of processed high frequency components to generate one or more processed channels.

28. The method of claim 27, wherein the plurality of processed high frequency components comprises a first processed high frequency component and a second processed high frequency component, and further comprising:

combining the first processed high frequency component with the low frequency component to generate a left channel; and combining the second processed high frequency component with the low frequency component to generate a right channel.

29. The method of claim 27, wherein the transfer function corresponds to a frequency-dependent phase shift.

30. The method of claim 27, wherein the target amplitude response defines spatial cues for a mid component or a side component of the plurality of processed high frequency components.

31. The method of claim 27, further comprising, by the single-input, multi-output allpass filter, applying a Hilbert transform to the high frequency component to generate a left leg component and a right leg component.

32. The method of claim 31, further comprising, by the single-input, multi-output allpass filter:

applying a first series of allpass filters to the high frequency component to generate the left leg component; and applying a first delay and a second series of allpass filters to the high frequency component to generate the right leg component.

33. The method of claim 31, further comprising, by the single-input, multi-output allpass filter:

outputting the left leg component as a rotated right leg component;

performing a 2D rotation on the left leg component and right leg component;

outputting a rotated left leg component corresponding to a combined output of the 2D rotation performed on the left leg component and the right leg component.

34. The method of claim 27, further comprising, by the single-input, multi-output allpass filter:

applying a first Hilbert Transform to the high frequency component to generate a first left leg component and a first right leg component, the first left leg component being 90 degrees out of phase with respect to the first right leg component;

applying a second Hilbert Transform to the first right leg component to generate a second left leg component and a second right leg component, the second left leg component being 90 degrees out of phase with respect to the second right leg component, wherein the plurality of processed high frequency components includes the first left leg component and the second right leg component.

35. The method of claim 27, further comprising:

generating a mid component and a side component from a received audio signal; and generating a hyper mid component including spectral energy of the side component removed from spectral energy of the mid component, wherein the audio channel corresponds to at least the hyper mid component.

36. The method of claim 27, wherein the target amplitude response defines a compensated null for encoding a vertical spatial cue.

37. The method of claim 27, further comprising converting the target amplitude response into coefficients for the single-input, multi-output allpass filter using an inverse discrete fourier transform (idft).

38. The method of claim 27, further comprising converting the target amplitude response into coefficients for the single-input, multi-output allpass filter using a phase-vocoder.

39. The method of claim 27, wherein the target amplitude response defines one or more parametric spatial cues, including one or more of a target broadband attenuation, a critical point, a filter characteristic, and a soundstage location.

* * * * *